(12) United States Patent
August

(10) Patent No.: US 7,085,426 B2
(45) Date of Patent: Aug. 1, 2006

(54) VOLTERRA FILTERS FOR ENHANCEMENT OF CONTOURS IN IMAGES

(76) Inventor: Jonas August, 2940 Fernwald Rd., Riverside, CT (US) 06878

( * ) Notice: Subject to any disclaimer, the term of this patent is extended or adjusted under 35 U.S.C. 154(b) by 763 days.

(21) Appl. No.: 10/271,190

(22) Filed: Oct. 15, 2002

(65) Prior Publication Data
US 2003/0156762 A1 Aug. 21, 2003

Related U.S. Application Data

(60) Provisional application No. 60/329,264, filed on Oct. 15, 2001.

(51) Int. Cl.
G06K 9/40 (2006.01)
(52) U.S. Cl. ........................ 382/260; 382/266; 348/533
(58) Field of Classification Search ................ 382/260, 382/261, 262, 263, 264, 274, 275, 266; 358/463, 358/447; 348/533, 607
See application file for complete search history.

(56) References Cited

U.S. PATENT DOCUMENTS 6,944,304 B1 * 9/2005 Dance et al. ............... 381/94.7
2002/0186874 A1 * 12/2002 Price et al. .................. 382/133

OTHER PUBLICATIONS

Li et al "Computationally Efficient Algorithms for Third Order Adaptive Volterra Filters", Proceedings of the 1998 IEEE International Conference on Acoustics, Speech and Signal Processing, vol. 3, May 12-15, 1998, p. 1405-1408.*
Lin et al, "2-D Adaptive Volterra Filter for 2-D Nonlinear Channel Equalisation and Image Restoration", Electronics Letters (UK), vol. 28, No. 2, Jan. 16, 1992, p. 180-182.*

* cited by examiner

Primary Examiner—Von J. Couso

(57) ABSTRACT

Enhancement of contours in images that are noisy or otherwise corrupted is important in medical imaging, scanning for weapons detection, and many other fields. Here, the Curve Indicator Random Field (CIRF) is used as a model of uncorrupted images of contours for constructing linear, quadratic and cubic Volterra filters involving a number of adjustable parameters.

20 Claims, 20 Drawing Sheets

First-order method     Direct method

Image  Local Responses  Thresholding

| | | |
|---|---|---|
| Image | <br>Original | <br>Zoom |
| Local Responses |  |  |
| Linear |  |  |
| Quadratic |  |  |
| Cubic |  |  |
| Filter | Response | Thresholding |

VOLTERRA FILTERS FOR ENHANCEMENT OF CONTOURS IN IMAGES

CROSS-REFERENCE TO RELATED APPLICATIONS

This application claims the benefit of U.S. Provisional Application No. 60/329,264, filed Oct. 15, 2001.

The present application is related to the present inventor's application entitled "Biased Curve Indicator Random Field Filters for Enhancement of Contours In Images", which was filed on the same day as the present application, and is incorporated herein by reference.

FIELD OF THE INVENTION

The present invention relates to the enhancement of the appearance of contours in images, and to methods and systems for enhancing contours of noisy or otherwise corrupted images.

BACKGROUND

Noisy images are encountered in many fields. For example, medical images by ultrasound, x-ray, and MRI are often so noisy that it is difficult to accurately perceive the critical contours of organs, bones, and medical instruments that are obscured by the noise. Noisy images are also an important problem in many other areas, such as radar, weapon detection during airport inspection of luggage, and the like. These needs have motivated efforts to deal with very difficult machine vision problems using computerized mathematical methods for contour enhancement in noisy images.

As will be understood, image enhancement involves manipulation of image data values in order to improve the appearance of the data as perceived by humans, as well as to render the data more suitable for computer analysis of the image. Various image enhancement processes have been proposed. For example, U.S. Pat. No. 4,803,736, issued Feb. 7, 1989 to Grossberg et al approaches contour perception by use of mask filters. Other prior art references will be discussed hereinafter, along with a detailed explanation of the present invention and concepts related thereto. That discussion will assist a deeper understanding of the present invention, which involves use of Curve Indicator Random Field (CIRF) filtering for contour enhancement in noisy images.

SUMMARY OF THE INVENTION

I. Biased CIRF:

The present invention broadly provides a new biased CIRF filtering method of enhancing contours in a noisy image. The novel method comprises the steps of:
a) capturing said noisy image as a first distribution m of spatially distributed intensity values
b) transforming said intensity values of said first distribution m into a second distribution U of spatially distributed intensity values representing an enhanced image having enhanced contours therein, by using a transformation model that is defined by:

$U=U(r)=\tilde{N} fb=\tilde{N} f(r)b(r)$ and a pair of equations:

$Qf+c \cdot f+v=0$ $Q^*b+c \cdot b+\mu=0$ wherein:

$U=U(r)$ comprises an estimate of the probability that a contour passes through location r;

$\tilde{N}$ is a parameter defining an expected number of contours associated with said noisy image;

$\mu$ comprises an expected distribution of starting points for said contours;

$v$ comprises an expected distribution of end points for said contours;

the operation "·" indicates the taking of a component-wise product of two functions, wherein $s \cdot v$ evaluated at location r is the product of the two values $s(r)$ and $v(r)$, where s and v are each functions of r;

$c=c(r)$ comprises a function of said first distribution m of intensity values;

$f=f(r)$ comprises an estimate of the probability that a contour continues from location r in a forward direction along a contour;

$b=b(r)$ comprises an estimate of the probability that a contour continues from location r in a backward direction along a contour;

$Q$ equals $-G^{-1}$, the negative of the inverse of the linear operator $G=G(r_1, r_2)$, where G comprises a matrix of probabilities, each entry of said matrix representing the probability that a contour passing through location $r_1$ passes through location $r_2$ in said forward direction; and $Q^*$ equals $-(G^*)^{-1}$, the negative of the inverse of the linear operator $G^*=G^*(r_1, r_2)$, where $G^*$ comprises a matrix of probabilities, each entry of said matrix representing the probability that a contour passing through location $r_1$ passes through location $r_2$ in said backward direction.

According to a preferred embodiment, U, $\mu$, v, C, f, and b are functions of $(r_1, r_2)$, where $r_1$ comprises the two-dimensional space (x,y) or the three-dimensional space (x,y,z) and where $r_2$ comprises at least one of local direction, curvature, torsion, blur scale, color, texture, contrast and other properties used to form a local description of a contour passing a point of said two-dimensional space (x,y) or said three-dimensional space (x,y,z), respectively.

According to another embodiment.

$c=\epsilon[m-A(U)]$, where $\epsilon$ is a parameter defining an expected level of noise associated with said noisy image, A is a linear or nonlinear operator representing a nonrandom component of corruption in said noisy image.

According to another embodiment, U, $\mu$, v, C, f, and b are functions of (x, y, $\theta$), and:

$$Q = D - \cos\theta \frac{\partial}{\partial x} - \sin\theta \frac{\partial}{\partial y} - \alpha,$$

$$Q^* = D + \cos\theta \frac{\partial}{\partial x} + \sin\theta \frac{\partial}{\partial y} - \alpha,$$

where:

$$(Df)(x, y, \theta) = (1-\gamma)\frac{\sigma_\theta^2}{2}\frac{\partial^{2'}}{\partial \theta^2}f + \gamma \int w(\theta' - \theta)f(\theta')d\theta';$$

θ is a direction along a contour;

$\sigma_\theta$ is a parameter defining a bound on curvature of contours in said noisy image, said curvature comprising the rate of change of contour direction θ per unit length of contour;

γ is a parameter (for example, γ=0) defining the relative probability of a corner in the contours in said noisy image, said corner comprising a discontinuity in direction θ;

w(θ) is a weight function representing changes in direction at a corner, wherein w is a constant function of θ when all corner angles are equally preferred; and α is a parameter defining an expected length of contour associated with said noisy image.

According to another embodiment, U, μ, ν, C, f, and b are functions of (x, y, θ, κ), and:

$$Q = D - \cos\theta \frac{\partial}{\partial x} - \sin\theta \frac{\partial}{\partial y} - \kappa \frac{\partial}{\partial \theta} - \alpha,$$

$$Q^* = D + \cos\theta \frac{\partial}{\partial x} + \sin\theta \frac{\partial}{\partial y} + \kappa \frac{\partial}{\partial \theta} - \alpha,$$

where:

$$(Df)(x, y, \theta) = (1 - \gamma)\left[\frac{\sigma_\theta^2}{2}\frac{\partial^2}{\partial \theta^2}f + \frac{\sigma_\kappa^2}{2}\frac{\partial^2}{\partial \kappa^2}f\right] +$$

$$\gamma \int\int w(\theta' - \theta, \kappa' - \kappa) f(x, y, \theta', \kappa') d\theta' d\kappa';$$

θ is a direction along a contour;

κ is a curvature of a contour, said curvature comprising the rate of change of contour direction θ per unit length of contour;

$\sigma_\theta$ is a parameter defining a bound on said curvature;

$\sigma_\kappa$ is a parameter defining a bound on a curvature derivative of contours in said noisy image, said curvature derivative comprising the rate of change of contour curvature θ per unit length of contour;

γ is a parameter (e.g. γ=0) defining the probability of a corner in the contours in said noisy image, said corner comprising a discontinuity in at least one of direction θ and curvature κ;

w(θ,κ) is a weight function representing changes in direction and curvature at a corner, wherein, when all corner angles are equally preferred, and all curvatures less than some bound $\kappa_{max}$ are equally preferred, then w is a non-zero constant function of θ and κ, for $\kappa < \kappa_{max}$, and zero otherwise; and α is a parameter defining an expected length of contour associated with said noisy image.

Preferably, the method further comprises the step of:

c) transforming U(r) into an image I(s), wherein r represents more dimensions than s.

Step (c) may preferably be carried out by transforming U(r) into an image I(x,y,z) by integrating U or selecting maxima of U over at least one spatial dimension other than (x,y,z). For example, one may choose U(r)=U(x,y,z,θ,φ), where θ and φ define a direction in three dimensions, and I(x,y,z) comprises either an integral of U over θ and φ or a selection of maxima of U over θ and φ. The transformation of U(r) into a planar image I(x,y) may be done by integrating U or selecting maxima of U over at least one spatial dimension other than (x,y). In particular, one may use U(r)=U(x,y,θ), and I(x,y) may then comprise either an integral of U over θ or a selection of maxima of U over θ.

According to a preferred embodiment, the method may include the further step of displaying the image I(s) on a suitable display, such as a workstation monitor.

The invention also provides a computer readable medium (such as a magnetic disc, tape, or optical disc) which includes computer instructions for carrying out any of the methods disclosed herein of enhancing contours in a noisy image.

The invention further provides a system, of the biased CIRF type, for enhancing contours in a noisy image. The aforesaid system comprises:

a) a camera for capturing said noisy image as a first distribution m of spatially distributed intensity values b) a computer for transforming said intensity values of said first distribution m into a second distribution U of spatially distributed intensity values representing an enhanced image having enhanced contours therein, by using a transformation model that is defined by:

$$U = U(r) = \tilde{N} f b = \tilde{N} f(r) b(r)$$

and a pair of equations:

$$Qf + c \cdot f + \nu = 0$$

$$Q^* b + c \cdot b + \mu = 0$$

where:

U=U(r) comprises an estimate of the probability that a contour passes through location r;

$\tilde{N}$ is a parameter defining an expected number of contours associated with said noisy image;

μ comprises an expected distribution of starting points for said contours;

ν comprises an expected distribution of end points for said contours;

the operation "·" indicates the taking of a component-wise product of two functions, wherein s·v evaluated at location r is the product of the two values s(r) and v(r), where s and v are each functions of r;

c=c(r) comprises a function of said first distribution m of intensity values;

f=f(r) comprises an estimate of the probability that a contour continues from location r in a forward direction along a contour;

b=b(r) comprises an estimate of the probability that a contour continues from location r in a backward direction along a contour;

Q equals $-G^{-1}$, the negative of the inverse of the linear operator G=G($r_1$, $r_2$), where G comprises a matrix of probabilities, each entry of said matrix representing the probability that a contour passing through location $r_1$ passes through location $r_2$ in said forward direction; and $Q^*$ equals $-(G^*)^{-1}$, the negative of the inverse of the linear operator $G^* = G^*(r_1, r_2)$, where $G^*$ comprises a matrix of probabilities, each entry of said matrix representing the probability that a contour passing through location $r_1$ passes through location $r_2$ in said backward direction.

According to preferred embodiments, the computer may be enabled to carry out the various transformations on the various functions disclosed hereinabove with respect to embodiments of the biased CIRF method.

In particular, according to a preferred embodiment, the inventive system comprises a computer for transforming U(r) into an image I(s), wherein r represents more dimensions than s. While this computer may be a different computer than the computer discussed above for transforming m into U, it will be understood that the same computer, suitably programmed, can serve both purposes.

According to another preferred embodiment, the system may further comprise a display, such as computer monitor, for displaying the aforesaid image I(s).

II. Volterra:

The present invention broadly provides a new Volterra filtering method of enhancing contours in a noisy image; the aforesaid Volterra method comprises the steps of:

a) capturing said noisy image as a first distribution m of spatially distributed intensity values b) transforming said intensity values of said first distribution m into a second distribution U of spatially distributed intensity values representing an enhanced image having enhanced contours therein, by using a transformation model, which defines a cubic filter, as follows:

$$U=a_0+a_1[Gm+G^*m]+a_2[G(\text{diag } m)Gm+Gm\cdot G^*m+G^*(\text{diag } m)G^*m]+a_3[G(\text{diag } m)G(\text{diag } m)Gm+G(\text{diag } m)Gm\cdot G^*m+Gm\cdot G^*(\text{diag } m)G^*m+G^*(\text{diag } m)G^*(\text{diag } m)G^*m],$$

where:

diag m is a diagonal operator comprising a matrix with said first distribution m along the diagonal of said matrix and zeroes elsewhere;

the operation "·" indicates the taking of a componentwise product of two vectors, wherein in s·v evaluated at location r is the product of the two numbers s(r) and v(r), where s and v are each functions of r, $a_0$, $a_1$, $a_2$, and $a_3$ are real-valued parameters controlling the relative importance of constant, linear, quadratic, and cubic terms, respectively, in said transformation model;

$G=G(r_1, r_2)$ comprises a matrix of probabilities, each entry of which represents the probability that a contour passing through location $r_1$ passes through location $r_2$ in a forward direction along said contour; and $G^*=G^*(r_1, r_2)$ comprises a matrix of probabilities, each entry of which represents the probability that a contour passing through location $r_1$ passes through location $r_2$ in a backward direction along said contour.

It will be seen that when $a_2=a_3=0$, a linear filter is defined. Similarly, when $a_3=0$, a quadratic filter is defined.

According to a preferred embodiment, U is a function of $(r_1,r_2)$, and wherein $r_1$ comprises the two-dimensional space (x,y) or the three-dimensional space (x,y,z,), and $r_2$ comprises at least one of a local direction, curvature, torsion, blur scale, color, texture, contrast and other properties used to form a local description of a contour passing a point of said two-dimensional space (x,y) or said three-dimensional space (x,y,z), respectively.

According to another preferred embodiment, the novel Volterra method comprises the step of:

c) transforming U(r) into an image I(s), wherein r represents more dimensions than s. Step (c) may be carried out by transforming U(r) into an image I(x,y,z) by integrating U or selecting maxima of U over at least one spatial dimension other than (x,y,z). For example, one may choose $U(r)=U(x,y,z,\theta,\phi)$, where $\theta$ and $\phi$ define a direction in three dimensions, and I(x,y,z) comprises either an integral of U over $\theta$ and $\phi$ or a selection of maxima of U over $\theta$ and $\phi$. The transformation of U(r) into a planar image I(x,y) may be done by integrating U or selecting maxima of U over at least one spatial dimension other than (x,y). In particular, one may use $U(r)=U(x,y,\theta)$, and I(x,y) may then comprise either an integral of U over $\theta$ or a selection of maxima of U over $\theta$.

According to a preferred embodiment, the method may include the further step of displaying the image I(s) on a suitable display, such as a workstation monitor.

The invention also provides a computer readable medium (such as a magnetic disc or tape) which includes computer instructions for carrying out any of the Volterra filtering methods disclosed hereinabove of enhancing contours in a noisy image.

The invention provides a system, of the Volterra type, for enhancing contours in a noisy image. The aforesaid system comprises:

a) a camera for capturing said noisy image as a first distribution m of spatially distributed intensity values b) a computer for transforming said intensity values of said first distribution m into a second distribution U of spatially distributed intensity values representing an enhanced image having enhanced contours therein, by using a transformation model, which defines a cubic filter, as follows:

$$U=a_0+a_1[Gm+G^*m]+a_2[G(\text{diag } m)Gm+Gm\cdot G^*m+G^*(\text{diag } m)G^*m]+a_3[G(\text{diag } m)G(\text{diag } m)Gm+G(\text{diag } m)Gm\cdot G^*m+Gm\cdot G^*(\text{diag } m)G^*m+G^*(\text{diag } m)G^*(\text{diag } m)G^*m],$$

where:

diag m is a diagonal operator comprising a matrix with said first distribution m along the diagonal of said matrix and zeroes elsewhere;

the operation "·" indicates the taking of a componentwise product of two vectors, wherein in s·v evaluated at location r is the product of the two numbers s(r) and v(r), where s and v are each functions of r, $a_0$, $a_1$, $a_2$, and $a_3$ are real-valued parameters controlling the relative importance of constant, linear, quadratic, and cubic terms, respectively, in said transformation model;

$G=G(r_1, r_2)$ comprises a matrix of probabilities, each entry of which represents the probability that a contour passing through location $r_1$ passes through location $r_2$ in a forward direction along said contour; and $G^*=G^*(r_1, r_2)$ comprises a matrix of probabilities, each entry of which represents the probability that a contour passing through location $r_1$ passes through location $r_2$ in a backward direction along said contour.

Preferably, U is a function of $(r_1,r_2)$, wherein r, comprises the two-dimensional space (x,y) or the three-dimensional space (x,y,z,), and wherein $r_2$ comprises at least one of local direction, curvature, torsion, blur scale, color, texture, contrast and/or other properties used to form a local description of a contour passing a point of said two-dimensional space (x,y) or said three-dimensional space (x,y,z), respectively.

To define a linear filter, one may select $a_2=a_3=0$. For a quadratic filter, one should set $a_3=0$.

In particular, according to a preferred embodiment, the inventive system comprises a computer for transforming U(r) into an image I(s), wherein r represents more dimensions than s. While this computer may be a different computer than the computer discussed above for transforming m into U, it will be understood that the same computer, suitably programmed, can serve both purposes.

This transformation of U(r) into an image I(x,y,z) by integrating U or selecting maxima of U over at least one spatial dimension other than (x,y,z). For example, one may choose $U(r)=U(x,y,z,\theta,\phi)$, where $\theta$ and $\phi$ define a direction in three dimensions, and I(x,y,z) comprises either an integral of U over $\theta$ and $\phi$ or a selection of maxima of U over $\theta$ and $\phi$. The transformation of U(r) into a planar image I(x,y) may be done by integrating U or selecting maxima of U over at least one spatial dimension other than (x,y). In particular, one may use U(r)=U(x,y,θ), and I(x,y) may then comprise either an integral of U over θ or a selection of maxima of U over θ.

According to another preferred embodiment, the system may further comprise a display, such as computer monitor, for displaying the aforesaid image I(s).

DETAILED DESCRIPTION OF THE INVENTION

Figure 1:
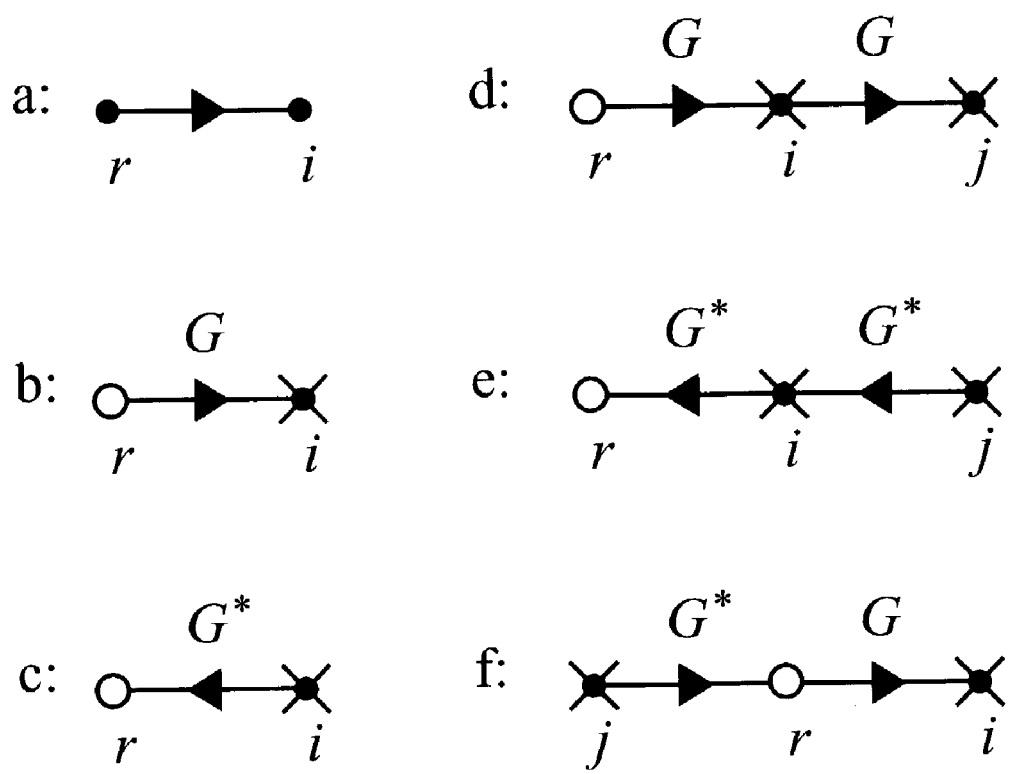
FIG. 1 is a schematic diagram for representing some permutations, in the CIRF cumulant, from the posterior mean.

The following discussion will explore related concepts and will outline results obtained in exemplary applications of the biased CIRF and Volterra filtering methods. A table of notations used is included for the convenience of the reader. A final example is given in order to succinctly outline the steps used in these two filtering methods.

Section 1

1.1 Discussion

There is a semantic gap between images and the visual structures suggested by them. On the one hand, an image is a distributed array of numbers representing, for example, a field of spatially distributed light intensity. On the other, the "objects" depicted by these images are discrete (e.g., a person, a car, or a ship's wake) and form a kind of alphabet for our descriptions and interactions with the world (e.g., "the person on the left is approaching the car on the right," or "the ship's wake suggests the presence of a ship"). Bridging the gap between these qualitatively distinct sorts of descriptions—performing the signal-to-symbol transition—is at the heart of early vision. The present application focusses on one such transition: obtaining contour structure from images.

Most research on inferring image contours was inspired by the Gestalt psychologists who introduced a number of informal principles of perceptual organization to describe the perceived grouping of visual elements in images. For contours, most relevant is the principle of good continuation, which asserts that among the available ways of continuing a contour, the smoothest one should be chosen. Good continuation is used in grouping as a way of weighting associations of contour fragments; since these fragments must somehow already be known, grouping assumes that part of the signal-to-symbol transition has already been solved.

The cause of this difficulty ties in the predominantly discrete nature of thinking about perceptual organization. For example, in one standard grouping demonstration, a subject is presented with a stimulus consisting of perhaps a dozen dots, and the theoretical task is to explain why the subject chose one particular partitioning of the dots among the finite set of possibilities. In illusory contour perception as well, the stimulus is a number of inducing endpoints, where one seeks to understand the (perceptual) selection of one of a finite set of arrangements. The "units" of perceptual organization here (dots, endpoints) are discrete, and typically few in number. Artificial intelligence has reinforced this view, where the units of perceptual organization become the "atoms" of LISP programs and symbol manipulation. Modern graph theoretic models of perceptual organization in computer vision have entrenched this discrete thinking, even to the extent that the formal task of perceptual organization has become identified with the grouping of a finite set of (fixed) entities or tokens. In these discrete "symbolic" models, the underlying presence of a signal—the image—is suppressed.

Unfortunately, natural images are ambiguous, and not only in terms of the groupings of discrete units: even the existence or absence of these units is uncertain. For the inference of contour structure, this ambiguity implies that the true space of units is the uncountably infinite set of all possible curve groups; explicitly enumerating them is unthinkable. To cross this both semantic and now practical divide between images and contours, we introduce an intermediate structure—the curve indicator random field—which will allow us to bring perceptual organization closer to signal processing by formalizing what one can mean by an image of curves. In particular, we shall study and exploit the statistical structure of this field and then derive filters for extracting contour information from noisy images.

To motivate our model, consider the situation of an artist sketching a scene. Using a pen, the artist draws contours on the paper; this motion can be formalized mathematically as a curve, or mapping of a parameter, the current time in the duration of the stroke, to the point in the plane where the tip of the pen is located. Such pen motion is actually recorded in current hand-held electronic pen devices such as the Palm Pilot. A separate time-sequence of pen locations can be recorded for each stroke; together this set of curves provides a description of the artist's activity. Another way of describing this situation is the drawing itself; the ink records a trace of the pen's motion, but discards the curves' parameterizations. The drawing might be called an "ink field," where the value of the field at a point specifies how much ink was deposited there; this field has zero value except along the sketched contours. Combined with the randomness inherent in the act of drawing, this ink field will inspire our definition of the curve indicator random field, or CIRF, to become our model of an image of contours. Estimating the CIRF given a noisy rendition of it will be our filtering task.

Given the apparently slight distinction between the set of contour points and the CIRF, it is not surprising that the CIRF has been overlooked as an object of study in vision. But there are significant advantages to making the CIRF a focus for understanding visual contours. First, it provides an exact notion of an ideal edge or line map, satisfying the two desiderata of being (a) nonzero-valued along the true contours, and (b) zero-valued elsewhere. The CIRF therefore provides a basis for formalizing saliency as the problem of estimating the CIRF. Second, unlike dictionary-based relaxation labeling and line processes in Markov random fields, the CIRF does not require an explicit and arbitrary enumeration and weighting of local field configurations to specify its joint statistical structure. Instead, by formally defining the field as a function of the curves depicted by it, the statistical properties of the field become a derivable consequence of those of the contours. Third, being a field, the CIRF makes it possible to formalize what is even meant by observing contours under various forms of corruption. Without the CIRF, a concept of a noisy contour might mean a smooth curve made rough; with the CIRF, a noisy image of a contour is simply the pointwise addition of one field (the CIRF) with another (white noise), for example. Fourth, the filters disclosed here provide a different notion of blur scale than convolution by a Gaussian, or linear scale-space. In particular, smoothing will take place along the (putative) contours. Finally, the CIRF provides a local representation of a global curve property: intersection. As ink builds up where contours cross in a sketch, so does the value of the CIRF increase at intersections.

There are two major sources of inspiration for the present invention. The first is the set of relaxation labeling (S. W. Zucker, R. Hummel, and A. Rosenfeld. An application of relaxation labelling to line and curve enhancement. *IEEE Trans. Computers*, C-26:393–403, 922–929, 1977) approaches to contour computation, which explicitly emphasized the need to include contextual interaction in inference, in contrast to classical edge detection techniques that regard each edge independently (followed by a linking procedure perhaps) (J. Canny. A computational approach to edge detection. *IEEE Transactions on Pattern Analysis and Machine Intelligence*, 8:679–698, 1986). These approaches formalize contour inference as a labeling problem using a notion of label compatibility derived from good continuation formalized using orientation or co-circularity. The second source of inspiration is the work on curves of least energy or elastica and its probabilistic expression as stochastic completion fields (L. Williams and D. Jacobs. Local parallel computation of stochastic completion fields. *Neural Computation*, 9(4):859–881, 1997). We have introduced the CIRF to unify these works in a probabilistic framework.

This discussion is organized as follows. Because the signal-to-symbol transition is fraught with uncertainty, we shall use probabilistic techniques throughout. We begin in section 2 with a review of Markov process models of the random contours that will drive the CIRF model. There we shall observe two key random models of good continuation, the first based on the local tangent direction, and the second based on curvature. Given a random contour model, we then formally define the CIRF in section 3. In the case of Markov process contour models, we then derive explicit formulas for the moments and cumulants of the CIRF, in the single-curve and multiple-curve cases, respectively, and summarize this joint statistical structure with a tractable expression for the CIRF moment generating functional.

Section 4 explores how we can exploit the statistics of the CIRF to derive filters by solving an estimation problem. The section begins with a review of Bayes decision theory, arguing for an additive loss function and leading to minimum mean-square error estimation of the CIRF given a corrupted image of it. After describing some practical observation models, or likelihoods, we then attack the core filtering problem of computing the posterior mean of the CIRF. Since we are primarily interested in filtering in high noise situations where the ambiguity is greatest, we derive linear, quadratic, and cubic Volterra filters by taking a perturbation expansion around an infinite noise level; we employ a novel diagram technique to facilitate the lengthy hand calculations. Another class of filters is derived by approximating the posterior with a more manageable distribution, the biased CIRF. As a result we obtain (discrete approximations to) a coupled pair of reaction-diffusion-convection integro-elliptic partial differential equations (PDEs) for estimating the posterior mean. Numerical techniques for computing solutions to our filters are presented in section 5, and experimental results are provided in section 6. Our results demonstrate a striking ability of our filters for enhancing contour structure in noisy images. The results also show that filters are orientation- and curvature-selective. We conclude and outline further applications of the invention in section 7.

1.2 Contributions

This invention presents a number of results and novel ideas for understanding and inferring curve structure in images. Specifically, we Introduce the curve indicator random field as an ideal edge/line map. We suggest that the statistical regularities of the CIRF can be exploited for enhancing noisy edge/line maps. The CIRF is applicable even if the individual contours are neither Markovian nor independent;

Derive the cumulants and a tractable form for the moment generating functional of the multiple-curve CIRF.

Show that the curve indicator random field is non-Gaussian;

Introduce a curvature-based Markov process as a model of smooth contours. We prove that the most probable realization of this process is an Euler spiral;

Formalize the problem of optimal contour inference (given a corrupted image) as the minimum-mean square estimate (MMSE) of the CIRF;

Derive novel high-noise linear, quadratic and cubic Volterra MMSE CIRF filters with low computational complexity. The derivation exploits a novel diagram construction;

Compute the cumulants of a biased CIRF and derived MMSE CIRF filters by approximating the CIRF posterior with a biased CIRF. This leads to new nonlinear contour filtering equations;

Develop a rapid, accurate method for applying the Green's operator of a direction-based Markov process. Previous techniques were either very expensive or inaccurate. This technique is also extended to the curvature Markov process;

Develop numerical techniques for solving the filtering equations;

Apply these filters to noisy synthetic and real images, demonstrating significant contour enhancement; and Section 2

2.1 Markov Processes for Vision

What class of contour models is broad enough to capture curve properties relevant for vision and yet both mathematically and computationally tractable? We start this section by arguing that Markov processes generally satisfy these needs, while acknowledging situations where they do not. We then review the theory of Markov processes and a process by Mumford (supra) that represents the basic local geometry of a curve up to its tangent. Because curvature is also significant in vision, we then introduce a Markov process in curvature. Finally, we suggest other Markov processes that are useful for vision.

We now establish some notation and terminology. Recall that a planar curve is a function taking a parameter $t \in \mathbb{R}$ to a point $\gamma(t) := (x(t), y(t))$ in the plane $\mathbb{R}^2$. (Also recall that the notation A:=B means that the symbol A is defined as the expression B, whereas A=:B means the opposite.) The local tangent vector $(\dot{x}, \dot{y})$ has direction $\theta$ (Directions are angles over the circle $[0, 2\pi)$, while orientations are angles over the half-circle $[0, \pi)$.), defined as $\theta := \arg(\dot{x} + i\dot{y})$, where $i$ is the imaginary unit $\sqrt{-1}$, the dot denotes differentiation with respect to the arc-length parameter t, and arg z denotes the counterclockwise angle from the real axis to z in the complex plane. Without loss of generality, we assume that the tangent $(\dot{x}, \dot{y})$ (where it exists) has unit length, i.e., $\dot{x}^2 + \dot{y}^2 = 1$. Curvature $\kappa$ is equal to $\dot{\theta}$, the rate of change of direction.

Into this deterministic picture we now inject the uncertainty of vision: since images are ambiguous, so too will be the structures within it. In other words, any given structure in a particular image can be viewed as a realization of a random variable. (A random variable may be a scalar, vector or function (i.e., a process or field). A random process has only one parameter, while a random field generally has several.) In this way, any given curve $\gamma$ is thus a realization of a random curve $\Gamma$. (Upper and lower case letters will be used to denote random variables and their realizations (samples), respectively. Capitals also denote operators later in this disclosure.) Since $\Gamma = \Gamma(t)$ is a one-parameter family of random planar vectors, $\Gamma$ is a random process by definition.

2.2 Why Markov Processes?

By making randomness explicit, we clear a path for overcoming it. While the true curve is uncertain, the curve random process has a lawful distribution that can be exploited to support contour inferences. Put loosely, we can bias our inferences towards the probable curves and away from the rare. The rich variety of possible image curves may appear to suggest, however, that the structure of this distribution is either too simple to be useful (e.g., "uniform") or too complex to be practical (i.e., an arbitrary distribution over the infinite-dimensional space of distributions of functions). As suggested by the Gestalt law of good continuation, the truth lies is somewhere in between: although many contours can occur, most have some regular structure; e.g., object boundaries usually have a degree of smoothness. The class of Markov processes is ideal for describing such local statistical regularity of visual curves, while remaining tractable.

A random process $R = R_t = R(t)$ is Markovian (or a Markov process) if and only if the distribution of the future $\{R_t: t > t_0\}$ of the process, conditioned on the past $\{R_t: t \leq t_0\}$, is equal to the distribution of the future, conditioned only on the present (or state) $R_{t_0}$. We can construct various Markov process models R for approximating our unknown curve $\Gamma$. For example, letting the state of the process be just the planar position of the curve, we could set $R(t) = (X, Y)(t) = \Gamma(t)$ with realization $r(t) = (x, y)(t) = \gamma(t) \in \mathbb{R}^2$. But more information can be represented about the contour via the process of lifting, where extra components are appended to the state to take the two-dimensional curve to a curve in a higher-dimensional space. Thus richer examples of Markov processes can be created by lifting, such as Mumford's process with direction with the three-dimensional state $R(t) = (X, Y, \Theta)(t) = (\Gamma, \Theta)(t)$ and realization $r(t) = (x, y, \theta)(t) = (\gamma, \theta)(t) \in \mathbb{R}^2 \times \mathbb{R}$. The space $\mathbb{R}^2 \times \mathbb{R}$ is also called $(x, y, \theta)$-space, the unit tangent bundle, and orientation space. Another example of lifting, but involving a mapping from two to four dimensions, is provided by the Markov process with curvature that we introduce here with $R(t) = (X, Y, \Theta, K)(t) = (\Gamma, \Theta, K)(t)$ with realization $r(t) = (x, y, \theta, \kappa)(t) = (\gamma, \theta, \kappa)(t) \in \mathbb{R}^2 \times \mathbb{R} \times \mathbb{R}$. These examples show that not only can the present state R(t) of the Markov process represent the present value $\Gamma(t)$ of the unknown curve, it also can capture (uncertain) local differential information such as direction and curvature. (In a discrete-time setting there is the distinction between first-order and higher-order processes; by a suitable change of state space this distinction is irrelevant and so we consider first-order Markov processes only.) In addition to the curve's local geometry, the state can represent other local information such as blur scale, intensity (on one or both sides of the curve), contrast, color, texture, material information, edge classification (edge vs. line, etc.), and indeed any property that is locally definable.

Merely setting up the state vector is insufficient to characterize a Markov process: the transition probabilities are also necessary. Such probabilities describe how the present state influences the future; for visual contours, the transition probabilities therefore model how local properties extend along the curve. For example, in a world of infinitely long straight lines, the local position and direction determine those elsewhere along the curve; additionally including curvature is not necessary. For a world of very smooth contours, higher-derivative information than curvature may reliably predict nearby positions along the curves. But for fractal boundaries, even local direction would be a poor predictor of the contour nearby a point along the curve. Transition probabilities can model all of these situations, and can therefore be used to gauge the usefulness of particular local properties: those that "persist" for some distance along the curve will support the inference of these curves that we study in section 4. In a sense, Markov processes both formalize the Gestalt concept of good continuation and generalize it to non-geometrical visual cues such as contrast; the transition probabilities quantitatively characterize the relative power of these cues. Markov processes are not even limited to the modeling of such generalized good continuations; they can also specify how good continuations break down, e.g., at discontinuities (see section 2.6).

2.2.1 Limitations of Markov Processes

While Markov processes do capture a variety of crucial properties of contours, it is important to realize that non-local cues are not explicitly included, such as closure, symmetry, simplicity (no self-intersections), and junctions (intersections between possibly distinct contours). The fundamental difficulty with all of these properties is their global nature: for a random process with any of these properties, the entire process history directly influences the future. For a Markov process, however, only the present state directly affects the future; the past has only indirect effects. Fortunately, there are several tools using which we can exploit global contour properties without abandoing Markov processes: spectral techniques, alternative shape representations, and the curve indicator random field (section 3.2.1). Moreover, in section 7.1 we suggest another way to represent both symmetry and closure using a Markov process model of the skeleton representation of the boundary.

Two other global contour properties are simplicity and junctions. For example, given a parameterization of the contour, one has to traverse the entire domain of parameterization to determine whether the contour crossed itself (U. Montanari. On the optimum dection of curves in noisy pictures. *Comm. ACM*, 14:335–345, 1971). As we shall see in section 3.2.1, this global computation in terms of the parameterization becomes local in terms of the CIRF. Enforcing this constraint is discussed in section 4.3, and violations of the constraint are penalized by filters that we derive in section 4. Junctions represent contour crossings as well, but of distinct curves, and also are a global property of the contour parameterizations. Both of these global contour properties become local properties of a field.

Thus, it can be seen that while Markov processes in themselves do not convey global contour properties, they are not incompatible with global contour information when captured appropriately. We now consider one other global contour property: length.

2.2.2 Length Distributions

Not only do contours vary in their local properties, they also vary in length. While one may consider a large variety of length distributions, as a first approximation we assert a memoryless property: whether the contour continues beyond a certain point does not depend on how long it already is. We also assume that the length is independent of other aspects of the contour. This implies an exponential density $p_T(t)=\alpha \exp(-\alpha t)$ for the unknown contour length T, where $\lambda:=\alpha^{-1}$ is the average contour length. This length distribution is equivalent to a constant killing (or decay rate) $\alpha$ at each point in the state-space (see 2.7).

One may view the exponential distribution over contour length as conservative in two respects. First, the memoryless property is an independence assumption: the probability that the curve will continue for a certain length is independent of its current length. Second, the exponential distribution can be used to represent highly ambiguous lengths. Consider what occurs as $\lambda$ is increased to infinity: the slope of the density becomes increasingly flat, and so the length distribution increasingly appears uniform over any given length interval.

To model more general length distributions we can consider either (1) non-stationary Markov processes on, the same state-space or (2) stationary Markov processes on an augmented state-space. As we shall require stationarity in section 3, we could still take the second approach where we would add a length component to the state vector and modify the transition probabilities to monotonically increase the length component with process time. Richer length distributions would be captured by a non-constant decay rate, i.e., killing depends on the length component of the state. For example, to bias toward curves with length less than t* one would have a small killing rate for states with length component less than t*, and a large killing rate for states with a large length component.

With this capacity for more varied length distributions, we continue our presentation of stationary Markov processes with exponentially distributed lengths. We shall concentrate on contour geometry in continuous spaces; later we discretize in preparation for the formal development of the contour filters we derive in section 4.

2.3 Planar Brownian Motion

Perhaps the simplest contour model is Brownian motion in the plane. Although we shall not be using it in our filters, Brownian motion is historically important and forms a benchmark for more complex random processes. Intuitively, it can represent the random motion of microscopic particles. Mathematically, we can use the notation of stochastic differential equations (SDEs) to describe planar Brownian motion as the random process $R(t)=(X, Y)(t)$ such that $$dX=\sigma dW^{(1)}, dY=\sigma dW^{(2)}, \qquad (2.1)$$

where $W^{(1)}$ and $W^{(2)}$ are independent, standard Brownian motions and $\sigma=\sigma_{BM}>0$ is the "standard deviation in the derivatives". (For reference, a standard Brownian motion W is a stationary (continuous) Markov process on $\mathbb{R}$ where the increments are independent and increment $W_t-W_{t'}$ is a zero-mean Gaussian random variable of variance $|t-t'|$.) Planar Brownian motion is an example of a diffusion process and is characterized by the transition probability $p_{R(t)|R(0)}(r, t|r_0)$, which is the conditional probability density that the particle is located at r at time t given that it started at $r_0$ at time 0. We write the transition probability as $p=p(x, y, t)=p_{R(t)|R(0)}(r|r_0)$, where $r_0:=(x_0, y_0)$ is the initial position of the process, and they satisfy the following Fokker-Planck diffusion equation:

$$\frac{\partial p}{\partial t} = \mathcal{L}p, \text{ where } \mathcal{L} = \frac{\sigma^2}{2}\left(\frac{\partial^2}{\partial x^2} + \frac{\partial^2}{\partial y^2}\right) = \frac{\sigma^2}{2}\Delta, \qquad (2.2)$$

where the initial condition is $p_{R(0)}(r)=\delta(r-r_0)=p(x, y, 0)=\delta(x-x_0)\delta(y-y_0)$, $\delta(x)$ is the Dirac $\delta$-distribution and the spatial boundary conditions must be appropriately specified. The partial differential operator $\mathcal{L}$ is known as the (infinitesimal) generator of the Markov process and fully characterizes the infinitesimal motion of the particle's probability density. The other Markov processes we shall see are distinguished by their generators.

While Brownian motion has the advantage of capturing the continuity of contours (since realizations are continuous), it has two difficulties for vision. First, sample paths of Brownian motion frequently self-intersect. Not only does this not correspond to actual contours in the world, it also makes the job of filtering more difficult, as we shall see in section 4.6. Second, planar Brownian motion does not represent the local geometry of contours. In particular, since Brownian paths are differentiable almost-nowhere, the tangent does not exist (except on a set of measure zero). Thus planar Brownian motion is a poor model of good continuation, elongated receptive fields in the visual cortex, and the observed edge statistics in natural images, where tangent information is important. The need to capture the local geometry of contours leads us to more elaborate Markov processes.

2.4 Brownian Motion in Direction

To motivate their model for local contour smoothness, Mumford (supra) imagined a particle at $R(t) = (X_t, Y_t, \Theta_t) \in \mathbb{R}^2 \times \mathbb{R}$ whose direction $\Theta_t$ is slightly perturbed at each time instant t before taking its next step forward. Mathematically, this particle can be described by a Markov process with the stochastic differential equation $$\frac{dX}{dt} = \sin\Theta, \frac{dY}{dt} = \cos\Theta, d\Theta = \sigma dW, \quad (2.3)$$

where $\sigma = \sigma_\kappa$ bounds the direction perturbations and W is standard Brownian motion (on the circle $\mathbb{R}$). In this way a fundamental descriptor of the local geometry of curves—the tangent (cos θ, sin θ)—is captured by lifting a planar curve to $\mathbb{R}^2 \times \mathbb{R}$ and making curvature a white noise. This drives the contour randomly while ensuring that the tangent exists. This direction process has the transition density p=p(x, y, θ, t) (at time t) that satisfies the following Fokker-Planck diffusion equation:

$$\frac{\partial p}{\partial t} = \mathcal{L}p, \text{ where } \mathcal{L} = \frac{\sigma^2}{2}\frac{\partial^2}{\partial \theta^2} - \cos\theta\frac{\partial}{\partial x} - \sin\theta\frac{\partial}{\partial y}, \quad (2.4)$$

where the initial condition is $p(x, y, \theta, 0) = \delta(x-x_0)\delta(y-y_0)\delta(\theta-\theta_0)$, p is periodic in θ, and appropriate boundary conditions in x and y must be specified (see section 5.2.1). Weighting by the exponential length distribution, we can illustrate these diffusions by taking an integral over time. For a discussion of numerical techniques for the direction process, see section 5.2.1. Mumford (supra) suggested the direction process as a model for occluded and illusory contours. The covariances of the curve indicator random field (Corollary 4) based on the direction process also resemble several formalizations of good continuation and horizontal interactions in the visual cortex.

As Mumford (supra) has shown, the mode of the distribution of this direction process is described by an elastica, or that planar curve which minimizes the following elastica functional:

$$\int (\beta\kappa^2 + \alpha)dt, \quad (2.5)$$

where $\beta=(2\sigma^2)^{-1}$ and $\alpha=\lambda^{-1}$ is the constant killing. The elastica functional measures the bending-energy of thin splines. Mumford (supra) derived formulas for elastica in terms of theta functions. In computer vision, elasticae have been used to model illusory contours and the completion of boundary gaps (S. Ullman. Filling-in gaps: The shape of subjective contours and a model for their generation. *Biological Cybernetics*, 25:1–6, 1976).

2.5 Brownian Motion in Curvature

Inspired by Gestalt psychology, most previous studies of contour smoothness have focused on good continuity in orientation, that is to say, curves with varying orientation—high curvature—are rejected, and, conversely, straighter curves are enhanced. This is naturally phrased in terms of the elastica functional (2.5) on curves that minimizes curvature. Now we introduce a Markov process model that instead aims to enforce good continuation in curvature, and thus minimizes changes in curvature.

2.5.1 An Analogy

To understand why we believe that good continuation in curvature is important, imagine the situation of a bug trying to "track" a curved contour. Suppose the bug is special in that it can only "search" for its next piece of contour in a cone in front of it centered around its current predicted position and direction (i.e., orientation with polarity). This strategy is appropriate so long as the contour is relatively straight. However, when the bug is on a portion of the contour veering to the right, it will constantly waste time searching to the left, perhaps even mistracking completely if the curvature is too large. In estimation terms, the errors of our searching bug are correlated, a tell-tale clue that the assumption that the contour is straight is biased. A good model would only lead to an unavoidable "uncorrelated" error. We discuss a Markov process that models not only the contour's direction, but also its local curvature.

It may appear that one may avoid these problems altogether by allowing a higher bound on curvature. However, this forces the bug to spend more time searching in a larger cone. In stochastic terms, this larger cone is amounts to asserting that the current (position, direction) state has a weaker influence on the next state; in other words, the prior on contour shape is weaker (less peaked or broader). But a weaker prior will be less able to counteract a weak likelihood (high noise): it will not be robust to noise. Thus we must accept that good continuation models based only on contour direction are forced to choose between allowing high curvature or high noise; they cannot have it both ways.

Although studying curvature is hardly new in vision, modeling it probabilistically began only recently. The closest work in spirit is relaxation labeling (P. Parent and S. W. Zucker. Trace inference, curvature consistency, and curve detection. *IEEE Transactions on Pattern Analysis and Machine Intelligence*, 11(8):823–839, August 1989). Co-circularity (Parent and Zucker, supra) is related to curvature, and was used in Markov random field models for contour enhancement (L. Herault and R. Horaud. Figure-ground discrimination: A combinatorial optimization approach. *IEEE Transactions on Pattern Analysis and Machine Intelligence*, 15(9):899–914, 1993).

We now formally introduce our Markov process in curvature and its diffusion equation; we then present example impulse responses, which act like the "bent" search cones. We also relate the mode of the distribution for the curvature process to an energy functional on smooth curves.

2.5.2 The Mathematics of the Curvature Process

Consider the Markov process that results from making curvature a Brownian motion. This process has state $R(t) =$ $(X, Y, \Theta, K)(t)$, realization $r=(x, y, \theta, \kappa) \in \mathbb{R}^2 \times \mathbb{R} \times \mathbb{R}$, and can be described by the following stochastic differential equation:

$$\frac{dX}{dt} = \cos\Theta, \frac{dY}{dt} = \sin\Theta, \frac{d\Theta}{dt} = K, dK = \sigma dW, \qquad (2.6)$$

where $\sigma = \sigma_\kappa$ is the "standard deviation in curvature change" (see section 2.5.3) and W denotes standard Brownian motion. The corresponding Fokker-Planck diffusion equation for the bug's probability density, is $$\frac{\partial p}{\partial t} = \mathcal{L}p,$$

where $$\mathcal{L} = \frac{\sigma^2}{2}\frac{\partial^2}{\partial \kappa^2} - \cos\theta\frac{\partial}{\partial x} - \sin\theta\frac{\partial}{\partial y} - \kappa\frac{\partial}{\partial \theta} \qquad (2.7)$$

$$= \frac{\sigma^2}{2}\frac{\partial^2}{\partial \kappa^2} - (\cos\theta, \sin\theta, \kappa, 0) \cdot \nabla,$$

where $p=p(x, y, \theta, \kappa, t)=p_{R(t)|R(0)}(r|r_0)$. Observe that this partial differential equation (PDE) describes probability transport in the $(\cos\theta, \sin\theta, \kappa, 0)$-direction at point $r=(x, y, \theta, \kappa)$, and diffusion in $\kappa$. As in the direction process, an extra decay term (Mumford, supra) is also included to penalize length (see section 2.2.2). We have solved this parabolic equation by first analytically integrating the time variable and then discretely computing the solution to the remaining elliptic PDE. See section 5.2.2 for a numerical method used to produce example time-integrated transition densities.

2.5.3 What is the Mode of the Distribution of the Curvature Process?

To get more insight into our random process in curvature, we now consider one of the simplest aspects of its probability distribution: its mode. Given the succinct expression of the mode of the direction process in terms of the elastica functional (2.5), we ask: Is there a corresponding functional for the curvature process? If so, what is its form?

To answer these questions, first we discretize our random curve into N subsections. Then we write out the distribution and observe the discretization of a certain integral that will form our desired energy functional.

Recall that length T is exponentially distributed with mean $\lambda = \alpha^{-1}$. Each step of the N-link approximation to the curve therefore has length $\Delta t := T/N$. Using the definition of the t-derivatives, for example, $$\dot{X} = \frac{dX}{dt} = \lim_{N\to\infty}\frac{X_{i+1} - X_i}{T/N},$$

we can make the approximation $X_{i+1} \approx X_i + \Delta t \dot{X}$, where i is the link index. Recalling the stochastic differential equation (2.7), we therefore let the curvature process be approximated in discrete time by $$X_{i+1} = X_i + \Delta t \cos \Theta_i, Y_{i+1} = Y_i + \Delta t \sin \Theta_i, \Theta_{i+1} = \Theta_i + \Delta t K_i,$$

where $i=1, \ldots, N$. Because Brownian motion has independent increments whose standard deviation grows with the square root $\sqrt{\Delta t}$ of the time increment $\Delta t$, the change in curvature for the discrete process becomes $$K_{i+1} = K_i + \sqrt{\Delta t}\epsilon_i,$$

where $\{\epsilon_i\}$ is an independent and identically distributed set of 0-mean, Gaussian random variables of standard deviation $\sigma = \sigma_\kappa$. Now let the discrete contour be denoted by $$\gamma_N = \{(X_i, Y_i, \Theta_i, K_i): i=0, \ldots, N\}.$$

Given an initial point $p_0 = (x_0, y_0, \theta_0, \kappa_0)$, the probability density for the other points is $$p(\gamma_N | p_0) = \alpha \exp(-\alpha T) \cdot \left(\sqrt{2\pi}\,\sigma\right)^{-N} \exp\left(-\sum_i \frac{\epsilon_i^2}{2\sigma^2}\right),$$

which, by substitution, is proportional to $$\exp\left[-\sum_i \frac{1}{2\sigma^2}\left(\frac{\kappa_{i+1} - \kappa_i}{\Delta t}\right)^2 \Delta t - \alpha T\right].$$

We immediately recognize $$\frac{\kappa_{i+1} - \kappa_i}{\Delta t}$$

as an approximation to $$\frac{d\kappa}{dt} = \dot{\kappa},$$

and so we conclude that $$p(\gamma_N|p_0) \to p(\gamma|p_0) \propto e^{-E(\gamma)} \text{ as } N\to\infty,$$

where the energy $E(\gamma)$ of (continuous) curve $\gamma$ is $$E(\gamma) = \int (\beta\dot{\kappa}^2 + \alpha)dt, \qquad (2.8)$$

and where $\beta = (2\sigma^2)^{-1}$ and $\alpha = \lambda^{-1}$.

Maximizers of the distribution $p(\gamma)$ for the curvature random process are planar curves that minimize the functional $E(\gamma)$, which we call the Euler spiral functional (B. B. Kimia, I. Frankel, and A.-M. Popescu. Euler spiral for shape completion. In K. Boyer and S. Sarkar, editors, *Perceptual Organization for Artificial Vision Systems*, pages 289–309. Kluwer Academic, Boston, 2000). When at $\alpha=0$—when there is no penalty on length—, such curves are known as Euler spirals. A key aspect of the Euler spiral functional (2.8) is that it penalizes changes in curvature, preferring curves with slowly varying curvature. In contrast, the elastica functional (2.5) penalizes curvature itself, and therefore allows only relatively straight curves, to the dismay of the imaginary bug of section 2.5.1. This Euler spiral energy is also loosely related to the notion of co-circularity: the coefficient β would play a role of weighting the "compatibility distance" between a pair of sites $(x, y, \theta, \kappa)$, curvature while the coefficient α would affect the "transport distance" between them. In other words, the integral over $\kappa^2$ in $E(\gamma)$ is a measure of how non-co-circular two tangents are, while the second integral measures how far apart they are, defined as the length of γ, the smooth curve joining them.

2.6 Other Markov Process Models

At the start of this section we suggested the use of Markov processes for a host of contour cues other than the local geometry captured by the direction and curvature processes. The simplest way of extending a Markov process to include this extra information, say contrast C, is to add a component to the state vector and assume that it is a Brownian motion independent of the geometry and other factors. Smoothness in C can be enforced by letting the derivative $\dot{C}$ be a Brownian motion (or even the Ornstein-Uhlenbeck (D. Mumford. *Algebraic Geometry and Its Applications,* chapter Elastica and Computer Vision, pages 491–506. Springer-Verlag, 1994) process suggested in 3-dimensions next), and then appending two components to the state vector (one for the contrast itself, the other for its derivative). Even dependencies among different sources of information, say intensity and geometry, can be modeled using Markov processes, but this is more complex.

While a preferred application of the present invention is curves in the plane, the framework of the invention applies unmodified to higher dimensional images. In medical imaging of vascular structures in CAT and MRI images, one would require random process models of 3-dimensional space curves. With appropriate observation models (see section 4.3), this framework could also be exploited for binocular stereo or even multiview reconstruction of space curves. In these 3-dimensional applications, one could exploit a number of properties similar to the 2-dimensional examples we have discussed. To enforce only continuity one could set the Markov process $R(t)=(X, Y, Z)(t)=(X^{(1)}, X^{(2)}, X^{(3)})(t)$ to the spatial Brownian motion $$dX^{(i)}=\sigma dW^{(i)}, i=1, 2, 3,$$

where $\{W^{(i)}: i=1, 2, 3\}$ are independent, standard Brownian motions. For a random 3-dimensional space curve with smoothness up to the local tangent (similar to the (planar) direction process of section 2.4), Mumford (supra) suggested a Markov process obtained by integrating a Brownian motion on $\mathbb{R}^2$ (the sphere of unit-length tangent vectors). A simpler model would not enforce the unit-length constraint for the tangent vector; instead, the tangent could be 3-dimensional Brownian motion. A slightly more general version of this idea includes a force (of spring constant ε) to ensure that the tangent vector (the particle's velocity $V=(V^{(1)}, V^{(2)}, V^{(3)})$) does not stray too high:

$$\frac{dX^{(i)}}{dt} = V^{(i)}, dV^{(i)} = -\epsilon V^{(i)} dt + \sigma dW^{(i)}, \quad (2.9)$$

where we can eliminate the force by setting ε to zero. The velocity component processes $V^{(i)}$ are known as Ornstein-Uhlenbeck processes. In two-dimensions, these processes were suggested for vision by Mumford (supra). The extension of process (2.9) to include curvature and torsion information is straightforward.

In addition to these Gaussian noise-driven Markov processes, one can construct Markov processes driven by other, heavy-tailed forms of noise. It should be understood that Levy processes (stationary, independent-increment Markov processes) can be used as a generalized replacement for Brownian motion in all of the above Markov processes. In this way discontinuities, or "jumps", in direction (i.e., corners), curvature, and even contrast can be included. We focus on diffusion operators here both because they clearly relate to the differential geometry of curves and because they correspond to the qualitative structure of the edge correlation patterns that can be observed in natural images. When approximated with a discrete state-space, all stationary Markov processes, including those with jumps, fit within our filtering framework.

2.7 A Working Formalism: Continuous-Time, Discrete-State Markov Processes

Having set out the kind of processes we shall ultimately use as uncertain contour models, we need to transition from continuous state-spaces to discrete ones that will support computations relevant for digital images. In this section we therefore briefly establish the notation and basic theory of discrete-state Markov processes.

With a slight abuse of notation, we let $R_t$, where $0 \leq t < T$, denote any stationary continuous-time Markov process taking values in a finite set I of cardinality |I|. Sites or states within I will be denoted i and j. We view I as a discrete approximation to our continuous state-spaces $\mathbb{R}^2 \times \mathbb{R}$, $\mathbb{R}^2 \times \mathbb{R} \times \mathbb{R}$, etc., where our contour random processes takes values. For example, (discrete) state i would represent some continuous state $(x, y, \theta)$ for the direction process, and $R_t$ denotes the (discrete) curve Markov process. As in section 2.2.2, the random variable T is exponentially-distributed with mean value λ, and represents the approximate length of the contour. To ensure finiteness of the expressions in section 3, we further assume $\lambda < \infty$.

The (discrete-space) generator of the Markov process $R_t$ is the $|I| \times |I|$ matrix $L=(l_{ij})$, and is the instantaneous rate of change of the probability transition matrix $P(t)=(p_{ij})(t)$ for $R_t$. Since we assume that the Markov process is stationary, the generator L does not vary with time t. One can obtain the discrete-space generator L by discretizing the continuous-space generator $\mathcal{L}$ appropriately; details are provided in section 5.2.

To enforce the exponential distribution over lifetime (length) T of each particle, we construct a killed Markov process with generator $Q=L-\alpha I$, where $\alpha:=\lambda^{-1}$ as in section 2.2.2. (Formally, we do this by adding a single "death" state ∂ to the discrete state space I. When $t \geq T$, the process enters ∂ and it cannot leave.) Slightly changing our notation again, we shall now use $R_t$ to mean the killed Markov process with generator Q.

The Green's operator $G=(g_{ij})$ of the (killed) Markov process is the matrix $\int_0^\infty e^{Qt} dt = \int_0^\infty P(t) e^{-\alpha t} dt$, where $P(t)=e^{Lt}$ ($e^A$ denotes the matrix exponential of matrix A). (Formally, G is the Green's operator (or Green's matrix) when $\alpha=0$, and is known as the resolvent, resolvent matrix, or resolvent operator for $\alpha \geq 0$.) The $(i, j)$-entry $g_{ij}$ in the Green's matrix represents the expected amount of time that the Markov process $R_t$ spent in j (before death) given that the process started in i. The following is a well-known connection between the generator Q (an approximate differential operator) and the Green's operator G (an approximate integral operator):

Lemma 1. $G=-Q^{-1}$.

Having studied (parameterized) contour models, we remove the parameterization in the next section to construct our prior for contour inference from images.

Section 3

3.1 The Curve Indicator Random Field

Given a Markov process for modeling individual contours, we now define a curve indicator random field (CIRF), which naturally captures the notion of an ideal edge/line map. Roughly, this random field is non-zero-valued along the true contours, and zero-valued elsewhere. The actually measured edge/line map is then viewed as an imperfect CIRF, corrupted by noise, blur, etc. Because the CIRF is not standard, our presentation will be self-contained.

Several independence assumptions play a role in our model. First, we use a memoryless property on contour length T (section 2.2.2), which led to an exponential density for T. Second, we observe that independence of contours is a reasonable approximation for modeling elongated curves. Tree branch contours, for example, statistically interact primarily where they meet; due to the local process of growth, the individual branches wander largely independently. Occlusion is apparently a counter-example, although if we were interested in an "x-ray" view of contour structure, independence may still be a useful approximation. (We shall weaken the independence assumption in section 3.2.1, where contour interactions are described.) Finally, the unknown number of contours is assumed to be Poisson-distributed: in the related context of random point fields, this distribution is natural where disjoint regions contain independent numbers of points.

3.2 Defining the CIRF

Following section 2.7, we focus on continuous-time, discrete-state stationary killed Markov processes $R_t$, where $0 \le t < T$. Let $\mathbb{1}\{\text{condition}\}$ denote the (indicator) function that takes on value 1 if condition is true, and the value 0 otherwise. With this notation, we can define the curve indicator random field V for a single curve as $$V_i := \int_0^T \mathbb{1}\{R_t = i\}dt, \quad \forall i \in I.$$

Observe that $V_i$ is the (random) amount of time that the Markov process spent in state i. In particular, $V_i$ is zero unless the Markov process passed through site i. In the context of Brownian motion or other symmetric processes, V is variously known as the occupation measure or the local time of $R_t$.

Generalizing to multiple curves, we pick a random number N and then choose N independent copies $R_t^{(1)}, \ldots, R_t^{(N)}$ of the Markov process $R_t$, with independent lengths $T_1, \ldots, T_N$, each distributed as T. To define the multiple curve CIRF, we take the super-position of the single-curve CIRFs $V^{(1)}, \ldots, V^{(N)}$ for the N curves.

Definition 1. The curve indicator random field U is defined as $$U_i := \sum_{n=1}^N V_i^{(n)} = \sum_{n=1}^N \int_0^{T_n} \mathbb{1}\{R_{t_n}^{(n)} = i\}dt_n, \quad \forall i \in I.$$

Thus $U_i$ is the total amount of time that all of the Markov processes spent in site i. Again, observe that this definition satisfies the desiderata for an ideal edge/line map suggested in section 1: (1) non-zero valued where the contours are, and (2) zero-valued elsewhere. We emphasize that the curve indicator random field is a different object than the curves used to produce it. First, the CIRF describes a random set of curves; each one is a Markov process. Second, and more importantly, the CIRF is a stochastic function of space, i.e., a random field, whereas each (parameterized) curve is a random function of time. This transformation from a set of random curves to a random field makes the CIRF an idealization of local edge/line responses, and sets the stage for contour enhancement where the probability distribution of U will become our prior for inference.

3.2.1 Global to Local: Contour Intersections and the CIRF

In addition to representing the loss of contour parameterization, the CIRF locally captures the global contour properties of intersection and self-intersection (section 2.2.1). This fact has nothing to do with the particular contour distributions used (Markovianity and independence, for example); it is a consequence of the CIRF definition. A measure of self-intersection, or the lack of simplicity of a contour, is the square of the single-curve CIRF, or $$V_i^2 = \left(\int \mathbb{1}\{R_t = i\}dt\right)\left(\int \mathbb{1}\{R_{t'} = i\}dt'\right) = \int\left(\int \mathbb{1}\{R_{t'} = R_t = i\}dt'\right)dt.$$

To understand why $V_i^2$ measures self-intersection, consider the expression in parentheses on the right: if the process R was in site i at time t, then this expression counts the total amount of time spent in site $i = R_t$; otherwise it is zero. There are two components to this time: (1) the (unavoidable) holding time of $R_t$ in site i (i.e., how much time spent in i for the visit including time t) and (2) the remainder, which evidently must be the time spent in site i before or after the visit that included time t, i.e., the self-intersection time of $R_t = i$. Taking the integral over t, we therefore see that $V_i^2$ is a measure of self-intersection for site i over the entire contour.

A similar calculation can be carried out for the multiple-curve case $U_i^2$, where we will get terms with integrals over the same curve as above (to measure self-intersection), or over a pair of distinct curves where instead we get an analogous intersection or crossing measure. The key is to recognize that a global contour property that requires checking the entire parameterization—intersection—becomes a local property (squaring) of the CIRF. If desired, we could exploit this property to enforce non-intersecting curves by penalizing non-zero values of the square of the CIRF. This would amount to changing our prior to one without our assumed independence among curves, for example. Instead of taking that direction, we first explore what statistical structure can be tractably captured without including intersections. Somewhat surprisingly however, we shall see later (section 4.3) that the square of the CIRF will re-emerge in the likelihood (noise and observation model), penalizing contour intersections automatically.

3.3 Moments of the Single-Curve CIRF

Probabilistic models in vision and pattern recognition have been specified in a number of ways. For example, Markov random field models are specified via clique potentials and Gaussian models are specified via means and covariances. Here, instead of providing the distribution of the curve indicator random field itself, we derive its moment generating functional, from which all moments are then computed.

Although we are interested in the statistics of the general curve indicator random field U, we first consider the simpler, single-curve case. The first step (Prop. 1) is to derive all the moments of the single-curve CIRF V. Then we shall summarize this result as a moment generating functional (Prop. 2).

To prepare for studying these moments, we first recognize the rather pathological nature of the CIRF: realizations of this field are zero except along the curves. While we do not develop this connection here, we observe that when the state space is a continuum, realizations of the analogous CIRF would generally not even be continuous. Loosely, we obtain CIRF in the continuum by replacing the indicators above with Dirac $\delta$-distributions.) Hence we would be faced with generalized functions, or distributions (in the sense of Schwartz, not probability), where the field is probed by taking inner products with (appropriately well-behaved) "test functions".

It is also convenient to use this distribution-theoretic formalism for studying the CIRF on our discrete space I. To do so, we first define the inner product $<a, b> := \Sigma_{i \in I} a_i b_i$. We use a bias vector $c \in \mathbb{R}^{|I|}$ to act as a "probe" or "test function" function on V by taking an inner product:

$$\langle c, V \rangle = \sum_i c_i \int \mathbb{1}\{R_t = i\} dt = \int \sum_i c_i \mathbb{1}\{R_t = i\} dt = \int c(R_t) dt, \quad (3.1)$$

where $c(i)=c_i$. The integral $\int c(R_t)dt$ is known as an additive functional of Markov process $R_t$. In the following, we let $\alpha := \lambda^{-1}$ to simplify expressions. We also introduce a final weighting $v(R_{T-})$ on the state of the curve just before death; v can be used to encourage the curve to end in certain states over others. (We use the notation T− to represent the left limit approaching T from below, i.e., $v(R_{T-})=\lim_{t \uparrow T} v(R_t)$.) Let $\mathbb{E}_i Z$ denote the expected value of the random variable Z given that $R_0=i$, and let $\mathbb{E}_\mu Z$ denote the same expectation except given that $\mathbb{P}\{R_0=i\}=\mu_i$, where $\mu$ is the distribution of the initial point of the curve. To reduce the clutter of many brackets we adopt the convention that the expectation operator applies to all multiplied (functions of) random variables to its right: e.g., $\mathbb{E}f(X)g(Y):=\mathbb{E}[f(X)g(Y)]$. We now provide a formula for the moments of $<c, V>$, a "probed" single-curve CIRF V.

Proposition 1. The k-th moment of $<c, V>$ with initial distribution $\mu$ and final weighting $v=v(i)=v_i$, $i \in I$ is:

$$\mathbb{E}_\mu <c, V>^k v(R_{T-}) = \alpha k! <\mu, (GC)^k Gv>, \quad (3.2)$$

where $C=\text{diag } c$.

3.4 Moment Generating Functional of the Single-Curve CIRF: A Feynman-Kac Formula To obtain a formula for the moment generating functional (MGF) of the single-curve CIRF, we first define the Green's operator $G(c)=G_c$ with (spatially-varying) bias (vector) c as the Green's operator for the killed Markov process with extra killing −c, i.e., having generator $Q(c):=Q+C$, where $C=\text{diag}(c_1, \ldots, c_{|I|})$. The bias c behaves exactly opposite to the decay or death term $\alpha$ in $Q=L-\alpha I$: if $c_i$ is positive, there is a bias towards the creation of particles at site i; if negative, there is a bias towards killing them. By the same reasoning as is needed to prove Lemma 1, we know $G(c):=-Q(c)^{-1}=-(Q+C)^{-1}$. We provide an explicit condition for the invertibility of Q+C later (Prop. 3). We now compute the moment generating functional for the single-curve case using Prop. 1. This is known as the Feynman-Kac formula.

Proposition 2. For all $c \in \mathbb{R}^{|I|}$ such that $|c|$ is sufficiently small, $$\mathbb{E}_\mu \exp<c, V>v(R_{T-})=\alpha<\mu, G(c)v>.$$

Observe that to evaluate the Feynman-Kac formula, one must solve the linear system $(Q+C)h+v=0$ for h. This equation will become a key component in the filters of section 4; numerical methods are described in section 5.2 and section 5.3.

3.4.1 Sufficient Condition for MGF Convergence: Khas'minskii's Condition

The convergence of the Feynman-Kac formula can be characterized by the Khas'-minskii condition, as follows.

Proposition 3. The moment generating functional of the (single-curve) curve indicator random field V converges if $\|G|c|\|_\infty < 1$.

The Khas'minskii condition is easy to check: one just takes the componentwise absolute value of c (which later will be an input), and then "blur" it with the Green's operator G. If any component of the result is greater than 1, the moment generating functional may not converge. As we shall see in section 5.3, this condition will be exploited in our numerical methods for filtering.

3.4.2 Initial and Final Weightings

As the interpretation of the "final weighting" v above may seem mysterious, we now restrict $\mu$ and $v$ to be finite measures satisfying the normalization constraint $1=<\mu, Gv>$. (If this equality is not satisfied, one need only divide by a suitable normalizing constant.)

Corollary 1. Suppose that the joint distribution over initial and final positions is $\mathbb{P}\{R_0=i, R_{T-}=j\}=\mu_i g_{i,j} v_j$. Then the moment generating functional of V, with this joint distribution over initial and final states, is:

$$\mathbb{E}\exp<c, V>=<\mu, G(c)v>. \quad (3.3)$$

Remark 1. Although not studied here, it is interesting to consider the problem of finding those measures $\mu$, $v$ that induce a $\mathbb{P}\{R_0, R_{T-}\}$ with prescribed marginals $\mathbb{P}\{R_0\}$ and $\mathbb{P}\{R_{T-}\}$ over initial and final states respectively.

Since we are most interested in the case where $\mu$ and $v$ are spatially constant, we can forego answering this question now.

The next corollary shows all of the (joint) moments of V. Let $\text{perm}_k$ denote the set of permutations of the integers $1, \ldots, k$.

Corollary 2. If $k \geq 1$ the k-th (joint) moment of V at sites $i_1, \ldots, i_k$ is:

$$\mathbb{E} V_{i,j} \cdots V_{i,k} = \sum_{i,j} \mu_i \nu_j \sum_{a \in perm_k} g_{i i_{a_1}} g_{i_{a_1} i_{a_2}} \cdots g_{i_{a_{k-1}} i_{a_k} j}. \quad (3.4)$$

3.5 Multiple-Curve Moment Generating Functional

In order to model more than one curve in an image, we need a joint distribution over both the number of curves and the curves (and the corresponding CIRFs) themselves. To make our computations concrete, we adopt a Poisson distribution over the number N of curves, and assume conditional independence of the curves given N. To compute the moment generating functional of this (multiple-curve) CIRF as a Poisson distribution over (single-curve) CIRFs, we first consider the general case of Poisson "point" process given a distribution over each point, where point will be interpreted as an entire single-curve CIRF.

3.5.1 The Poisson Measure Construction

We begin with a finite measure P: $F \to \mathbb{R}_+$ over the measure space $(\Omega, F)$, where F is a $\sigma$-algebra, and $\mathbb{R}_+$ denotes the nonnegative real numbers. Intuitively, the finite measure P is the (un-normalized) distribution over "points" $\omega \in \Omega$, where in this disclosure $\omega$ is a curve realization (i.e., a Markov process realization) and $\Omega$ is the set of all possible curves. We shall now define a probability distribution over random configurations $\omega = (\omega_1, \ldots, \omega_N) \in Con(\Omega) := \{\Omega^0 = \emptyset, \Omega^1 = \Omega, \Omega^2 = \Omega \times \Omega, \Omega^3, \ldots\}$, where each $\omega_n$ is a curve in $\Omega$ and N is the random number of curves. In our context, $\Omega^0$ is the 0-curve configuration (no curves), $\Omega^1$ are the one-curve configurations (the set of single curves), $\Omega^2$ are the two-curve configurations (the set of pairs of curves), and so on. We now compute the Poisson point measure via its expectation $\mathbb{E}F$ on any (measurable) function F: $Con(\Omega) \to \mathbb{R}$ (clearly this defines a probability distribution for we could take F as an indicator over any (measurable) subset of $Con(\Omega)$ to get its probability).

Proposition 4. Suppose N is a Poisson deviate with mean $P(\Omega)$. Further suppose that the points $\omega_1, \ldots, \omega_n$ are (conditionally) independent and identically distributed with $P(\cdot)/F(\Omega)$, given N=n. Then:

$$\mathbb{E}F := \sum_{n=0}^{\infty} \frac{e^{-P(\Omega)}}{n!} \int_{\Omega^n} F(\omega_1, \ldots, \omega_n) P(d\omega_1) \ldots P(d\omega_n). \quad (3.5)$$

3.5.2 Application to the MGF of the Curve Indicator Random Field for Multiple Curves We now finally consider the joint distribution over many curves. Suppose there are N contours on average, and that $\mu$ and $\nu$ are finite measures on I (vectors in $\mathbb{R}^{|I|}$), characterizing the initial and final positions, respectively, of the Markov processes $\{R_t^{(n)}: n=1, \ldots, N\}$. As before, these measures satisfy the normalization constraint $<\mu, G\nu>=1$.

For general-purpose contour enhancement, we typically have no a-priori preference for the start and end locations of each contour, and so we would set these measures proportional to the constant vector $1=(1, \ldots, 1)$. One can show that by letting $\mu_i = |I|^{-1}$, $\nu_i = \lambda^{-1}$, $\forall i \in I$, the above constraint is satisfied. We now state a key theoretical result.

Proposition 5. Suppose the inital distribution $\mu$ and final weighting $\nu$ satisfy the normalization constraint $<\mu, G\nu>=1$. Then the moment generating functional of the curve indicator random field U is $$\mathbb{E} \exp<c, U> = \exp<\mu, N(G(c)-G)\nu>.$$

3.5.3 Cumulants of the CIRF

While Prop. 5 may seem abstract, it is actually very useful. First observe that how similar in form it is to the single-curve case. More importantly, with Prop. 5 we can compute the higher-order cumulants of U (recall that the moments define the cumulants and vice versa):

Corollary 3. If $k \geq 1$, the k-th (joint) cumulant of the curve indicator random field U at sites $i_1, \ldots, i_k$ is $$cum\{U_{i_1}, \ldots, U_{i_k}\} = \mathcal{N} \sum_{i,j} \mu_i \nu_j \sum_{a \in perm_k} g_{i i_{a_1}} g_{i_{a_1} i_{a_2}} \cdots g_{i_{a_{k-1}} i_{a_k} j}. \quad (3.6)$$

The cumulant formula has a simple interpretation. First recall that the Green's operator entry $g_{ij}$ is the expected amount of time spent by $R_t$ in state j given that it started in i. For any ordering of the k points we take the product of the $g_{ij}$'s for the successive points in order (the first and last factors deal with the initial and final points). Since the contour could have passed through the points in any order, all permutations must be considered.

Letting G* denote the transpose of G, we can rephrase corollary 3 to show the mean and covariance of the CIRF.

Corollary 4. Suppose that $\mu_i = |I|^{-1}$, $\nu_i = \lambda^{-1}$, $\forall i \in I$, and let $\eta = N \lambda |I|^{-1}$. The mean of the curve indicator random field U is $\mathbb{E}U_i = \eta$, $\forall i \in I$. The covariance matrix of U is cov $U = \eta(G + G^*)$.

While the covariance pattern for the direction process expresses good continuation as local straightness, the covariance pattern for the curvature process captures the local circularity of contours.

Note that by Corollary 3, the cumulants of U of order greater than two are generally not zero, proving the following:

Corollary 5. The curve indicator random field U is non-Gaussian.

Although non-Gaussianity is often difficult to handle, in our case it is easier because we have an explicit, tractable expression of the CIRF's moment generating functional. We shall directly exploit the structure of the statistics of the CIRF in the filters we develop in section 4.

Section 4

4.1 Filtering Corrupted CIRFs

In this section we focus on a central objective of this invention:

Suppose an unknown number of contours are located within a set of sites I. Consider the question $Q_i$: "Did a curve pass through location i?"

Task: Given a corrupted image of the curves in I, compute the optimal answer to question $Q_i$, for all i in I.

Unfortunately, this task definition leaves a number of crucial questions unanswered, such as:
1. What is an image of contours?
2. How is the curve indicator field related to the $\{Q_i\}$?
3. What do we mean by corruption?
4. What do we mean by "optimal"? Is this notion unique? If not, which optimal is optimal?

5. What is the optimal answer? Is it computable? If so, is the computation tractable?

In this section we first consider the conceptual issues raised by questions (1) through (4) above, leading to a clearer formal specification of what will become our filtering Task. We then handle question (5) by providing derivations of several linear and nonlinear filters that approximately satisfy our exact specification of filtering noisy contour images.

Before addressing these issues, let us consider whether it is worth the effort to perform this Task at all. Certainly boundary representations of our natural world have been with us for a long time: even early cave drawings exhibited clear contour structure, and artists have obsessed over lines ever since. In computer vision and image processing, researchers have been interested in curves to support a host of computations, including object recognition, tracking, and image compression. However, the natural task would seem to be that of estimating the curves themselves, not whether a curve had passed through a given point. Because we shall return to this issue in section 4.10, at this point we only mention that successfully performing our Task supports the computation of the curves themselves via an edge-linking procedure.

On the surface, satisfying our objective appears startlingly simple: it seems one should simply take one pass over the image, where for each site i one makes a decision, perhaps based on a pixel value or local edge operator output. Unfortunately, in a wide variety of situations the results of this procedure are unsatisfactory, and a number of attempts at more sophisticated computations have proved insufficient to sway the field into depending upon low-level contour information. This invention tackles this contour finding problem at the root by defining the problem exactly in a well-understood probabilistic inference framework, and then systematically deriving procedures for (approximately) solving it.

We begin by relating the questions $\{Q_i\}$ to the curve indicator random field. Because the correct answer to $Q_i$ is "yes" or "no," and because we are uncertain about the correct answer, we can associate a binary random variable with site i, whose value will be 1 if a curve passed through site i and 0 if not. Recalling that the curve indicator random field $U_i$ is the total amount of time spent at i by any curve, the correct answer to $Q_i$ can be exactly represented by the binary curve indicator random field $U_i^{>0} := \mathbb{1}\{U_i > 0\}$, where i is in I. Notice that $U^{>0}$ captures a complete notion of what we mean by an ideal edge or line map, or what we shall call a (perfect) image of curves, or contour image. Let the measurement vector m denote the given corrupted contour image. Because we are uncertain about the exact pattern of corruption, it is natural to view m as a realization of a measurement random field M. Therefore our Task is one of determining $U^{>0}$, given the measurements m.

4.2 Bayes Decision Theory

Realize that our Task mandates that we make a particular decision about $U^{>0}$, i.e., that we form some estimate $\widetilde{u^{>0}}$ of $U^{>0}$. Because $U^{>0}$ and M are random, our Task therefore falls under the purview of Bayes decision theory, which we review now.

Suppose we seek to make a decision D about an unknown state of nature $X = x \in X$ distributed with prior p(x), given only observation $Y = y$ (conditioned upon the unknown x) distributed with likelihood p(y|x). The loss function loss(x, D) specifies the penalty incurred by making decision D given that the state of nature was in fact x. Because this decision is based upon the observations, we know D is a mapping associating the decision D(y) to the observation y. We focus on that class of decision problems where the decision D is an estimate of the unknown x. The goal in Bayes decision theory is to select that (Bayes) decision rule or estimator $\tilde{x} = \tilde{x}(y)$ which minimizes the expected loss given y, or $$\tilde{x}(y) := \arg\min \mathbb{E}[\text{loss}(X, x)|y]. \qquad (4.1)$$

The Bayes risk $\mathbb{E}[\text{loss}(X, \tilde{x}(Y))]$ is the overall expected loss (averaged over all observations Y) for the Bayes estimator.

4.2.1 Previous Estimation Problems

Bayesian and related techniques for estimation have a long history in signal process, image processing, and computer vision. These methods emphasize the tension between fidelity to observation (as defined by the likelihood) and some assumed structure or regularity in the unknown (as defined by the prior). Early work was with 1-dimensional signals for communications applications. The Wiener filter exploited knowledge of signal and noise correlations to minimize mean squared error. For the Kalman-Bucy filter, the unknown signal (a function of time) is modeled by a (possibly time-varying) linear stochastic system (with finite dimensional state-space) and the observations have additive Gaussian noise; the filter provides an optimal estimate of the state of the system given the past observations. Hidden Markov models (HMMS) generalize the Kalman-Bucy filter to handle nonlinear systems by allowing (general) Markov process signal models (whose state is hidden) and general (state-dependent) observation models; a major application of HMMS has been speech recognition. Particle filters, which approximate the distribution over the unknown current state of the process with a large number of particles, have been used for visual tracking and mobile robot localization. In binocular stereopsis, Markov processes have also been used to model the unknown disparity signal, where the observation comes from a stero image pair.

Extending these statistical techniques to general image processing applications requires making the transition from random processes to random fields. For additive Gaussian observations with a Gaussian prior, the extension from the 1-dimensional case to 2-dimensional image restoration applications is straightforward. An interesting application of Bayesian methods relates to the restoration of CCD images of galaxies, where observation nonlinearities are explicitly handled. More generally, Markov random fields (MRFS) have been used to capture local image interactions for many image processing and vision applications. While early applications required hand-tuning of parameters the MRF, recent work has been more data-driven, with learning procedures such as minimax entropy. Energy minimization, or physics-based, approaches to computer vision are closely related to Bayesian methods; applications include the reconstruction of images with discontinuities and the local optimization of a contour to image information. Clearly, estimation has important place in signal processing, image processing, and computer vision.

To relate the Bayes decision framework to our Task, we note that the unknown state of nature X above is our contour image $U^{>0}$ and the observation Y above is the measurement random field M. This answers two of the questions we began with in this section. First, corruption of an image of contours is simply the random mapping taking $U^{>0}$ to M, and is completely characterized by the likelihood $p(m|u^{>0})$. Second, Bayes decision theory does not provide a unique notion of optimality, because the loss function must be specified. We shall return to this latter issue in section 4.2.2.

The requirement of making a decision sets Bayes decision theory apart from related work such as "pure Bayesianism," which merely reports the posterior distribution p(x|y) without making a decision. Decision theory is similar to game theory both in that an action will be taken and that the loss function is qualitatively comparable to the payoffs; the difference lies in the notions of randomness employed. In game theory the task is often to determine the equilibria, or marginal distributions over the unknowns $X_i$, i=1, ..., n; the observations Y can be used to bias toward particular strategies via strategy-specific payoffs. In decision theory, the observations are included via the likelihood.

The likelihood is the centerpiece of inferences made by the classical statistical school, where the existence of the (Bayesian) prior is denied. In the context of edge detection in computer vision, this amounts to an assertion that all binary functions of i are equally preferable—a uniform prior on edge maps—; only the likelihood and loss function can be used to make the decision. If the measurements are local and conditionally independent (i.e., $p(m|u^{>0})=\Pi_i p(m_i|u_i^{>0})$), which is a common assumption, and if the loss is additive (see section 4.2.2), then one is forced to do sitewise thresholding. The primary difficulty with this uniform prior is that it completely ignores the rich structure of images of curves. Not only are contour images often sparse, but their non-zero regions have a stereotyped behaviour: they are curves! Even the relatively simple Markov process-based CIRF model of contour images is highly non-uniform, even non-Gaussian, as we saw in section 3. The application of Bayes decision theory to our contour Task allows us to consistently exploit this known structure, to hallucinate contour-ness into images to overcome the ambiguities introduced by our imperfect measurements. Gestalt psychologists noted this idea qualitatively in the principle of good continuation. Even earlier Helmholtz suggested that the visual system is performing "unconscious inference," where our perceptions are biased towards expected structure in the world.

4.2.2 Loss Functions: which Best is Best?

Given this background, we now proceed to apply Bayes estimation for optimally determining $U^{>0}$. However, we still need to select a loss function to make our answer unique. It is well-known that the loss function can significantly influence an estimate when the posterior is not peaked, so we shall take some care in our choice. But because we are seeking a binary random field, our loss function is limited to the set of mappings from $\{0, 1\}^{|\mathcal{I}|} \times \{0, 1\}^{|\mathcal{I}|}$ to $\mathbb{R}$. Even that set of possibilities is huge, so we focus on two opposite extremes: the 0/1 and the (symmetric, uniform) additive losses.

The 0/1 loss assigns a penalty of 1 if the estimate is different from the true unknown, and 0 only if the estimate is correct. It is a standard exercise to show that the Bayes estimate under a 0/1 loss is exactly the maximum a posteriori (MAP) estimate, or posterior mode. Estimating an unknown by choosing the most probable possibility is so intuitive and so common that many applications of Bayes rule are (almost) synonymous with MAP estimation. Since the Bayes risk of the MAP estimate is the probability of error, the appeal of MAP estimation is obvious: who would want more error than the minimum?

Unfortunately, the basic property that the 0/1 loss function underlying MAP estimation penalizes all errors equally may be inappropriate for many image analysis applications, especially our contour Task. For example, whether the estimate was incorrect at only one site or at half of the sites would not influence the penalty. What would be preferable is a measure that gracefully degrades with the difficulty of the task.

Symmetric, uniform, additive loss functions take a sum of site-wise errors (for binary images) and therefore their Bayes risk is the minimum average number of site-wise errors. Unlike the 0/1 loss, this site-wise error count does not abruptly change with any error at all, rather it gradually increases as the estimate becomes poorer. Perhaps it is the existence of two notions of "error rate" that has helped maintain the popularity of MAP in modern image analysis applications, long after early successes in pattern recognition. On the one hand there is the probability of (an) error (0/1 loss); on the other, there is the probable number of errors, or probable error rate (additive loss). At low noise levels, the difference between additive and 0/1 losses may be small. At high noise levels, however, MAP estimates of binary fields are particularly poor compared to estimates based on an additive loss.

4.2.3 Minimum Mean Squared Error Filtering

For binary image problems, this additive loss function is equivalent to the squared-error loss, or the sum of the squares of the differences between the true unknown and the estimate. Thus minimizing the additive loss amounts to choosing that binary field that minimizes the mean squared error (MMSE), or to computing $$\tilde{u}^{>0} = \arg\min_{b \in \{0,1\}^{|\mathcal{I}|}} \mathbb{E}_m \|U^{>0} - b\|^2 \qquad (4.2)$$

$$= \arg\min_{b \in \{0,1\}^{|\mathcal{I}|}} \sum_i \mathbb{E}_m (U_i^{>0} - b_i)^2$$

$$= \left(\arg\min_{b_1 \in \{0,1\}} \mathbb{E}_m (U_1^{>0} - b_1)^2, \ldots, \arg\min_{b_{|\mathcal{I}|} \in \{0,1\}} \mathbb{E}_m (U_{|\mathcal{I}|}^{>0} - b_{|\mathcal{I}|})^2\right), \qquad (4.3)$$

where the last line follows from the second because the terms in the sum of positive numbers can be optimized independently. Thus the additive loss provides an added benefit in complexity: we have a separation of the joint estimation problem over $2^{|\mathcal{I}|}$ possibilities into $|\mathcal{I}|$ single-site problems of two possibilities each. Also, the $|\mathcal{I}|$ separate expectations are taken with respect to the marginal distributions $p(u_i^{>0}|m)$, not the complicated joint distribution. In real-valued problems, one can expect the marginals to be better behaved (smoother) than the joint, since each marginalization is an integration process. (In this binary problem, the marginals are so "smooth" they are a function of a single number!) Thus MMSE estimation many not only be more relevant to image analysis than MAP estimation, it may be easier as well.

4.2.4 Bounding the MMSE Estimate of the Binary CIRF with a Thresholded Posterior Mean of the CIRF Now that we have refined our original Task to that of computing the MMSE estimate $\tilde{u}^{>0}(m)$ of the binary CIRF $U^{>0}$ given measurements m, we would like to articulate this goal in terms of the (non-binary) CIRF U, for which we have a complete and tractable statistical characterization. While it is obvious that $U^{>0}$ and U are related, the extent to which knowledge about U can help us in estimating $U^{>0}$ is not. In this section we show that $\tilde{u}^{>0}(m)$ and a thresholding of $\mathbb{E}_m U$ are intimately related by a simple inequality.

Because the squared-error loss is additive, we saw in (4.3) that we can focus on the problem of finding the MMSE estimate $\widetilde{u}^{>0}(m)$ at site i, which can be expressed as $$\widetilde{u}_i^{>0}(m) = \arg\min_{b_i \in \{0,1\}} \mathbb{E}_m(U_i^{>0} - b_i)^2 \qquad (4.4)$$

$$= \arg\min_{b_i \in \{0,1\}} \mathbb{E}_m(U_i^{>0})^2 - 2b_i\mathbb{E}_mU^{>0} + b_i^2$$

$$= \arg\min_{b_i \in \{0,1\}} (\mathbb{E}_mU_i^{>0} - b_i)^2$$

$$= \begin{cases} 1, & \text{if } \mathbb{E}_mU_i^{>0} \geq \frac{1}{2} \\ 0, & \text{else} \end{cases}$$

$$= : \mathbb{1}\{\mathbb{E}_mU_i^{>0} \geq 1/2\}.$$

Thus the MMSE estimate of our binary field is its thresholded posterior mean, suggesting that we first seek to relate the posterior means of $U_i^{>0}$ and $U_i$, and then threshold.

Before pursuing that relationship, we first study an intermediary, the hitting random field H, where $H_i \in \{0, 1, 2, \ldots\}$ is the total number times that site i was hit by any curve Markov process. Observe that the binary CIRF is a simple thresholding of the hitting random field, i.e., $$U_i^{>0} = \mathbb{1}\{H_i > 0\}, \qquad (4.5)$$

and so any function of $U^{>0}$ is also a function of H. In particular, while it might appear most natural to assume that our measurements are a corrupted version of the binary CIRF $U^{>0}$, there is no loss in generality in assuming that our measurement random field M is a function M(H, N), where N is some noise vector independent of the curves.

Let $\tau_i$ denote the average amount of time that the curve Markov process spends in site i each time it hits i (without conditioning on m). It can be shown that $\tau_i = -1/q_{ii}$, where $Q=(q_{ij})$ is the generator of the killed Markov process (if the Markov processes is spatially homogeneous (see section 4.7.3), then $\tau_i$ does not vary with i). The following lemma relates the posterior means of the curve indicator and hitting random fields by the scalar factor $\tau_i$.

Lemma 2. Suppose that m is a realization of the measurement random field M=M(H, N), where noise N is independent of the curve Markov processes (and thus the hitting random field H and the CIRF U). Then:

$$\mathbb{E}_m U_i = \tau_i \mathbb{E}_m H_i, \forall i \in I,$$

where $\tau_i$ is the average time spent in site i per visit.

Given this connection between U and H, we are now in a position to show that the thresholded posterior mean of the CIRF U is an upper bound on the MMSE estimate $\widetilde{u}^{>0}$ of the binary curve random field $U^{>0}$.

Proposition 6. Suppose that m is a realization of the measurement random field M=M(H, N), where noise N is independent of the curve Markov processes. Then the MMSE estimate of $U^{>0}$ given m is bounded from above by a thresholded posterior mean of the CIRF, or $$\widetilde{u}^{>0}_i(m) = \mathbb{1}\{\mathbb{E}_mU_i^{>0} \geq \frac{1}{2}\} \leq \mathbb{1}\{\mathbb{E}_mU_i \geq \tau_i/2\}, \forall i \in I, \qquad (4.6)$$

where $\tau_i$ is the average time spent in site i per visit.

Proposition 6 enables us to connect the (non-binary) CIRF U to our binary decision problem. This upper bound has a simple interpretation: the thresholded posterior mean of the CIRF can have no more misses than $\widetilde{u}^{>0}$; it can only have more false positives. Because of this close relationship, in the rest of this disclosure we shall approximate the MMSE estimate of $U^{>0}$ given m with the thresholded posterior mean of the CIRF U. Since thresholding is trivial, we shall define our filtering problem to be the computation of the CIRF posterior mean $\mathbb{E}_m U$ only. In statistical language, the posterior mean $\mathbb{E}_m U$ is known as the regression of U on m.

It is well-known that the posterior mean is the MMSE estimate for real-valued random variables, and therefore our goal is equivalent to the computation of the MMSE estimate of U given m. In many non-Gaussian cases the posterior mean can be difficult to compute; in our context, however, we are fortunate to have tractable formulas for the cumulants and moment generating functional to simplify our computations. Before developing linear and nonlinear MMSE CIRF filters that leverage these formulas, we shall present our observation model.

4.3 Observation Models and Likelihoods

Although the CIRF has been the focus of sections 2 and 3, it is only part of the contour inferencing story: the prior. Another key component is the likelihood, which we consider here.

4.3.1 The Gaussian Likelihood

The likelihood represents how our ideal contour image relates to the measurements, and therefore it characterizes the corruptions in local edge and line operator responses, or how observed contours are non-ideal. For example, edges are blurry, in the sense that edge operators have an associated scale. Equally important is the random noise in edge measurements: even for intensity images with high signal-to-noise ratio (SNR), edges can still be noisy for two reasons. Most fundamentally, edge detection requires differentiation, which amplifies noise. In addition, when the local contrast (i.e., signal) is low, the local SNR drops for fixed sensor noise.

One way of specifying such sources of corruption is to write an observation equation that relates the unknowns to the observations. Although one can consider much more general models, both for concreteness and simplicity we assume that the measurements are a linear function of the CIRF plus Gaussian noise N with zero-mean and covariance operator $\Sigma_N$, or M=BU+N, where $B \in \mathbb{R}^{|I| \times |I|}$ is a linear operator used to model the local edge or line filtering and blur. This observation equation gives rise to the following Gaussian likelihood that models noise and blur:

$$p(m|u) = (2\pi)^{-|x|/2}\left(\det\sum_N\right)^{-1/2}\exp\left[-\frac{1}{2}\left\langle m - Bu, \sum_N^{-1}(m-Bu)\right\rangle\right]. \qquad (4.7)$$

We stress that the linear operator B is quite flexible: not only can it be a standard blur operator, but it can also represent more fundamental aspects of observation. For example, in the case where I is the discretized three-dimensional (x, y, θ)-space and M is a two-dimensional image, B would be the (discrete) linear projection that integrates along θ. It can also capture the image derivatives used in local edge and line operators as well, and thus the operator B need not even perform blurring. Noise structure can be partially captured by non-diagonal noise covarainace operator $\Sigma_N$, i.e., the correlated noise can be handled.

One may object with this likelihood model on the grounds that the measurement is a now function of the CIRF U, not the more natural binary CIRF $U^{>0}$ or even hitting random field H. Indeed, Proposition 6 required that M=M(H, N), not M=M(U, N), and we are therefore introducing another approximation with this CIRF-dependent likelihood model. The key difference between U and H is an additional holding-time "noise" from the continuous-time, discrete-state Markov processes. At least for those cases where the kernel for B is positive and has large support (i.e., B is a large scale blur operator) and where $\tau_i = \tau$ for all i, the approximation BU≈τBH may be very good because the holding times are independent, have finite variance and therefore the central limit theorem applies. As the spatial discretization becomes finer but the absolute scale of the blur kernel remains fixed, this large (discrete) scale requirement will be met.

4.3.2 Log-Likelihoods with Quadratic Dependence on the CIRF

The Gaussian is an example of a more general class of quadratic log-likelihoods with $$\ln p(m|u) = \epsilon <a+Au,\ u> + \text{constant}, \quad (4.8)$$

where A is a symmetric, nonnegative definite matrix, and vector a and the constant are functions of the measurement vector m. To relate this class to the Gaussian likelihood (4.7), we set $$\epsilon a = B * \sum_N^{-1} m \text{ and } \epsilon A = -\frac{1}{2} B * \sum_N^{-1} B.$$

The coefficient $\epsilon$ is introduced to capture the degree of noise; when the noise is white ($\Sigma_N = \sigma_N^2 I$), this coefficient could be used to represent the inverse noise variance, or $\epsilon = \sigma_N^{-2}$. Although for the Gaussian, the vector a is linear in the measurements, the quadratic log-likelihood allows a to be a general functions of m. Indeed, all of the nonlinear filters we shall be presenting allow a to be any (measurable) function of m. Some non-Gaussian observation models can be handled using this freedom in a and A by a change of variables to a Gaussian model. For example, multiplicative noise can be modeled using a logarithmic change of variables to additive Gaussian white noise. We present another non-Gaussian example of the quadratic log-likelihood next.

4.3.3 Exploiting Empirical Distributions of Local Operators

Suppose we have training data in the form of a number of curve images and their corrupted counterparts. How could we use information gathered from this data to empirically derive our likelihood function?

One way of doing this is to construct an observation model that only considers whether a contour hit a site or not by determining the "on" and "off" edge responses. To formalize this, we set up a likelihood in terms of the binary CIRF $U^{>0}$, where $U_i^{>0}=1$ only when at least one of the contours passed sometime through site i, and 0 otherwise. To simplify the situation, we focus on the class of conditionally independent, local likelihoods: $p(m|u^{>0})=p(m_1|u_1^{>0}) \ldots p(m_{|I|}|u_{|I|}^{>0})$. We consider two distributions over measurements at site i: the "on" distribution $p_{on}(m_i):=p(m_i|u_i^{>0}=1)$ and "off" distribution $p_{off}(m_i):=p(m_i|u_i^{>0}=0)$. (Spatial homogeneity is implicit here: the "on" and "off" distributions are assumed not to depend on i, although this can be relaxed.) Such distributions can approximated with histograms obtained from the training data. It follows that ln $$p(m \mid u^{>0}) = \sum_i u_i^{>0} \ln \frac{p_{on}(m_i)}{p_{off}(m_i)} + \sum_i \ln p_{off}(m_i).$$

Letting τ again be the average amount of time that the Markov process spends in a site per hit of the site, observe that $U_i/\tau$ and $U_i^{>0}$ are equal on average, as long as each site gets hit at most once. Ignoring this latter condition for a moment, one can heuristically try to create a likelihood conditioned on u by replacing $u^{>0}$ with u/τ above: ln p(m|u) ≈$\epsilon \Sigma_i a_i u_i$+constant(m)=$\epsilon$<a, u>+constant(m), where $$a_i = a_i(m_i) := \tau^{-1} \ln \frac{p_{on}(m_i)}{p_{off}(m_i)} \text{ and } \epsilon = 1.$$

To ensure normalizability, we include a term $\epsilon$<Au, u> in the likelihood, where $$A = -\frac{1}{2} I,$$

and so obtain a valid quadratic log-likelihood in the form of (4.8). Observe that this log-likelihood has quadratic dependence on u, but possibly nonlinear dependence on m. The norm-squared $\|u\|^2 = -2<Au, u>$ measures the self-interaction of the CIRF; specifically, this term is $\Sigma_i u_i^2$, or the sum of the measure of the self-intersections and crossings of the curves as described in section 3.2.1. This quadratic term therfore penalizes violations of the above condition that a site gets hit at most once. (To further penalize intersections, one can replace the old prior P(du) with a modified prior $Z_\beta^{-1} \exp(-\beta\|u\|^2)P(du)$, where $Z_\beta := \int \exp(-\beta\|u\|^2)P(du)$. See section 4.4 for notation.) This empirical model can also be combined with the 3-d to 2-d projection discussed in the Gaussian case by modifying A appropriately if the training observations are two-dimensional.

4.4 The Posterior Distribution

In this section we set up some notation for gluing together the likelihood with the prior to form the posterior. We write the CIRF prior as $P(du):=P_U(du)=\mathbb{P}\{U \in du\}$ and combine it with the likelihood $p(m|u):=p_{M|U}(m|u)$ using Bayes' rule to obtain the posterior $$P(du \mid m) = \frac{p(m \mid u)P(du)}{p(m)},$$

where $p(m):=\int p(m|u)P(du)$. If U had a density $p_U(u)$, then $P(du)=p_U(u)du$. Instead we use the general notation P(du) for the distribution of U since a density exists for CIRF U only in a generalized sense. Specifically, at each site i there is positive mass for $u_i=0$. Combined with our quadratic log-likelihood (4.8), the posterior is therefore $$P_{(\epsilon)}(du) = Z_{(\epsilon)}^{-1} \exp(\epsilon <a+Au,\ u>)P(du),$$

where $Z_{(\epsilon)} := \int \exp(\epsilon <a+Au, u>)P(du)$ and the subscript with $\epsilon$ indicates the quadratic log-likelihood. Note that although we do not have an explicit expression for the prior P(du)

(and therefore no explicit expression for this posterior), we can indirectly use the prior for U through its moment generating functional (MGF). An even simpler way of using the MGF is via the cumulants. We start by applying the mean and covariance in section 4.5 on linear filtering, and later use higher-order statistics for Volterra filters in section 4.6. Finally, we exploit all orders of the CIRF statistics by explicitly using the MGF to represent a filter in section 4.8.

4.5 The Linear Case

Although one may consider all statistical properties of the curve indicator random field, even the pair-wise relations express information critical to enhancing curves. As Gaussian random fields are fully defined by their means and covariances, in this section we simplify our contour filtering problem by replacing the CIRF prior with a Gaussian approximation $p_{Gaussian}(u)$ with the mean $\mu_U$ and covariance $\Sigma_U$ from Corollary 4. Under this approximation, we can write the log-prior as $$\ln p_{Gaussian}(u) = -\frac{1}{2}\left\langle u - \mu_U, \sum_U^{-1}(u - \mu_U)\right\rangle + \text{constant}(m)$$

$$= \left\langle \sum_U^{-1}\mu_U, u\right\rangle - \frac{1}{2}\left\langle \sum_U^{-1}u, u\right\rangle + \text{constant}(m).$$

Combined with the quadratic log-likelihood (4.8) we get the following quadratic log-posterior (implying the posterior is Gaussian):

$$\ln p_{Gaussian}(u \mid m) = \ln p(m \mid u) + \ln p_{Gaussian}(u) + \text{constant}(m)$$

$$= \left\langle \epsilon a + \sum_U^{-1}\mu_U, u\right\rangle + \left\langle \left(\epsilon A - \frac{1}{2}\sum_U^{-1}\right)u, u\right\rangle +$$

constant(m).

Since the mean is equal to the mode for the Gaussian, we can obtain the posterior mean for the Gaussian approximation to the CIRF by differentiating the log-posterior with respect to u and then equating the result to 0. The posterior mean for the (general) quadratic log-likelihood is therefore $$u_{\tilde{Gaussian}} = \left(\sum_U^{-1} - 2\epsilon A\right)^{-1}\left(\epsilon a + \sum_U^{-1}\mu U\right), \quad (4.9)$$

which is equal to $(\Sigma_U^{-1}+B^*\Sigma_N^{-1}B)^{-1}(B^*\Sigma_N^{-1}m+\Sigma_U^{-1}\mu_U)$ for the Gaussian log-likelihood corresponding to the observation model M BU+N, as in section 4.3. The resulting posterior mean is a linear filtering of the measurements m by the operator $(\Sigma_U^{-1}+B^*\Sigma_N^{-1}B)^{-1}B^*\Sigma_N^{-1}$ (plus a fixed vector).

For the Gaussian likelihood case, this linear filter is known in image restoration as a Wiener filter. The novelty in this application of the Wiener filter is that it operates in the higher-dimensional spaces where curves live, not two-dimensional intensity images. For the direction Markov process, this amounts to linear filtering in position (x, y) and orientation θ, and therefore our linear filter is an oriented Wiener filter. The domain of the random fields we are filtering is not the (discretized) image plane $\mathbb{R}^2$, but instead the unit-length tangent bundle $\mathbb{R}^2 \times \mathbb{R}$. When applied to the curvature Markov process, we obtain linear filtering in $\mathbb{R}^2 \times \mathbb{R} \times \mathbb{R}$. Other Markov process curve models will lead to filtering in other spaces.

Note again the presence of the measurement operator B. Using it, we can explicitly capture the imprecision in edges due to the finite aperture of edge operators. Clearly, we seek an estimate of the underlying curve indicator random field in which the edge strength is localized in position and direction, i.e., we wish to de-blur edge measurement fields on $\mathbb{R}^2 \times \mathbb{R}$. Our filter is able to perform such de-blurring by combining the blur operator B, the noise model, and curve indicator random field covariance.

4.5.1 Why Simple Cells and Local Edge Operators are Elongated

When the existence of cells in primate visual cortex that respond to edge and bar stimuli was found, a connection between physiology and geometry was established. Unfortunately, no theory deriving the qualitative features of the receptive field for even their "simple cell" has been provided. Recall that there are two key "directions" of the receptive field: normal and tangential to the major axis of the receptive field. Since the receptive fields of simple cells resemble the kernels of (oriented) local edge and line operators, understanding the rationale for one explains the other. The normal profile is generally understood functionally as a kind of blurred differentiation (Canny, supra) using the theory of regularization. The tangential profile, with its elongated structure, is more poorly understood. Nonetheless many have designed elongated filters where the tangential profile is explained using a variety of theories, such as an uncertainty principle, Hilbert space representations, or increased noise immunity. The CIRF linear filter corresponding to the direction process provides a much simpler explanation for the simple cell receptive field: it is tuned to find contour structure in the visual world. Using this idea, one can relate the length and aspect ratio of the simple cell receptive field to the expected length and curvature bound on contours that the cell can measure.

But does the curve indicator random field provide more than a contour-based explanation for elongated linear filtering? To answer this question, we shall have to go beyond the connection between linear filtering and second-order statistics.

4.6 Volterra Filters and Higher-Order Statistics

Volterra filters constitute one class of nonlinear filters that subsumes linear filters. Even though most work on Volterra filtering is done on time-domain sequences, we shall apply these ideas to multidimensional signals (functions on $\mathbb{R}^2 \times \mathbb{R}$, for example) or on vectors $m=(m_i)$, where i is a site in I. By definition, the output of a Volterra filter is a polynomial function of the input signal. Although Volterra filters are (generally) nonlinear, they can always be represented as a linear function of products of the input m. A k-th order Volterra filter is a linear function of 0- through k-fold products of the input; for example, a quadratic (second-order) Volterra filter can be written as a linear combination of a constant, the input $m_i$ at site i, and the products $m_i m_j$ of input at sites i and j. A linear filter (plus a constant) is simply a first-order Volterra filter.

Analogous to the connection between MMSE linear filters and second-order statistics, MMSE Volterra filters are related to higher-order statistics. The key lies in exploiting the fact that Volterra filters are linear functions of products of the input. Instead of the actual inputs $\{m_i\}$, the idea is to focus on an "apparent" set of inputs $\{1\} \cup \{m_i\} \cup \{m_i \cdot m_j\} \cup \ldots \{m_{i_1} \cdot m_{i_2} \ldots m_{i_k}\}$, and so reduce the derivation of the (polynomial) Volterra filter on the actual inputs to the design of a linear filter on the apparent inputs. Because MMSE linear filters can be derived by solving a linear system (see section 4.5) in terms of the second-order statistics of the input and the unknown U, one can therefore compute a MMSE Volterra filter by solving a linear system in terms of the second-order statistics of the apparent input and unknown, or the (2k)-th order statistics of the input and unknown.

The generality of Volterra filtering can be cumbersome, for one must specify a large number of coefficients in designing one. In filtering a vector of length n (mathematically, a mapping from $\mathbb{R}^n$ to $\mathbb{R}^n$), a linear filter requires $O(n^2)$ coefficients, whereas a general k-order Volterra filter requires $O(n^{k+1})$ coefficients. For applications in vision, the appropriate length n can be truly large: for images n is on the order of a million, and for the discretized $\mathbb{R}^2 \times \mathbb{R}$, n can be even a hundred times that. Not only is directly solving the linear system for the MMSE Volterra filter practically difficult in these dimensions, just estimating such higher-order statistics requires enormous amounts of data. Applying the Volterra filter in the general case is similarly burdensome.

Symmetries and structural simplifications of any kind are essentially the best ways for taming the generality of the Volterra filter. One obvious symmetry is homogeneity: the kernel of the filter is the same irrespective of which portion of the image it is applied. This brings the number of coefficients need down to $O(n^k)$ from $O(n^{k+1})$ for the k-th order Volterra filter. Such homogeneity of the filter is a consequence of the statistical homogeneity of the unknown signal and noise, and amounts to stationarity for one-dimensional signals. Other simplifications arise when the unknown signal U is in some parametric family (e.g., ARMA models in one-dimension) or when the Volterra filter is assumed to have a particular structure, such as factorizability or a tensor product basis representation. In vision, quadratic filters have been applied for local contour detection independent of phase (e.g., the contour's edge vs. line characteristics), and general polynomial filters have been linked to the characterization and discrimination of textures. In the case of contour filtering, we shall now see that the special structure of the CIRF cumulants (section 3.5.3), combined with a Taylor series expansion in inverse noise level, makes MMSE Volterra filtering of noisy images possible.

4.7 Deriving CIRF Volterra Filters via Perturbation Expansion

Here we derive linear, quadratic and even cubic Volterra filters for the CIRF U observed in white Gaussian noise. In principle, similar techniques can also be used for filtering the CIRF observed with a log-likelihood polynomially dependent on U. The basic idea will be to observe the dependence of the log-likelihood on a small parameter (the inverse noise variance), and to perforin a perturbation expansion in that parameter. We shall study this perturbation expansion first, developing the notation and tools that will be necessary to carry it out.

Suppose we have a random vector $X=(X^i)$ (superscripts here index the component of the vector and do not represent taking a power) with prior distribution $P(dx)$ (with known cumulants) and posterior distribution $P_{(\epsilon)}(dx) = Z_{(\epsilon)}^{-1} \exp(\epsilon f(x)) P(dx)$, where $\epsilon$ is a small real number, $f(x) = \langle a+Ax, x \rangle$ is a real-valued function of x, $a=(a_i)$ is a constant vector, $A=(a_{ij})$ is a symmetric, negative definite linear operator, and the normalizing constant $Z_{(\epsilon)}$ is equal to $\int \exp(\epsilon f(x)) P(dx)$. Observe that this situation applies exactly to the CIRF in Gaussian white noise, where $$U = X, \epsilon = \sigma_N^{-2}, a = m, a_{ij} = -\frac{1}{2}\delta_{ij}$$

and $$f(x) = f(u) = \left\langle m - \frac{1}{2}u, u \right\rangle.$$

Note that we do know all the cumulants of the CIRF prior U from section 3. Given that that the main application for this invention is the filtering of extremely noisy contour images, understanding how to optimally filter as $\sigma_N \to \infty$, or equivalently, as $\epsilon \to 0$, is very important. To avoid being distracted by the particulars of the application of this idea to the CIRF, let us now focus on the problem of estimating X. We can apply the results we derive to the CIRF later.

Recalling that the MMSE estimate of X is the posterior mean $\mathbb{E}_{(\epsilon)} X$, our task is to compute a Taylor series expansion of the posterior mean around $\epsilon=0$. To foreshadow the results to come, we shall see that up to order $\epsilon^3$ the expansion of the posterior mean to order $\epsilon^k$ is a k-th order Volterra filter requiring cumulants of up to the (k+1)-th order for the CIRF.

Now, observe that the (posterior) mean can be computed by differentiating the logarithm of the normalizing constant, or $$\frac{\partial \ln Z_{(\epsilon)}}{\partial (\epsilon a_i)} = Z_{(\epsilon)}^{-1} \int \frac{\partial \exp(\epsilon \langle a + Ax, x \rangle)}{\partial (\epsilon a_i)} P(dx) \qquad (4.10)$$

$$= \int x_i P_{(\epsilon)}(dx) = \mathbb{E}_{(\epsilon)} X^i.$$

Therefore to get a Taylor series for the posterior mean, we need only get a Taylor series for $\ln Z_{(\epsilon)}$ and then differentiate with respect to $\epsilon a_i$.

Where do we get a Taylor series for $\ln Z_{(\epsilon)}$? Observe that the normalizing constant $Z_{(\epsilon)}$ is just the moment generating functional of the random vector $Y=f(X)$ in disguise, or, equivalently, Y has the cumulant generating functional $\mathrm{CGF}_Y(\epsilon)$ such that $$\ln Z_{(\epsilon)} = \ln \int \exp(\epsilon f(x))P(dx) = \ln \int \exp(\epsilon y)P(dx) = \ln MGF_Y(\epsilon) = CGF_Y(\epsilon). \quad (4.11)$$

But the coefficients in a Taylor series expansion of a cumulant generating functional are by definition the cumulants, and therefore we need to obtain the cumulants of $Y=f(X)$, a (quadratic) polynomial in X. Unfortunately, the cumulants of Y are not directly known; we must somehow calculate them in terms of the (known) cumulants of X.

4.7.1 Tensors and Generalized Cumulants

Without appropriate tools, calculating the cumulants of a polynomial can be extraordinarily difficult. To aid in this task, a tensor formalism can be used for representing moments, cumulants, and so-called generalized cumulants. For the purposes of this discussion, a tensor is an indexed array of numbers, for example $a_{ij}$ or $b_k^{ij}$, where indices such as i, j, k can appear as superscripts or subscripts and vary over a set of index values, e.g., $i \in I$.

Tensors are multiplied together by multiplying the corresponding array entries (as numbers), as in $a_i X^i$ or $b_{ij} d_i$, although we shall generally adopt the summation convention. In this convention, an index that appears in both a subscript and a superscript is assumed to be summed over; e.g., $$a_i X^i := \sum_i a_i X^i, \text{ and } a_{ij} Y^j := \sum_j a_{ij} Y^j.$$

An index that appears twice or more as a superscript, but not as a subscript (or vice versa) is not assumed to be summed over; so, for example, we do not assume that $g^{ij} g^{jk}$ is equal to $$\sum_j g^{ij} g^{jk},$$

but we do assume that $$a_j g^{ij} g^{jk} := \sum_j a_j g^{ij} g^{jk}.$$

The summation convention often makes for pithy expressions, but we shall not hesitate from writing out the sum explicitly if it helps to reduce ambiguity.

Moments and cumulants can conveniently be represented using tensors, as follows. The first moment $\mathbb{E}X^i$ will be denoted by $\kappa_X^i$ and the second moment $\mathbb{E}X^i X^j$ by $\kappa_X^{ij}$. More generally, the k-th moment $\mathbb{E}X^{i_1} \ldots X^{i_k}$ of the $i_1$-th through $i_k$-th components of X will be indicated by $\kappa_X^{i_1 i_k} = \kappa^{i_1 i_k}$, where the subscript X will be dropped if understood. Cumulants will be written in a similar fashion, except that commas will separate the indices; we define $\kappa^{i,j,k} := \text{cum}\{X^i, X^j, X^k\}$, for example (where X is understood). In general, the k-th cumulant of $X^{i_1}$ through $X^{i_k}$ is denoted by $\kappa^{i_1, \ldots, i_k} := \text{cum}\{X^{i_1}, \ldots, X^{i_k}\}$. Observe that $\kappa^i$ denotes both the first moment and first cumulant of $X^i$, which is appropriate since they are equal.

A generalized cumulant of random vector X is simply a cumulant of products of the components of X, such as $\text{cum}\{X^i, X^j X^k\}$. The following is a convenient notation $$\kappa^{ij,k,lmn} := \text{cum}\{X^i X^j, X^k, X^l X^m X^n\} \quad (4.12)$$

for generalized cumulants, where the commas in the superscript separate blocks of indices, with each block corresponding to a product of components of X and where these products are separated by commas in the (ordinary) cumulant (as on the right hand side of (4.12)). Due to the symmetry of both (ordinary) cumulants and products of components in their indices, the generalized cumulant is symmetric in its arguments in two senses: (1) the order of the blocks is irrelevant and (2) the order of the indices within each block is irrelevant. Indices cannot be moved from one block to another, however, and therefore $\kappa^{i,j,k}$ is equal to $\kappa^{kj,i}$ but not equal to $\kappa^{ij,k}$, for example. Observe that an ordinary cumulant of k-th order is a generalized cumulant with k blocks of indices, with just one index per block, or $\kappa^{i_1, \ldots, i_k}$. In contrast, a k-th order moment is a simply a generalized cumulant with one block of k indices, or $\kappa^{i_1 i_k}$. Thus the generalized cumulant indeed is a generalization of the statistical constructions of moments and cumulants.

A generalized cumulant can be expressed in a formula as a sum of products of ordinary cumulants. Because we use this formula later, we shall set it up here. Observe that a generalized cumulant with $\alpha$ blocks involving a total of $\beta$ random variables can be written as $\kappa(\mathfrak{P})$, where $\mathfrak{P} := \{v_1, \ldots, v_\alpha\}$ is a partition of $\beta$ indices into $\alpha$ non-empty blocks $v_1, \ldots, v_\alpha$ of indices. Now, any such partition can be written as a graph with $\beta$ vertices, where one vertex is for each random variable or random vector component. All vertices corresponding to each block $v_j$ of the partition will be connected by edges, but no two vertices in distinct blocks will be linked by an edge. In this way, a partition $\mathfrak{P}$ corresponds to a graph that is a union of $\alpha$ complete graphs, but with no two such complete subgraphs being connected. Thus $\mathfrak{P}$ will also denote this corresponding graph. Given any other partition $\mathfrak{P}'$ of the same set of indices (and its corresponding graph), the edge sum $\mathfrak{P} \oplus \mathfrak{P}'$ is a graph in the same vertices where the set of edges is the union of the edges for $\mathfrak{P}$ and $\mathfrak{P}'$. Now we can state a formula for the generalized cumulant in terms of products of ordinary cumulants:

$$\kappa(\mathcal{B}) = \sum_{\mathcal{B}'} \kappa(v'_1) \cdots \kappa(v'_n), \quad (4.13)$$

where the sum extends over all n-block partitions $\mathfrak{P}' : \{v'_1, \ldots, v'_n\}$ such that $\mathfrak{P} \oplus \mathfrak{P}'$ is a connected graph. The factors $\kappa(v'_j)$ in the sum are ordinary cumulants in the indices in block $v'_j$ of the partition $\mathfrak{P}'$.

To illustrate this result, consider the generalized cumulant corresponding to the partition $\mathfrak{P}=\{\{1, 2\}, \{3, 4\}, \{5\}, \{6\}\}$ with $\alpha=4$ blocks and $\beta=6$ indices. While each block of partition $\mathfrak{P}'=\{\{1, 3\}, \{2, 4\}, \{5, 6\}\}$ joins a block of $\mathfrak{P}$, the edge sum $\mathfrak{P}\oplus\mathfrak{P}'$ is not connected (because $\{5, 6\}$ is disconnected from the other nodes) and so there is no term in the sum in (4.13) corresponding to $\mathfrak{P}'$. However, the partition $\mathfrak{P}''=\{\{1, 2, 3\}, \{4, 5, 6\}\}$ does contribute the term $\kappa(\{1, 2, 3\})\kappa(\{4, 5, 6\})=\kappa^{1,2,3}\kappa^{4,5,6}$ to the sum because $\mathfrak{P}\oplus\mathfrak{P}''$ is connected. Using the formula, one obtains, for example, $$\kappa^{i,j,k}=\kappa^{i,j,k}+\kappa^{i,j}\kappa^k+\kappa^{i,k}\kappa^j=\kappa^{i,j,k}+\kappa^{i,j}\kappa^k[2],$$

where the bracketed number on the right of a term is the number of partitions of similar form that should be included in the sum. In this case, $\kappa^{i,j}\kappa^k[2]$ equals $\kappa^{i,j}\kappa^k+\kappa^{i,k}\kappa^k$. Although this bracket notation can be ambiguous (e.g., note that term $\kappa^{j,k}\kappa^i$, although of similar form, is not implied by the above use of $\kappa^{i,j}\kappa^k[2]$), it is useful in avoiding truly long enumerated lists. Another example of this formula is $$\kappa^{i,j,k,l}=\kappa^{i,j,k,l}+\kappa^k\kappa^{i,j,l}[2]+\kappa^{i,k}\kappa^{j,l}[2].$$

Applied to the third moment $\kappa^{ijk}$, the formula requires a sum over all partitions of $\{i, j, k\}$ (because $\mathfrak{P}=\{\{i, j, k\}\}$ is already connected); and applied to ordinary cumulant $\kappa^{i,j,k,l}$ (with $\mathfrak{P}=\{\{1\}, \{2\}, \{3\}, \{4\}\}$), the formula is satisfied by exactly one partition $\mathfrak{P}'=\{\{1, 2, 3, 4\}\}$ connecting all nodes. This formula succinctly expresses generalized cumulants in terms of a sum of products of ordinary cumulants.

4.7.2 Cumulants of Polynomials

With the generalized cumulant formula, we now need only express the cumulants of our polynomial $Y=f(X)$ in terms of the generalized cumulants of $X$. By the linearity of expectation and of cumulants, cumulants of homogeneous polynomials such as $a_i X^i$ and $a_{ij}X^iX^j$ can be computed straightforwardly. For example, $\mathbb{E}[a_iX^i] = \text{cum}\{a_iX^i\}=a_i\text{cum}\{X^i\}=a_i\kappa^i$ and $$\begin{aligned}\text{var}(a_{ij}X^iX^j) &= cum\{a_{ij}X^iX^j, a_{kl}X^kX^l\}\\ &= a_{ij}a_{kl}cum\{X^iX^j, X^kX^l\}\\ &= a_{ij}a_{kl}\kappa^{ij,kl}\\ &= a_{ij}a_{kl}(\kappa^{i,j,k,l}+\kappa^{i,k}\kappa^{j,l}[2]+\kappa^{i,j,k}\kappa^l[2]+\\ &\quad \kappa^k\kappa^{i,j,l}[2]+\kappa^i\kappa^k\kappa^{j,l}[4]),\end{aligned}$$

using the generalized cumulant formula. Although one can compute the cumulants of general polynomial transformations of a random variable, here we focus on our case of interest, $Y=\langle a+AX, X\rangle=a_iX^i+a_{ij}X^iX^j=:(A_1+A_2)X=:PX$, where we use the notation $P=A_1+A_2$ for our polynomial operator with linear part $A_1$ and quadratic part $A_2$. One can express the cumulant generating functional in terms of the cumulant tensors $\kappa$ of $X$ using the formal expansion $$CGF_Y(\epsilon)=\exp(\epsilon P)\kappa=(1+\epsilon P+\epsilon^2 PP/2!+\epsilon^3 PPP/3!+\ldots)\kappa.$$

The terms in this expansion are determined by expanding the polynomial operator into a sum of homogeneous polynomials, as follows:

$$P\kappa = (A_1+A_2)\kappa = a_i\kappa^i + a_{ij}\kappa^{ij}$$

and $$\begin{aligned}PP\kappa &= (A_1+A_2)(A_1+A_2)\kappa\\ &= A_1A_1\kappa + A_1A_2\kappa + A_2A_1\kappa + A_2A_2\kappa\\ &= a_ia_j\kappa^{i,j} + a_ia_{jk}\kappa^{i,jk} + a_{ij}a_k\kappa^{ij,k} + a_{ij}a_{jk}\kappa^{ij,jk}\\ &= a_ia_j\kappa^{i,j} + a_ia_{jk}\kappa^{i,jk}[2] + a_{ij}a_{jk}\kappa^{ij,jk}.\end{aligned}$$

Observe there is only one block of indices in the generalized cumulants in $P\kappa$, but there are two blocks for the generalized cumulants in $PP\kappa$. Higher order terms behave similarly, as we now observe in our sought-for expression of the cumulant generating function of the polynomial $Y$ in terms of the generalized cumulants of $X$:

$$\begin{aligned}CGF_Y(\epsilon) &= \epsilon(a_i\kappa^i + a_{ij}\kappa^{ij}) + \frac{\epsilon^2}{2}(a_ia_j\kappa^{i,j} + a_ia_{jk}\kappa^{i,jk}[2] + a_{ij}a_{kl}\kappa^{ij,kl}) +\\ &\quad \frac{\epsilon^3}{6}(a_ia_ja_k\kappa^{i,j,k} + a_ia_ja_{kl}\kappa^{i,j,kl}[3] + a_ia_{jk}a_{lm}\kappa^{i,jk,lm}[3] +\\ &\quad a_{ij}a_{kl}a_{mn}\kappa^{ij,kl,mn}) + \frac{\epsilon^4}{24}(a_ia_ja_ka_l\kappa^{i,j,k,l} + a_ia_ja_ka_{lm}\kappa^{i,j,k,lm}[4] +\\ &\quad a_ia_ja_{kl}a_{mn}\kappa^{i,j,kl,mn}[6] + a_ia_{jk}a_{lm}a_{no}\kappa^{i,jk,lm,no}[4] +\\ &\quad a_{ij}a_{kl}a_{mn}a_{op}\kappa^{ij,kl,mn,op}) + O(\epsilon^5).\end{aligned}$$

This expression can be further simplified by observing that all of the bracketed numbers representing permutations become scalar factors by relabeling indices appropriately. To obtain the posterior mean $\mathbb{E}_{(\epsilon)}X$, by (4.10) and (4.11) we need only differentiate $CGF_Y(\epsilon)$ with respect to $\epsilon a_r$, as follows:

$$\begin{aligned}\mathbb{E}_{(\epsilon)}X^r &= \kappa^r + \epsilon(a_i\kappa^{r,i} + a_{ij}\kappa^{r,ij}) + \quad\quad (4.14)\\ &\quad \frac{\epsilon^2}{2}(a_ia_j\kappa^{r,i,j} + 2a_ia_{jk}\kappa^{r,i,jk} + a_{ij}a_{kl}\kappa^{r,ij,kl}) +\\ &\quad \frac{\epsilon^3}{6}(a_ia_ja_k\kappa^{r,i,j,k} + 3a_ia_ja_{kl}\kappa^{r,i,j,kl} +\\ &\quad 3a_ia_{jk}a_{lm}\kappa^{r,i,jk,lm} + a_{ij}a_{kl}a_{mn}\kappa^{r,ij,kl,mn}) +\\ &\quad O(\epsilon^4).\end{aligned}$$

Expression (4.14) can be used directly to compute the posterior mean of a signal (with known cumulants) that is corrupted by linear blur and (the limit of) large, possibly correlated, Gaussian noise (for more general observation models, see section 4.3.2). One can derive linear ($O(\epsilon)$ terms), quadratic ($O(\epsilon^2)$ terms), cubic ($O(\epsilon^3)$ terms) and other higher-order Volterra filters by systematically computing all of the generalized cumulants of $X$ in terms of its ordinary cumulants.

4.7.3 The CIRF: A Tractable Special Case

In the general case, the expansion of formula (4.14) is a lengthy and tedious task: each generalized cumulant will become a possibly large number of products of ordinary cumulants. In addition, the resulting computation naively suggested by the summation convention would have high-order polynomial complexity, where the order depends on the number of terms in the perturbation expansion, e.g., $O(n^7)$ operations for the cubic filter, which has all the terms explicitly listed in (4.14). For $n=10^6$, applying the cubic filter would naively require on the order of $(10^6)^7=10^{42}$ operations. It is little wonder, therefore, that this formula has not appeared in high-noise signal processing or vision applications before.

Fortunately, the contour images modeled by the CIRF have a special cumulant structure that we can exploit (see section 3.5.3). In addition, we invoke several realistic assumptions that will both (1) significantly simplify the task of even writing down the surfeit of terms and (2) reduce the computational complexity of the filters to that of applying the Green's operator G. For the direction process-based CIRF, the filter complexity becomes $O(n \log n)$, where $n=|I|$. We now consider these extra assumptions in turn.

Spatial Homogeneity

For general purpose contour enhancement, we assume that any knowledge about contour endpoint locations will be conveyed by the contour image itself. Equivalently, one is indifferent to the starting and ending locations of each contour. As introduced in section 3.5.2, this amounts to setting the initial distribution μ and final weighting ν proportional to a constant, e.g., $\mu_i=|I|^{-1}, \nu_i=\lambda^{-1}$, for all sites i∈I. Using the notion of contour density $\eta:=N\lambda/|I|$ (the average amount of contour per site) and observing that $G1=\lambda 1$, a simple calculation shows that the k-th cumulant of the spatially homogeneous CIRF U at sites $i_1, \ldots, i_k$ becomes:

$$\kappa^{i_1,\ldots,i_k} = cum\{U_{i_1}, \ldots, U_{i_k}\} \qquad (4.15)$$
$$= \eta \sum_{a \in perm_k} g^{i_{a_1} i_{a_2}} \cdots g^{i_{a_{k-1}} i_{a_k}}.$$

(Superscripts are used here in keeping with the tensor notation and summation convention.) In addition, the Markov process $R_t$ itself will be assumed to be spatially homogeneous in the sense that shifts in the initial conditions give rise to corresponding shifts in the solution to the corresponding Fokker-Planck diffusion. As a consequence, the Green's operator $G=(g^{ij})$ is constant along the diagonal, i.e., $g^{ii}=:d$, for all i∈I.

Low Contour Density

Another fact that we shall exploit is that, in a large number of images, contours constitute a small fraction of the total image. For the CIRF, this amounts to asserting that the contour density η is small ($0 \leq \eta \ll 1$). In the continuum, an extreme form of this claim certainly holds: the bounding contours in an image of smooth surfaces in an occlusion relationship constitute a set of measure zero (with respect to the standard area measure in the plane). In natural images it is easy to observe a variety of sources of contours for which the low-density CIRF is appropriate, such as occlusion edges, highlights, surface markings (albedo discontinuities), and shadow boundaries. A number of textures, in particular regions where contour structure dominates regions, may not appear to be modeled realistically by low-density CIRFs, and indeed this is the case if the underlying Markov process is planar Brownian motion. But when using higher-dimensional Markov process contour models, even images with a large number of crossing contours can be reasonably modeled with low-density CIRFs. For example, contours that cross in a two-dimensional image will not cross in $\mathbb{R}^2 \times \mathbb{R}$ unless they have the same orientation at the crossing point. Working with curvature in $\mathbb{R}^2 \times \mathbb{R} \times \mathbb{R}$, even highly dense planar texture patterns are represented with lower density as well.

The key consequence of low contour density is that the generalized cumulants in (4.14) can be approximated with one corresponding joint cumulant, as follows. Recall formula (4.13) for expanding generalized cumulant κ($\mathfrak{P}$), where graph $\mathfrak{P}=\{v_1, \ldots, v_\alpha\}$ has vertices $i_1, \ldots, i_k$, into a sum of products of ordinary cumulants corresponding to partitions $\mathfrak{P}'$ such that $\mathfrak{P} \oplus \mathfrak{P}'$ is connected. Observe that the complete graph $\mathfrak{P}''=\{\{i_1, \ldots, i_k\}\}$ (with only one block in the corresponding partition) always leaves $\mathfrak{P} \oplus \mathfrak{P}''$ connected, since $\mathfrak{P}''$ is connected. Thus there will always be the term $\kappa(\mathfrak{P}'')=\kappa^{i_1,\ldots,i_k}$ (a single ordinary cumulant in all the vertices of $\mathfrak{P}$) in formula (4.13), and by (4.15) this term will be $O(\eta)$. All other terms in the generalized cumulant expansion will be products of ordinary cumulants, and therefore will be $O(\eta^2)$. As a result, with an error of $O(\eta^2)$ we shall replace all of the generalized cumulants in (4.14) with the corresponding joint ordinary cumulant. For example, $\kappa^{r,ij}=\kappa^{r,i,j}+O(\eta^2)$ and $\kappa^{r,i,jk,lm}=\kappa^{r,i,j,k,l,m}+O(\eta^2)$ for the low-density CIRF. When the low-density assumption does not hold, the generalized cumulant expansion can be evaluated completely. Alternatively, one could even consider a high contour density limit where only those terms of highest power in the contour density η are kept.

Self-Avoidingness of Individual Contours

Suppose our Markov processes were perfectly straight. Then these "curves" would never return to their starting points even if they were infinitely long. Smooth contours approximately obey this relationship for short lengths, and our Markov process contour models have similar behaviour. The direction process, for example, rarely returns to its starting position; the curvature process only returns after a full, smooth, loop, unlike planar Brownian motion, which often self-intersects immediately after passing through a site. This "approximately self-avoiding" nature of our Markov process models will be exploited in deriving the Volterra filters, allowing many terms to be neglected, as we shall see now.

4.7.4 Diagram Method for Evaluating the Posterior Mean

Let us now evaluate the terms in parentheses in the posterior mean expansion (4.14). For the case of additive Gaussian white noise, recall that $$a_{ij} = -\frac{1}{2}\delta_{ij}.$$

After replacing the generalized cumulants with ordinary cumulants via the low contour density assumption, our task is to compute terms such as $a_i a_j \kappa^{r,i,j}$ and $a_t \delta_{jk} \delta_{lm} \kappa^{r,i,j,k,l,m}$. Also, to avoid unnecessary distraction, we suppress all multiplicative powers of $$-\frac{1}{2}$$

from the $a_{ij}$s and the scalar multiplication by η in the CIRF form of the cumulants until we add up the evaluated terms later. (Set $\eta=1$ in (4.15) until the final sum of terms in (4.14).) Now, evaluating these terms requires expanding the (ordinary) cumulants $\kappa^{r,i,j,\cdots}$ into a sum over all permutations of the indices by formula (4.15). The last term for the cubic filter, for example, will require that 7!=5040 permutations be evaluated.

To support the error-prone task of explicitly summing over each permutation and to aid the intuition, we shall construct a diagram corresponding to each permutation. Let us start with the simple case of $a_i\kappa^{r,i}=a_ig^{ir}+a_ig^{ir}$, using (4.15). This sum has two terms, the first corresponding to the permutation (r, i). For each term we construct our diagram as a graph with one node per index, and with directed edges corresponding to the order of the permutation (part (a) of FIG. 1). Observe that no node occurs twice in the permutation, and so the diagram just represents an ordered, simple path along the nodes. We then embellish the diagram (part (b) of FIG. 1) to illustrate how it corresponds to the expression $a_ig^{ri}$: node r (the "readout") is identified with a hollow dot ("observation"), and the nodes corresponding to the coefficient $a_i$ are marked with an "X" to denote an "amplification," "boost," or "interaction" with input a. The term $a_ig^{r,i}$ corresponding to this diagram (part (a) of FIG. 1) represents the action of operator G on vector a and evaluated at r, or $(Ga)^r$; observe that the edge is directed away from r. Conversely, the term $a_ig^{ir=(G^*)^{ri}}a_i$ corresponding to permutation (i, r) represents the action of operator $G^*$ on vector a and evaluated at r, with the edge directed towards r. One can check that this pattern persists for more complex diagrams and so we can write the operator G along each link directed away from r and $G^*$ along each link directed towards r. Dropping the r to represent the vectorial result, we work inwards toward the readout r on the diagram to simply write Ga for permutation (r, i), and, from part (c) of FIG. 1, $G^*a$ for (i, r).

For term $a_ia_j\kappa^{r,i,j}$, we need to consider three kinds of permutations of the indices r, i, and j. Permutation (r, i, j) corresponds to $a_ia_jg^{ri}g^{ij}$, which can be evaluated as $g^{ri}a_i(Ga)^i=g^{ri}(\text{diag } a \text{ Ga})^i=G \text{ diag } a \text{ Ga}$ because the componentwise product $a_ib_i$ of any vectors a and b can always be written as $(\text{diag } a \text{ b})_i$, the i-th component of the matrix diag a times vector b. This result can be read directly from part (d) of FIG. 1 by working from node j towards the readout r: the input a comes in first at j, is operated on by G, the result Ga is componentwise multiplied by a (equivalently, operated upon by diag a), which is finally operated upon by G, to produce G diag a Ga. Since we get the same diagram back when nodes i and j are swapped, to permutation (r, j, i) we get the same result G diag a Ga. Permutation (j, i, r) has the diagram shown in part (e) of FIG. 1, which is the same as the reversal of the diagram for permutation (r, i, j), and so corresponds to $G^*$ diag a $G^*a$. Again, nodes i and j can be swapped to produce a $G^*$ diag a $G^*a$ for permutation (i, j, r). The readout r need not be at the end of the ordering, as in permutation (j, r, i) corresponding to term $a_ia_jg^{jr}g^{ri}=(G^*a)^r(Gr)^r$. Letting a·b denote the vector which is the componentwise product of vectors a and b, i.e., $(a·b)_i=a_ib_i$, the vector result from permutation (j, r, i) can therefore be written as $G^*a·Ga:=(G^*a)·(Ga)$. This can also be derived from the diagram by splitting the diagram (part (f) of FIG. 1) at r, separately treating the two resulting sub-paths (one directed into r, the other directed away from r) as before, and then taking the componentwise product as the result. Note that i and j can be swapped as before for another $G^*a·Ga$. Gathering together the results from parts (d), (e), and (f) of FIG. 1, we obtain $$a_ia_j\kappa^{r,i,j}=(2G \text{ diag } aGa+2G^* \text{ diag } a \ G^*a+2G^*a·Ga)^r.$$

In hindsight, this result can be derived most easily from the appropriate diagrams.

In addition to terms with only coefficients of form $a_i$, we also have to deal with terms that have a Kronecker delta, such $a_i\delta_{jk}\kappa^{r,i,j,k}$. Because the Kronecker delta $\delta_{jk}$ evaluates to 1 only when the two indices have equal value, and zero otherwise, the coefficient $\delta_{jk}$ represents the identity of indices j and k. In the diagram this amounts to the collapsing of nodes j and k into a new combined node {j, k}, giving rise to a loop. For permutation (r, i, j, k), we therefore get the diagram (a) in FIG. 2 for the expression $a_i\delta_{jk}g^{ri}g^{ij}g^{jk}=g^{ri}a_i\Sigma_jg^{ij}g^{jj}$. To evaluate this diagram, we start at node {j, k}. We first realize that, due to spatial homogeneity, the G is constant along the diagonal, or $g^{jj}=d=(d\mathbf{1})_j$ for all j. On the diagram this can be represented by replacing the loop with an "input" of d1 at node {j, k} (all one-edge loops can be replaced in this way). Working backwards towards r, we find that permutation (r, i, j, k) evaluates to G diag a Gd1=dλGa, since G1=λ1. Having evaluated this diagram we know how to evaluate similar diagrams. First, the reversal of nodes j and k produces dλGa for permutation (r, i, k, j). Second, reversing all of the arrows (for both orderings of j and k) causes the substitution of operator $G^*$ for G.

For permutation (j, k, r, i) we must evaluate $a_i\delta_{jk}g^{jk}g^{kr}g^{ri}$. Explicitly summing over indices we obtain $(Ga)^r\Sigma_jg^{rj}g^{jj}=d\lambda(Ga)^r$. But from the diagram (part (b) of FIG. 2), we can just take the componentwise product of the results due to the path towards and the path away from r, with input a at node i and input d1 (for the loop) at node {j, k}. We then get the vectorial result Ga·dG1=dλGa. Again, nodes j and k can be swapped and the entire path can be reversed (G becomes $G^*$).

For permutation (r, j, k, i), we need to evaluate $a_i\delta_{jk}g^{rj}g^{jk}g^{ki}$. Again, the loop becomes an input d1 at {j, k}, and so we can use the diagram (part (c) of FIG. 2) to obtain the result G diag d1Ga=dG1Ga=dGGa.

Now, observe that G is a positive operator for the Markov processes in which we are interested. Given that there is only one positive eigenvector for a positive operator and that it corresponds to the maximum eigenvalue, the equation G1=λ1 implies that λ is the maximum eigenvalue because 1 is a positive eigenvector of G. This implies that $\lambda^{-1}G$ is a contraction mapping that only passes constant vectors unchanged; non-constant vectors will shrink. Equivalently, $\|Gy\|<\|\lambda y\|$ unless y is a constant vector.

Because of this, we view the result dGGa=dGy for permutation (r, j, k, i) as smaller than the result dλGa=dλy for permutation (j, k, r, i), where y=Ga is generally non-constant for typical inputs a. Observe that such contraction mappings will correspond to repeated operators (GG, $G^*G^*$, etc., without a "boost" or "amplification" from a between them) whenever there is a loop located between a regular input a (located at i for permutation (r, j, k, i)) and the output r. As a first approximation, we shall therefore neglect dGGa and all other permutations that have a Kronecker delta index between an input node and the output r; we shall restrict our attention to those permutations where all of the indices with subscripted inputs a form an uninterrupted sequence (in the permutation) to the output r. Let us call this criterion for neglecting terms the input-output-coupling rule.

In addition to this rule for neglecting loops, there is another that is due to the approximately self-avoiding nature of our Markov processes. We illustrate this rule with permutation (r, j, i, k) (part (d) of FIG. 2), or term $a_i\delta_{jk}g^{rj}g^{ji}g^{ik}=\Sigma_jg^{rj}(G^{ji}(G^*)^{ji})a_i=(G(G·G^*)a)^r$, where A·B denotes the componentwise product of the two operators A and B. Here, the effective input at combined node {j, k} due to the 2-edge loop {{j, k}, i} is (G·G*)a. We have "broken" the loop at i and taken the componentwise product of the operators that correspond to the two distinct paths from i to {j, k}; this is the action of operator G·G* on vector a. For approximately self-avoiding processes, observe that G·G* is approximately $d^2 I$: each row is the componentwise product of the corresponding rows of G and G*, which, by spatial homogeneity, is just the componentwise product of the Green's operator kernels for the forward operator G and the backward operator G*. For the directed Markov process in $\mathbb{R}^2 \times \mathbb{R}$, the forward operator is large only on one side of the impulse, and the backward operator is large only on the other, and thus the componentwise product is only significant at the origin, which corresponds to the common diagonal $g^{ii}=d$. For the curvature process in $\mathbb{R}^2 \times \mathbb{R} \times \mathbb{R}$, the forward and backward kernels may overlap for impulses of high curvature, suggesting the need for a bound on curvature. Thus permutation (r, j, i, k) evaluates to the simple expression $d^2 Ga$, which is clearly smaller than the $d\lambda Ga$ expression for permutation (r, i, j, k), since $d=\tau$ (the average amount of time the contour spends in a site as it passes through) is certainly much less than the total average contour length $\lambda$. This example suggests the 1-link-loop rule: neglect those permutations that correspond to diagrams where the largest loop has more than one link or edge.

4.7.5 Computational Significance of Approximately Self-Avoiding Processes

It is interesting to note that for Brownian motion (a symmetric process, with G*=G) there is perfect overlap between the forward and backward kernels, so the above argument would not apply and therefore we should not invoke the 1-link-loop rule to neglect such terms with inputs inside a loop. This suggests a novel justification for orientation in vision: using approximately self-avoiding Markov processes (e.g. the directed process in $\mathbb{R}^2 \times \mathbb{R}$) gives rise to a reduction in computational complexity compared to non-self-avoiding processes such as planar Brownian motion. Evolution might exploit this fact since those organisms that expend fewer resources on contour computations are more likely to survive. Observe that this is rather counter-intuitive because it is the more elaborate representation ($\mathbb{R}^2 \times \mathbb{R}$), not the simpler ($\mathbb{R}^2$), that has the smaller computational burden. Also note that this complexity argument is distinct from the statistical argument as to whether contours in the world do tend to smoothly continue in orientation.

Figure 2:
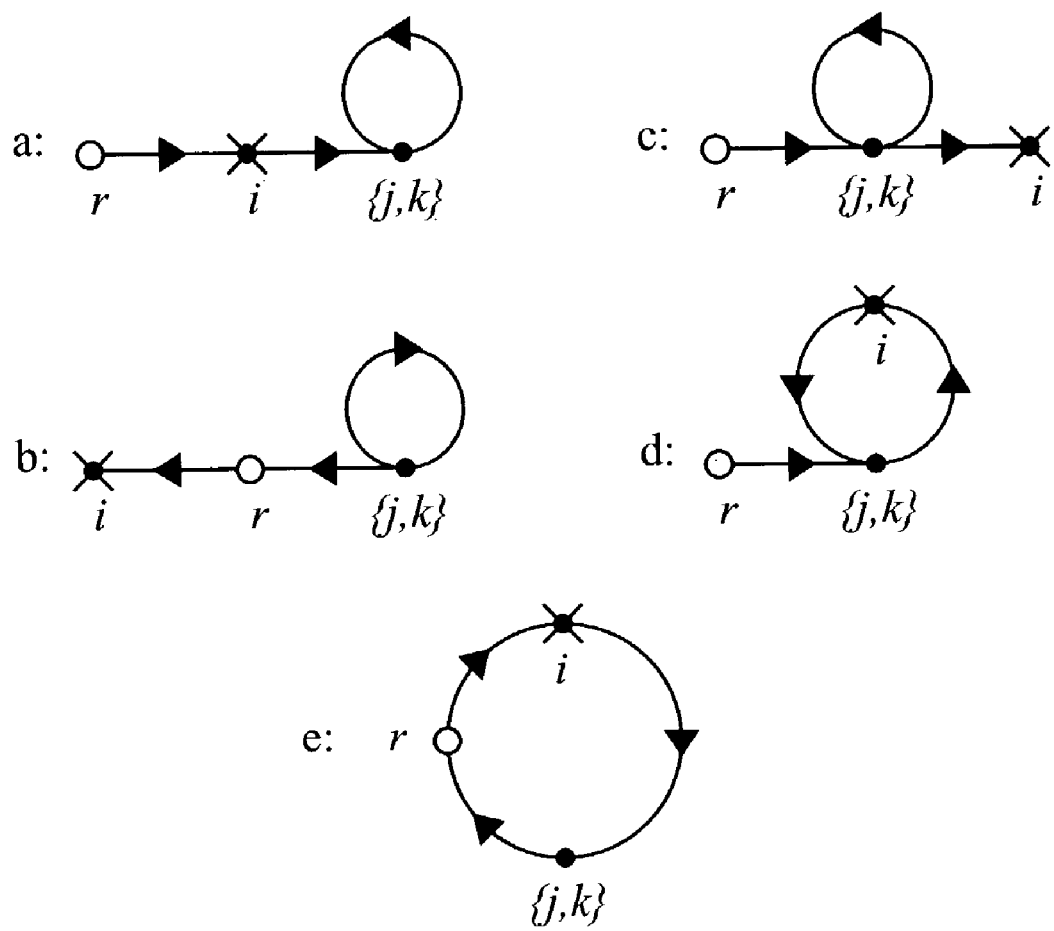
FIG. 2 is a schematic diagram for representing other permutations, in the CIRF cumulant, from the posterior mean.

Returning to the calculation, both the 1-link-loop rule and the input-output-coupling rule force us to drop permutation (r, j, i, k), but only the 1-link-loop rule applies will cause us to neglect permutation (j, r, i, k) (part (e) of FIG. 2). The latter permutation, which has the output r within the loop can be evaluated by splitting the loop at i, and then taking the componentwise product of the operators for the two paths to the output r. Since there is no other loop at {j, k}, we view it as having the input 1. (This evaluation of a loop at the output is only necessary if the output is part of the loop.) The result is (G·G*G*)a, which we assume to be small.

Bigger loops (with more inputs a) can be handled by breaking the loop at some node and then forming the appropriate componentwise product operator, giving rise to effective inputs {(G diag a G)·G*}a or {G·(G* diag a G*)}a at the combined node. Where there are loops within loops, we recursively evaluate from the innermost loops by replacing each loop with the effective input at the corresponding combined node and working toward the outermost loops. For the purpose of evaluating the high-noise linear, quadratic, and cubic filters, the largest loop will have only two internal inputs, corresponding to, for example, effective inputs {(G diag a G)·G*}a and its reversal {G·(G* diag a G*)}a. The use of approximately self-avoiding processes will allow us to apply the 1-link-loop rule to neglect these terms because, for example, each column of the "amplified" forward operator G diag a G probably has little overlap with the corresponding column of operator G*. For filters of much higher-order than cubic, the 1-link-loop rule may not be appropriate even for approximately self-avoiding processes because the kernel for a long sequence of alternating forward operators and amplifications (e.g., G diag a G diag a ... G) may overlap with G*; for example, a may represent an edge map of a sufficiently smooth, closed contour. (For the direction process, if there is no diffusion in direction ($\sigma_\kappa=0$) and space is unbounded, which corresponds to straight line trajectories, even higher-order kernels will never overlap.) Again, we shall apply the 1-link-loop rule for our CIRF Volterra filters up to third order only.

More complicated diagrams than those above can arise; for example, there may be no strict nesting of the loops. However, using the 1-link-loop rule we shall neglect the terms corresponding to such diagrams. These more complex diagrams can represent highly improbable self-intersection patterns—tortuous paths—so neglecting them seems reasonable.

In summary, we use a diagram-based technique for evaluating all the permutations in the terms of the posterior mean expansion (4.14) for CIRF linear, quadratic, and cubic Volterra filters. We exploit the approximate self-avoidingness of our Markov process G to invoke the 1-link-loop rule and the positivity of G for the input-output-coupling rule. As a by-product we neglect a large variety of improbable looping paths. We simplify our work by observing that we get the same diagram after swapping indices in each Kronecker delta, and by implementing permutation reversals by swapping G and G* appropriately. Unsuppressing η and the appropriate powers of $$-\frac{1}{2},$$

this diagram-based calculation was used to derive the following.

Result 1 (High-noise MMSE CIRF Volterra Filters). Suppose that the curve indicator random field U (for approximately self-avoiding Markov processes) is corrupted with additive Gaussian white noise of variance $\sigma_N^2 := \epsilon^{-1}$ to produce measurement vector m. Let $\zeta := d\lambda$, where $d = g^{ii}$ and $\lambda$ is the average curve length. Then the minimum mean-squared error estimate of U given m has the following approximate asymptotic expansion as $\sigma_N \to \infty (\epsilon \to 0)$:

Linear Filter:

$$\tilde{u}^{(1)} = \eta\{1 - 2\epsilon\zeta + \epsilon(Gm + G^*m)\} + O(\eta\epsilon^2 + \eta^2\epsilon) \quad (4.16)$$

Quadratic Filter:

$$\tilde{u}^{(2)} = \eta\{1 - 2\epsilon\zeta + 3\epsilon^2\zeta^2 + \epsilon(1 - 2\epsilon\zeta)(Gm + G^*m) + \quad (4.17)$$
$$\epsilon^2(GdiagmGm + Gm \cdot G^*m + G^*diagmG^*m)\} +$$
$$O(\eta\epsilon^3 + \eta^2\epsilon)$$

Cubic Filter:

$$\tilde{u}^{(3)} = \eta\{1 - 2\epsilon\zeta + 3\epsilon^2\zeta^2 - 4\epsilon^3\zeta^3 + \quad (4.18)$$
$$\epsilon(1 - 2\epsilon\zeta + 3\epsilon^2\zeta^2)(Gm + G^*m) +$$
$$\epsilon^2(1 - 2\epsilon\zeta)(GdiagmGm + Gm \cdot G^*m + G^*diagmG^*m) +$$
$$\epsilon^3(GdiagmGdiagmGm + GdiagmGm \cdot G^*m +$$
$$Gm \cdot G^*diagmG^*m + G^*diagmG^*diagmG^*m)\} +$$
$$O(\eta\epsilon^4 + \eta^2\epsilon).$$

We shall see in section 5 that by implementing the operator G in the Fourier domain, its computational complexity is $O(n \log n)$ for the direction process, where $n=|I|$. Since multiplying a diagonal matrix with a vector has $O(n)$ complexity, the net complexity for all of these filters is therefore $O(n \log n)$ for the direction process. This is far better than for the general k-th order Volterra filters, which have $O(n^{k+1})$ complexity.

One could attempt to improve upon these results by pursuing higher-order expansions. However, instead of following that tedious, difficult path, we now turn to a very different approach for deriving filters that is based on the MGF of the CIRF that we derived in section 3. Unlike for general signals, we can follow this path due to the special structure of the CIRF. Not only is the approach simpler, it also allows one to exploit all of the probabilistic structure in the CIRF.

4.8 The Biased CIRF Approximation of the Posterior

In addition to deriving high-noise Volterra filters by using the low-order cumulants of the prior, we can also compute filters by approximating the posterior with a more manageable distribution. We shall now develop a related approximation for the CIRF, although the approximation will not be factored.

Because by Bayes' rule any posterior is a weighted version of the prior, it is reasonable to base our approximation on the prior. Although the prior itself will not suffice as an approximation, since it is not even a function of the measurements, the prior can be modified or "biased" by a function of the measurements to make a useful approximation of the posterior. To see how to do this, recall from section 3.5.2 that we have a tractable expression for the CIRF moment generating functional $\mathbb{E}\exp<c, U>$, where the moments are obtained by differentiating the MGF and evaluating the derivatives at $c=0$. However, the MGF of the CIRF converges for all $c$ sufficiently small (Prop. 3), and so we could evaluate the derivatives at $c\neq 0$, i.e., perform a Taylor series expansion around $c\neq 0$. Doing so amounts to finding the moments of a CIRF of bias $c$, or biased CIRF, with distribution $P_c(du):=Z_c^{-1}\exp<c, u>P(du)$, where $c \in \mathbb{R}^{|I|}$ is the bias (vector), $P(du)$ is the original (unbiased) CIRF distribution, and $Z_c:=\int \exp<c, u>P(du)$. Expectations with respect to $P_c$ are indicated with $\mathbb{E}_c$. We shall first compute the cumulants of the biased CIRF and then set up a system of equations that allows us to approximate the true posterior with a biased CIRF. All statistics of the posterior can then be approximated by those of the approximating biased CIRF distribution. In particular, the posterior mean of the CIRF can be approximated in this way.

4.8.1 Cumulants of the Biased CIRF

To compute the cumulants of the biased CIRF we need to take derivatives of its cumulant generating functional ln $\mathbb{E}_c\exp<b, U>$ with respect to the vector b, and then evaluate them at 0. Since $\text{CGF}_c(b):=\ln \mathbb{E}_c\exp<b, U>=\ln\int\exp<b+c, u>P(du)-\ln Z_c$, taking derivatives with respect to b of the CGF of the biased CIRF (denoted $\text{CGF}_c(b)$) and evaluating at 0 is equivalent to taking derivatives with respect to c of the CGF ln $\mathbb{E}\exp<c, U>$ of the (unbiased) CIRF and evaluating at c.

For example, to compute the mean of a biased CIRF, we have to compute $$\nabla_c \ln \mathbb{E} \exp\langle c, U\rangle = \left(\frac{\partial}{\partial c_1}\ln \mathbb{E}\exp\langle c, U\rangle, \ldots, \frac{\partial}{\partial c_{|I|}}\ln \mathbb{E}\exp\langle c, U\rangle\right),$$

where $\nabla_c$ denotes the gradient with respect to c. Substituting the CIRF moment generating functional (Prop. 5), we have to take the gradient of $<\mu, N(G_c-G)\nu>=N[<\mu, G_c\nu>-1]$, where we recall the notation $G_c:=G(c)$ for the Green's operator with bias c. Applying the gradient to the latter inner product, we can write $\nabla_c<\mu, G_c\nu>=<\mu, [\nabla_c G_c]\nu>$.

Since $G_c:=-(Q+\text{diag } c)^{-1}$, to continue the calculation we must understand how to take derivatives of inverses of operators, which we study in the following lemma.

Lemma 3. Suppose matrices $A=(a_{ij})$ and $B=(b_{ij})$ are functions of some parameter $\alpha$, i.e., $A=A(\alpha)$, $B=B(\alpha)$. Letting primes (') denote (componentwise) derivatives $d/d\alpha$ with respect to $\alpha$, the following formulas hold:

$$(AB)'=A'B+AB', \quad (4.19)$$

$$(A^{-1})'=-A^{-1}A'A^{-1}. \quad (4.20)$$

Returning to the calculation of the mean of the biased CIRF, we use (4.20) to write $$\frac{\partial}{\partial c_i}G_c = \frac{\partial}{\partial c_i}[-(Q+\text{diag } c)^{-1}]$$
$$= (Q+\text{diag } c)^{-1}\left[\frac{\partial}{\partial c_i}(Q+\text{diag } c)\right](Q+\text{diag } c)^{-1}$$
$$= G_c D_i G_c,$$

$G_c D_i G_c$, where $D_i$ is a matrix with a one at the (i, i)-entry and zeroes elsewhere. The matrix $D_i$ can be expressed as the outer product $\delta_i \delta^*_i$ of discrete impulse vectors $\delta_i$ at site i, where $(\delta_i)_j=\delta_{ij}$. Therefore $$\frac{\partial}{\partial c_i}\langle\mu, G_c\nu\rangle = (\delta_i^* G_c^* \mu)(\delta_i^* G_c \nu) = (G_c^*\mu)_i(G_c\nu)_i,$$

proving the following:

Proposition 7. The mean of the CIRF of bias c at site i is $$\kappa_c^i = \mathbb{E}_c U_i = N<\mu, G_c D_i G_c \nu>. \quad (4.21)$$

Equivalently, the mean (vector) of this biased CIRF is $$\mathbb{E}_c U = N(G^*_c\mu)\cdot(G_c\nu). \quad (4.22)$$

The higher-order cumulants can also be tractably characterized as follows:

Proposition 8. The k-th cumulant at sites $i_1, \ldots, i_k$ of the CIRF U of bias c is $$\kappa_c^{i_1,\ldots,i_k} = \tag{4.23}$$

$$cum_c\{U_{i_1},\ldots,U_{i_k}\} = \mathcal{N}\left\langle \mu, \sum_{\alpha\in perm_k} G_c D_{i_{\alpha_1}} G_c \ldots G_c D_{i_{\alpha_k}} G_c \nu \right\rangle =$$

$$\mathcal{N}\sum_{i,j}\mu_i\nu_j \sum_{\alpha\in perm_k} g_c^{ii_{\alpha_1}} g_c^{i_{\alpha_1}i_{\alpha_2}} \ldots g_c^{i_{\alpha_{k-1}}i_{\alpha_k}} g_c^{i_{\alpha_k}j},$$

where $(g_c^{ij}):=G_c$ is the Markov process Green's operator with bias c.

4.8.2 Solving for the Biased CIRF

Given this manageable characterization of the cumulants of the biased CIRF, our task now is to solve for the bias c to approximate the posterior. Because the logarithm $\ln Z_{(\epsilon)}$ of the normalizing constant $Z_{(\epsilon)}$ of the posterior is (up to an additive constant) just the cumulant generating functional of the posterior (see section 4.8.1), we shall develop an approximation to $\ln Z_{(\epsilon)}$. The general strategy is similar to that for the Volterra filter, where we assume there is high-noise ($\epsilon$ near 0), and so a perturbation expansion in $\epsilon$ is warranted. Except in the sense of the remainder term of the expansion, we do not provide approximation bounds. Letting $\epsilon c'=c$, we write $$\ln Z_{(\epsilon)} = \ln \int e^{\epsilon\langle a+AU,u\rangle} P(du) \tag{4.24}$$

$$= \ln \int e^{\epsilon\langle a-c'+AU,u\rangle} e^{\epsilon\langle c',u\rangle} P(du)$$

$$= \ln Z_{\epsilon c'} \mathbb{E}_{\epsilon c'} e^{\epsilon\langle a-c'+AU,U\rangle}$$

$$= \ln Z_c + \ln \mathbb{E}_c e^{\epsilon\langle a-c'+AU,U\rangle},$$

where the second term on the last line is simply the cumulant generating functional of $(a-c'+AU, U)$ (with respect to measure $P_c(du)$) evaluated at $\epsilon$, similar to (4.11) except the measure on U is now biased by c. Now, as for the Volterra filters, we shall develop the CGF of $(a-c'+AU, U)$ into a Taylor series in $\epsilon$. Unlike the Volterra case, however, we have the extra freedom to choose the bias c to make our approximation useful, and therefore we shall stop the Taylor series at the first order, i.e., $$\ln \mathbb{E}_c e^{\epsilon\langle a-c'+AU,U\rangle} = \ln(1+\mathbb{E}_c\langle a-c'+AU,U\rangle + O(\epsilon^2) =$$

$$\mathbb{E}_c^{\epsilon\langle a-c'+AU,U\rangle + O(\epsilon^2)}.$$

Because the latter expectation is just $-\langle c, \mathbb{E}_c U\rangle + \epsilon\langle a, \mathbb{E}_c U\rangle + \epsilon\Sigma_j\mathbb{E}_c[(AU)_j U_j]$, we can rewrite (4.24) as $$\ln Z_{(\epsilon)} = \ln Z_c - \langle c, \mathbb{E}_c U\rangle + \tag{4.25}$$

$$\epsilon\left\{\langle a, \mathbb{E}_c U\rangle + \sum_j [cov_c((AU)_j, U_j) + \mathbb{E}_c(AU)_j\mathbb{E}_c U_j]\right\} +$$

$$O(\epsilon^2).$$

(4.25)

Since in $Z_{(\epsilon)}$, which characterizes the true posterior, does not depend on the bias c of our approximate posterior $P_c$, differentiating $\ln Z_{(\epsilon)}$ with respect to any function of c will be zero. In particular, we can set up a system of equations in c by taking the derivative of (4.25) with respect to $\mathbb{E}_c U_i = \kappa_c^i$, a function of c. We consider two special cases now.

No Blur Case

Consider the situation where there is no blur in the observations and the noise is white. Thus we set $$A = -\frac{1}{2}I = -\frac{1}{2}(\delta_{ij})$$

and (4.25) becomes $$\ln Z_{(\epsilon)} = \ln Z_c - \sum_j c_j \kappa_c^j + \tag{4.26}$$

$$\epsilon\left\{\sum_j a_j \kappa_c^j - \frac{1}{2}\sum_j [\kappa_c^{j,j} + \kappa_c^j \kappa_c^j]\right\} + O(\epsilon^2).$$

(4.26)

Differentiating with respect to $\kappa_c^i$ and applying the chain rule twice, the first two terms on the right hand side become $$\frac{\partial}{\partial \kappa_c^i}\left[\ln Z_c - \sum_j c_j \kappa_c^j\right] = \sum_j \frac{\partial \ln Z_c}{\partial c_j}\frac{\partial c_j}{\partial \kappa_c^i} - \tag{4.27}$$

$$c_i - \sum_j \frac{\partial c_j}{\partial \kappa_c^i}\kappa_c^j = -c_i,$$

because $$\frac{\partial \ln Z_c}{\partial c_j} = \kappa_c^j.$$

Using formula (4.23) twice, note that $\kappa_c^{jj}=2g_c^{jj}N\Sigma_{i'}$, $_j\mu_i\nu_j g_c^{ij}g_c^{jj'}=2g_c^{jj}\kappa_c^j$, because the two permutations are identical. So by differentiating (4.25) with respect to $\kappa_c^i$, we get: $0=-c_i+\epsilon(a_i-g_c^{ii}+\mathbb{E}_c U_i)+O(\epsilon^2)$, proving the following result:

Result 2. Suppose the posterior distribution of the observed CIRF is $P_{(\epsilon)}(du) \propto \exp(\epsilon\langle a-\frac{1}{2}u,u\rangle)P(du)$. Then $P_{(\epsilon)}$ can be approximated by a CIRF of bias c, with $$c=\epsilon[a-\mathbb{E}_c U-d(c)]+O(\epsilon^2), \tag{4.28}$$

where $d(c)$ is the diagonal of the Green's operator $G_c$ with bias c, or $d(c)_i:=g_c^{ii}$.

As discussed in section 4.3.1, we can apply this result to the case where the CIRF is corrupted with additive Gaussian white noise by setting $a=m$ and $\epsilon=\sigma_N^{-2}$. This can also be applied when empirical edge histograms are known (section 4.3.3) or in other situations by setting a to an appropriate function of m.

Observe that (4.28) is a coupled nonlinear system in the vector c of |l| unknowns; c is expressed as a function not only of the exogenous a, but also of the (generally nonlinear) functions of itself: $\mathbb{E}_c U$ (see Proposition 7) and $d(c)$. This equation describes c as proportional to a balance between positive influence due to input a and negative influence due to the sum of the mean of the biased CIRF ($\mathbb{E}_c U$) and a measure of closure d(c). Recall that $d(c)_i = (G_c)^{ii}$ is the expected amount of time that the biased Markov process spends in site i given that it started at i. We note that even if the unbiased process is self-avoiding, the bias may be such as to encourage the process to return to i. In the context of Mumford's direction process, if c is sufficiently positive along an appropriate dilation of a smooth closed curve passing through i in discrete $\mathbb{R}^2 \times \mathbb{R}$, then $d(c)_i$ may be large. This closure measure may not be significant if the bias describes only open curves. Since the bias c is ultimately a function of input a, we would expect d(c) to be important only when a is positive along smooth, closed curves. The exact notion of smoothness and closedness will depend on the Markov process curve model. For the direction process, closed curves with curvature not many times that of $\sigma_\kappa$ might induce a d(c) having large values at some sites.

Large Blur Case

Another system of equations can be derived in an opposite extreme, where the symmetric negative definite matrix A is proportional to an operator that performs a great deal of blur. In that case, the blurred field AU is essentially a constant vector, and therefore $\text{cov}_c((AU)_j, U_j) \approx 0$. Using $\nabla \mathbb{E}_{c,U} \triangleleft \mathbb{E}_c AU, \mathbb{E}_c U \rangle = 2A \mathbb{E}_c U$ and the above calculations for the no-blur case, we get the following system of equations.

Result3. Suppose the posterior distribution of the observed CIRF is $P_{(\epsilon)}(du) \propto \exp(\epsilon <a+Au, u>) P(du)$, where the symmetric negative definite operator A is approximately proportional to a spatial averaging operator of maximum size, such as a matrix of constants. Then $P_{(\epsilon)}$ can be approximated by a CIRF of bias c, with $$c \approx \epsilon [a + 2A \mathbb{E}_c U] + O(\epsilon^2). \quad (4.29)$$

This large blur result provides a nonlinear system of equations in the bias c. It differs from (4.28) by the presence of the blur operator A acting on the mean and the absence of the closure measure d(c). By including blur, we can better describe a number of situations, as outlined in section 4.3

Also note that for both the non-blur and large blur cases, the biased CIRF approximations do not depend on a spatial homogeneity assumption, and so nonuniform $\mu$ and $\nu$ can be used.

Combined with the formula for the mean of the biased CIRF and dropping terms of order $\epsilon^2$, our nonlinear system corresponding to (4.29) can be expressed as the following coupled nonlinear system describing a self-consistent field c mediating the posterior CIRF interactions:

Observation (Biased CIRF Approximation of the Posterior Mean of the CIRF). Suppose a CIRF U is corrupted via a quadratic log-likelihood (with large-scale blur) to produce measurements m. The posterior mean of U given m has the following approximate description:

$$\mathbb{E}_m U \approx N f \cdot b, \quad (4.30)$$

where f and b solve the following coupled system:

$$Qf + \epsilon \, \text{diag}[a + 2NA(f \cdot b)] f + \nu = 0 \quad (4.31)$$

$$Q^* b + \epsilon \, \text{diag}[a + 2NA(f \cdot b)] b + \mu = 0. \quad (4.32)$$

For reference, we include the above filtering equations for the continuum-limit of the above biased CIRF approximation equations for the direction process.

Observation (Reaction-Diffusion-Convection Equation for the Direction Process). Suppose a CIRF U based on the direction process is corrupted via a quadratic log-likelihood (with large-scale blur) to produce measurements rm. Then the posterior mean is approximately $N f \cdot b$, where f and b solve the following coupled nonlinear integro-elliptic system:

$$\left( \frac{\sigma^2}{2} \frac{\partial^2}{\partial \theta^2} - \cos\theta \frac{\partial}{\partial x} - \sin\theta \frac{\partial}{\partial y} - \alpha \right) f + \epsilon \, \text{diag}[a + 2NA(f \cdot b)] f + \nu = 0$$

$$\left( \frac{\sigma^2}{2} \frac{\partial^2}{\partial \theta^2} + \cos\theta \frac{\partial}{\partial x} + \sin\theta \frac{\partial}{\partial y} - \alpha \right) b + \epsilon \, \text{diag}[a + 2NA(f \cdot b)] b + \mu = 0.$$

Also note that for $A \propto I$, the nonlinear coupled PDE is in fact a reaction-diffusion-convection equation. Since $c \approx \epsilon [a + 2NA(f \cdot b)]$, we see that pattern formation arises from $c^+ = \max(c, 0)$ (the positive part of bias c), pattern repression comes from $-c^- = \min(c, 0)$ (the negative part of c), diffusion comes from the second derivatives, and convection is due to the first derivatives.

4.9 Comparison with Completion Fields

Perceptual organization has raised the possibility of discovering a rigorous foundation for classical demonstrations such as illusory contours. This gave rise to work on contour saliency both as a model of illusory contour formation and for contour organization. We shall focus on drawing relationships to stochastic completion fields (Williams and Jacobs, supra) and eigensources because of their focus on Markov processes such as the direction process.

To make the connection, we begin with the biased CIRF approximation, but set the operator A to zero. The first consequence of dropping A is that the likelihood is no longer necessarily normalizable. For the second consequence, recall the interpretation of the square of the CIRF U as a measure of contour intersections (see section 3.2.1). Ignoring the operator A (which gives rise to a quadratic form in U) therefore amounts to ignoring those intersections (due to the diagonal of A) or even near intersections (due to the off-diagonals of A). With this simplification this biased CIRF approximation becomes the decoupled forward and backward linear systems $Qf + Cf + \nu = 0$ and $Q^*b + Cb + \mu = 0$, respectively, where $C := \epsilon \, \text{diag } a$. The approximate posterior mean of the CIRF U is proportional to the componentwise product $f \odot b$ of the forward and backward solutions. We focus on the forward equation, as the backward equation is just its adjoint.

Now, we observe even though we have dropped the interaction operator A, the resulting filter is still a nonlinear input-to-output mapping, and in two distinct ways. First, we are taking the product of the forward and backward solutions. Second, the input arises as a modification to the diagonal of linear operator Q. In particular, we have $f = (1 - GC)^{-1} G\nu = \sum_{k=0}^{\infty} (GC)^k G\nu$, which says that f is an infinite polynomial in c, i.e., f is nonlinear in c. If we ignore the constant term (k=0) and all nonlinear terms (k>1), what remains is the linear term $GCG\nu$, which is proportional to $Gc$ if $\nu$ is a constant vector and G is spatially homogeneous (as it is for the direction process). We recognize $Gc$ as the source field (with sources $c \propto CG\nu$), and, by the same argument, $G^*c$ is the sink field (with sinks $c \propto CG^*\mu$, where $\mu$ is also a constant vector); their product $Gc \cdot G^*c$ is then a stochastic completion field. To have different sinks and sources one can adjust $\mu$ and $\nu$.

To relate to eigensources, let $C := \text{diag } a$ and thus write the forward equation as: $f - \epsilon GCf - G\nu = 0$. Setting $\nu = 0$ and assuming $a_i > 0$, for all i, we can define $W^2 := C$ to get $GW^2 f = \sigma_N^2 f$, where we recall $\epsilon = \sigma_N^{-2}$ (see section 4.3.2). Defining $h = Wf$, we write $GWh = \sigma_N^2 W^{-1} h$, or $$WGWh = \sigma_N^2 h.$$

This is an eigenvalue equation, where $\sigma_N^2$ is now interpreted as an eigenvalue of WGW. We see, therefore, that the CIRF provides a new perspective for understanding other techniques for the perceptual organization of contours.

4.10 What Can One Do with a Filtered CIRF?

It may seem odd that we have sought to (merely) filter a field of local contour measurements, producing yet another field. If one objective of vision is to explicitly represent structures with increasing abstraction, this task may seem to postpone the most difficult work. To return to a question brought up at the start of this section, why not extract the contours directly from the image, instead of just enhancing a contour image?

There are a number of reasons why one might focus on processing a field. First, this approach captures a notion of global information beyond that of a single curve, by explicitly expressing the idea of an image of contours, where both the interactions among the contours and the blur due to imaging is not ignored. In contrast, previous approaches for computing curves using Markov process contour models (Montanari, supra), implicitly assume that there is only a single contour. By emphasizing the field we can combine the richer contour models of the single-contour schemes with the contour interactions implicit in the line processes used in MRFS or dictionary-based relaxation labeling. Another reason for the intermediate representation of a filtered CIRF is that it captures the ambiguity inherent in finding contours in noisy images: a more diffuse filter response characterizes less certain (more spread out) contours. If direct contour computations were carried out, one would need a set of contours to represent this ambiguity. While in some applications only the best contour is needed, in others we require an assessment of the uncertainty of the situation and some representation of the plurality of comparable contour explanations. Direct enumeration with particular contours may be more cumbersome than a field for representing the many contour possibilities. Finally, contour enhancement can be an end in itself in some graphical or image processing applications.

More pragmatically, simple post-processing of the filtered CIRF may be sufficient for some applications. For example, the thresholding described in section 4.2.4 may be sufficient, perhaps followed by connected component analysis to provide thick individual contours. Thinning and linking procedures could then follow if desired.

Since information is lost in thresholding, however, for more sophisticated contour processing, might require the (un-thresholded) CIRF posterior mean. To compute contours one could greedily follow gradients in the posterior mean from strong, supra-threshold seed points. The CIRF posterior mean could also be used to guide a heuristic search procedure for finding individual contours. Since the (filtered) CIRF is the expected amount of time a contour spends at a site (given the measurements), the posterior mean is a candidate heuristic function that would encourage sites with large times to be explored first and more often than others. Other graph-based methods could be used to post-process the CIRF in a similar fashion. By combining information about the observation process and the structure of contours, the CIRF performs significant global computations, and so reduces the burden upon later processing.

Section 5

5.1 Numerical Methods

Having worked out formulas for MMSE CIRF filters, we now discuss how these can be implemented. While the number of linear and nonlinear filters we have suggested may seem daunting, on closer inspection of the formulas in section 4 we see some common components. For example, the Green's operator G for the generator L of the Markov process appears in the linear and Volterra filters. In addition, the Green's operator $G_c$ of the biased CIRF also appears prominently in filters based on the biased CIRF approximation of the CIRF posterior. We therefore first study the problem of computing the action f=Gh of G upon h for both the direction and curvature processes, where in both cases we have direct (noniterative) methods. Knowing how to apply G to a vector enables us to compute the action of the biased Green's operator GC on a vector using an iterative technique that uses G as a preconditioner. The technique for computing $G_c$ does not itself depend upon the Markov process because those details are summarized by G. Finally, we present a continuation method for solving the nonlinear system for the biased CIRF. The continuation method requires that we be able to apply $G_c$, and so it is also not tied to a particular Markov process.

5.2 Applying the Green's Operator by Solving the Forward Equation

To compute the action f of the Green's operator G upon a vector h, we can—equivalently—solve for f in the forward equation $$(\alpha I - L)f = h, \tag{5.1}$$

since $Q = L - \alpha I$ and $G = -Q^{-1}$. Now, all of the theory in sections 3 and 4 was based on continuous-time, discrete-space Markov processes, to avoid many measure-theoretic distractions. However, as we saw in section 2, the Markov processes we are most interested in live in continuous spaces such as $\mathbb{R}^2 \times \mathbb{R}$. In general, by designing a Markov process via an appropriate stochastic differential equation, we can immediately obtain the process's generator $\mathcal{L}$ from the corresponding Fokker-Planck equation. When the Markov process is a diffusion process, $\mathcal{L}$ is a partial differential operator acting on functions of continuous space, not vectors. To make the transition from the continuous to discrete domains, we let the discrete-space generator L be some (reasonable) discretization of the continuous-space generator $\mathcal{L}$. Strictly speaking, therefore, the CIRF filters are only fully defined when we specify the numerical method used to obtain a particular (discrete) generator L. We discretize only after having studied the filtering problem to focus on the underlying mathematics of filtering curve images, not the (often crucial) details of implementation. By this thinking, we may imagine that our filters require the solution of differential or integral equations, even though we only solve their discretizations. In addition, although we employ particular numerical techniques here, we note that they are not unique, as in many numerical problems.

5.2.1 Direction Process

Here we solve the (discrete) forward equation for Mumford's direction process by first specifying the related direction process forward PDE and then discretizing using Fourier series. The result will be a set of linear systems in the frequency domain that can be solved rapidly. After taking an inverse discrete Fourier transform, we shall find that we can accurately compute the action f=Gh of G on a vector h∈$\mathbb{R}^n$ in O(n log n)-time. Because this technique does not require iteration, we call it the direct method.

Recalling the continuous-space generator $\mathcal{L}$ of the direction process from (2.4), the corresponding forward PDE is the continuous space equivalent $(\alpha I - \mathcal{L})f = g$ of (5.1), or the direction process forward PDE $$\alpha f - \frac{\sigma^2}{2}\frac{\partial^2 f}{\partial \theta^2} + \cos\theta\frac{\partial f}{\partial x} + \sin\theta\frac{\partial f}{\partial y} = h, \qquad (5.2)$$

where $f=f(x, y, \theta)$, $h=h(x, y, \theta)$, and $\sigma=\sigma_\kappa>0$. Observe that this is a degenerate elliptic PDE, where the degeneracy arises because the second derivatives do not appear in x and y. The second derivative in $\theta$ gives rise to diffusion in the $\theta$-dimension, and the cosine/sine pair of terms give rise to convection. Suppose we are to solve (5.2) on $D \times [0, 2\pi]$, for planar rectangular region $D=[0, x_{max}] \times [0, y_{max}] \supset \mathbb{R}^2$. Let $\partial D$ denote the boundary of D. For boundary conditions, we always assume $f(x, y, \theta)$ is periodic in $\theta$ with period $2\pi$. With respect to $(x, y)$, one may study several possible boundary conditions:

Dirichlet: $f(\partial D, \theta) = 0$, $\forall \theta$;

· Neumann $\frac{\partial f}{\partial n}(\partial D, \theta) = 0, \forall \theta$, where n is the outward normal of D;

Periodic: f is periodic in x with period $x_{max}$ and in y with period $y_{max}$.

The Dirichlet and Neumann boundary conditions may be more natural for contour enhancement, as periodic boundary conditions can lead to "wrap around" artifacts.

Figure 3:
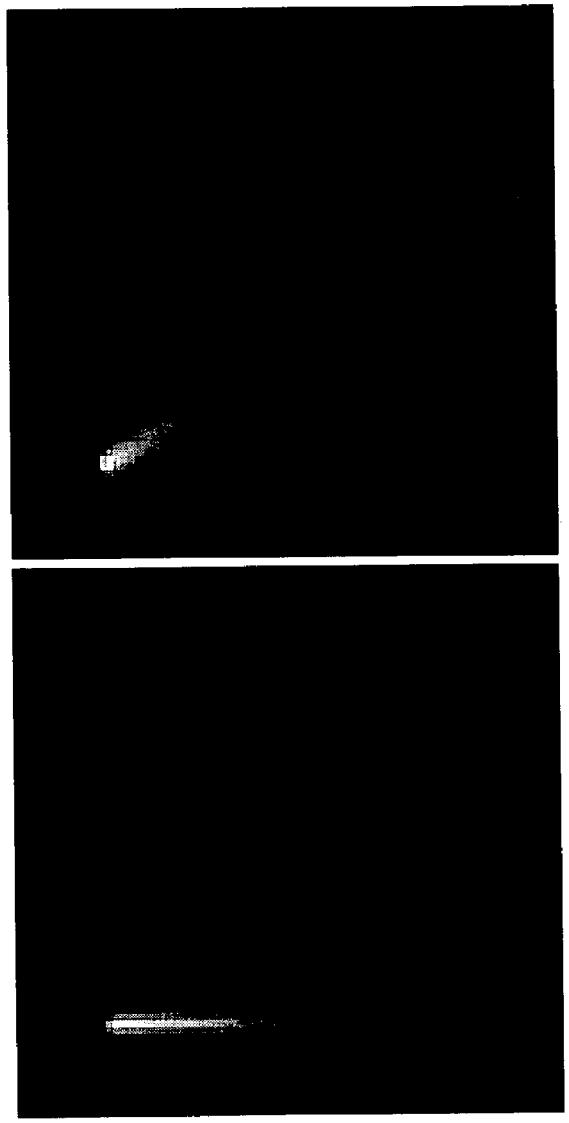
FIG. 3 is a set of photographs of a display showing an isotropy comparison.
Figure 3:
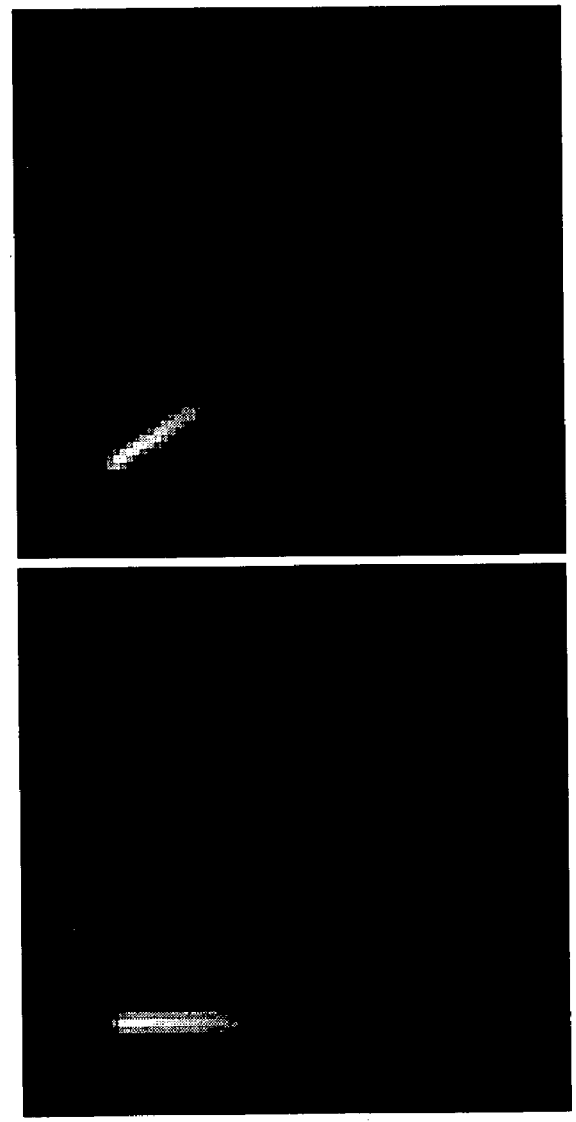

At least two major approaches can be taken in numerically solving PDE (5.2): (1) finite differencing, or (2) projection onto another basis. In the first approach, the partial derivatives are replaced with (discrete) difference approximations, similar to the definition of a derivative except without taking the limit. Finite differencing not only is simple to implement, but it also allows boundary conditions to be easily specified and modified. Williams and Jacobs used finite differencing to solve the corresponding time-dependent Fokker-Planck PDE (with decay), where the approximation was only first-order accurate because upwind differencing was needed for stability (Williams and Jacobs, supra). They observed a troubling anisotropy with this first-order method: the solution is more focused in the horizontal and vertical directions than in the diagonals. FIG. 3 compares this first-order method with the direct method that we describe later in this disclosure. (The direction process forward PDE was solved for a slightly blurred impulse on a 80×80×44 grid, with parameters $\sigma_\kappa = 1/24$, $\alpha = 1/100$, and at discrete directions 4 (top) and 0 (bottom). The spatial discretization was set to $\Delta x = \Delta y = 1$ here and elsewhere in this invention disclosure, unless stated otherwise.) Depicted is the integral over $\theta$. The direct method (right) produces a more focused result at discrete direction 4 than does the first-order method (left); the first-order method also has insufficient blurriness far to the right of the horizontal impulse (lower left), unlike the direct method result (lower right). In other words, rotating h does not simply rotate the solution f, as PDE (5.2) would predict. Extra diffusion can be added to restore isotropy, with the additional benefit of enabling a fast multi-grid solution. Unfortunately, this technique ensured that all directions had the same unfocused response as the diagonals did without extra diffusion. It has been difficult to achieve accuracy in solving the direction process forward PDE while maintaining isotropy using finite differencing.

A second approach to solving the direction process forward PDE (5.2) involves selecting a suitable (and typically orthogonal) basis $\{\phi_\kappa\}$, taking the inner product $<\phi, \psi>_R$: $= \int \phi(r)\psi^*(r)dr$ (where the asterisk denotes complex conjugation, $r=(x, y, \theta) \in R=\mathbb{R}^2 \times \mathbb{R}$, and the subscript R is dropped if understood from the context) of the equation with the basis elements, and then solving the transformed system. A judicious selection of basis can lead to reduced computation times and/or solution quality. One important virtue of the complex exponential (or complex Fourier) basis is that derivatives can be represented exactly by scalar multiplication, suggesting that the anisotropy introduced by finite differencing might be alleviated. In addition, the ready availability of reliable implementations of the fast Fourier transform (FFT), which compute the projection to the complex exponential basis, make coding straightforward. Finally, we shall see that PDE (5.2) reduces to a set of cyclic tridiagonal systems, which can be rapidly solved. The need to apply the Green's operator possibly many times to implement our MMSE filters motivated us to devise the following rapid scheme.

Before developing our method, we observe that trigonometric bases correspond to the three different boundary conditions. Specifically, the sine, cosine, and complex exponential bases correspond to the Dirichlet, Neumann, and periodic boundary conditions respectively. Despite the periodicity of the complex exponential basis, we apply it here both because of the above advantages and to simplify the presentation. To reduce the negative artifacts of periodicity in $(x, y)$, we can often solve the equation on a larger domain than necessary (after suitably padding h), and then extract the region of interest from the solution f.

We now detail our direct method. Let $i$ denote the imaginary unit $\sqrt{-1}$. The complex exponential having periods $x_{max}, y_{max}$, and $2\pi$ and at frequencies j, k, and l in the x-, y-, and $\theta$-dimensions, respectively, is $$\phi_{jkl}(x, y, \theta) := \exp\left[2\pi i\left(\frac{jx}{x_{max}} + \frac{ky}{y_{max}} + \frac{l\theta}{2\pi}\right)\right].$$

Let the Fourier coefficient $\hat{f}_{jkl}$ be defined as the inner product $<f, \phi_{jkl}>$ of a function f with a complex exponential $\phi_{jkl}$; $\hat{h}_{jkl}$ is defined similarly. Now we can evaluate, term-by-term, the inner product of the complex exponential with the direction process forward PDE.

Using integration by parts and periodicity in x, we know $$\left\langle \frac{\partial f}{\partial x}, g \right\rangle = -\left\langle f, \frac{\partial g}{\partial x} \right\rangle;$$

this result ("taking the adjoint of the x-derivative") holds analogously in y and in $\theta$. By both taking the ajoint of the $\theta$-derivative twice and applying the chain rule twice, we get $$\left\langle \frac{\partial^2 f}{\partial \theta^2}, \phi_{jkl} \right\rangle = (-1)^2 \left\langle f, \frac{\partial^2 \phi_{jkl}}{\partial \theta^2} \right\rangle = (-il)^2 \langle f, \phi_{jkl} \rangle = -l^2 \hat{f}_{jkl}.$$

Using the formula $\cos\theta = (e^{i\theta} + e^{-i\theta})/2$ and taking the adjoint of the x-derivative, we can write $$\left\langle \cos\theta \frac{\partial f}{\partial x}, \phi_{jkl} \right\rangle$$

as $$-\frac{2\pi ij}{x_{\max}} \frac{1}{2} \int\int\int f(x, y, \theta)\{e^{i\theta} + e^{-i\theta}\} e^{-2\pi i\left(\frac{jx}{x_{\max}} + \frac{ky}{y_{\max}} + \frac{l\theta}{2\pi}\right)} dx\,dy\,d\theta =$$

$$\pi \frac{ij}{x_{\max}}$$

$$\int\int\int f(x, y, \theta)\left\{ e^{-2\pi i\left(\frac{jx}{x_{\max}} + \frac{ky}{y_{\max}} + \frac{(l-1)\theta}{2\pi}\right)} + e^{-2\pi i\left(\frac{jx}{x_{\max}} + \frac{ky}{y_{\max}} + \frac{(l+1)\theta}{2\pi}\right)} \right\}$$

$$dx\,dy\,d\theta = \pi \frac{ij}{x_{\max}} (\hat{f}_{j,k,l-1} + \hat{f}_{j,k,l+1}).$$

Similarly, we get $$\left\langle \sin\theta \frac{\partial f}{\partial y}, \phi_{jkl} \right\rangle = \pi \frac{k}{y_{\max}} (\hat{f}_{j,k,l-1} - \hat{f}_{j,k,l+1}),$$

using the formula $\sin\theta = (e^{i\theta} - e^{-i\theta})/(2i)$. This proves the following.

Proposition 9. Suppose $h(x, y, \theta)$ is periodic in x, y, and $\theta$ with periods $x_{max}$, $y_{max}$, and $2\pi$, respectively. Then the solution $f = f(x, y, \theta)$ of (5.2) is also periodic and, for each j, $k \in \mathbb{Z}$, the Fourier coefficients $\{\hat{f}_{jkl}:l\in\mathbb{Z}\}$ and $\{\hat{h}_{jkl}:l\in\mathbb{Z}\}$ satisfy the following tridiagonal linear system indexed by $l\in\mathbb{Z}$:

$$\pi\left(\frac{ij}{x_{\max}} + \frac{k}{y_{\max}}\right) \hat{f}_{j,k,l-1} + \qquad (5.3)$$

$$\left(\frac{\sigma^2}{2} l^2 + \alpha\right) \hat{f}_{j,k,l} + \pi\left(\frac{ij}{x_{\max}} - \frac{k}{y_{\max}}\right) \hat{f}_{j,k,l+1} = \hat{h}_{j,k,l}.$$

To go from the above infinite linear system to a manageable finite one, we assume that h is bandlimited. Then, without loss, we can represent h by its uniform samples $h_{j'k'l'} := h(j'\Delta x, k'\Delta y, l'\Delta\theta)$, with indices $j' \in \{0, \ldots, J-1\}$, $k' \in \{0, \ldots, K-1\}$, and $l' \in \{0, \ldots, L-1\}$, where positive integers J, K, and L are the total numbers of frequencies (including both nonnegative and negative frequencies) in x, y, and $\theta$, respectively, such that the periods satisfy $x_{max} = J\Delta x$, $y_{max} = K\Delta y$, and $2\pi = L\Delta\theta$. Prop. 9 then implies f is bandlimited in x and y. Due to the bandlimitedness of h in $\theta$ and the fact that the direction process forward PDE is a diffusion in $\theta$ (and thus low-pass), we elect to solve for f in (5.3) only for the same L total frequencies in $\theta$ that are in the bandlimit of h. To deal with the "boundary conditions" in frequency l, we assume that $\hat{f}_{jkl}$ is periodic in l because sampled signals have periodic spectra. (Periodic boundary conditions in l produced more pleasing results than zero boundary conditions in an informal test where the $\theta$-dimension was badly undersampled. If the $\theta$-dimension is sufficiently oversampled, the difference is negligible.) As a result, we obtain an L×L cyclic tridiagonal linear system at each (j, k) frequency pair. Assuming L is even, this sytem is $A\hat{f}_{j,k,\cdot} = \hat{h}_{j,k,\cdot}$, where the matrix A is:

$$\begin{bmatrix} \gamma_{-L/2+1} & \beta^- & 0 & \ldots & \ldots & 0 & \beta^+ \\ \beta^+ & \ddots & \ddots & \ddots & & & 0 \\ 0 & \ddots & \gamma_{-1} & \beta^- & 0 & & \vdots \\ \vdots & & \ddots & \beta^+ & \gamma_0 & \beta^- & \ddots & \vdots \\ \vdots & & & 0 & \beta^+ & \gamma_1 & \ddots & 0 \\ 0 & & & & \ddots & \ddots & \ddots & \beta^- \\ \beta^- & 0 & \ldots & \ldots & 0 & \beta^+ & \gamma_{L/2} \end{bmatrix}, \qquad (5.4)$$

where $$\gamma_i = \frac{\sigma^2}{2} l^2 + \alpha, \quad \beta^+ = \pi\left(\frac{ij}{J\Delta x} + \frac{k}{K\Delta y}\right),$$

and $$\beta^- = \pi\left(\frac{ij}{J\Delta x} - \frac{k}{K\Delta y}\right).$$

This system can be solved for $\hat{f}_{j,k,\cdot}$ in O(L) operations. Using the FFT to compute the (finite number of) Fourier coefficients of h and the inverse FFT to compute f from $\hat{f}$, the overall time complexity of computing f from h is O(n log n), where $n = J \cdot K \cdot L$.

Figure 4:
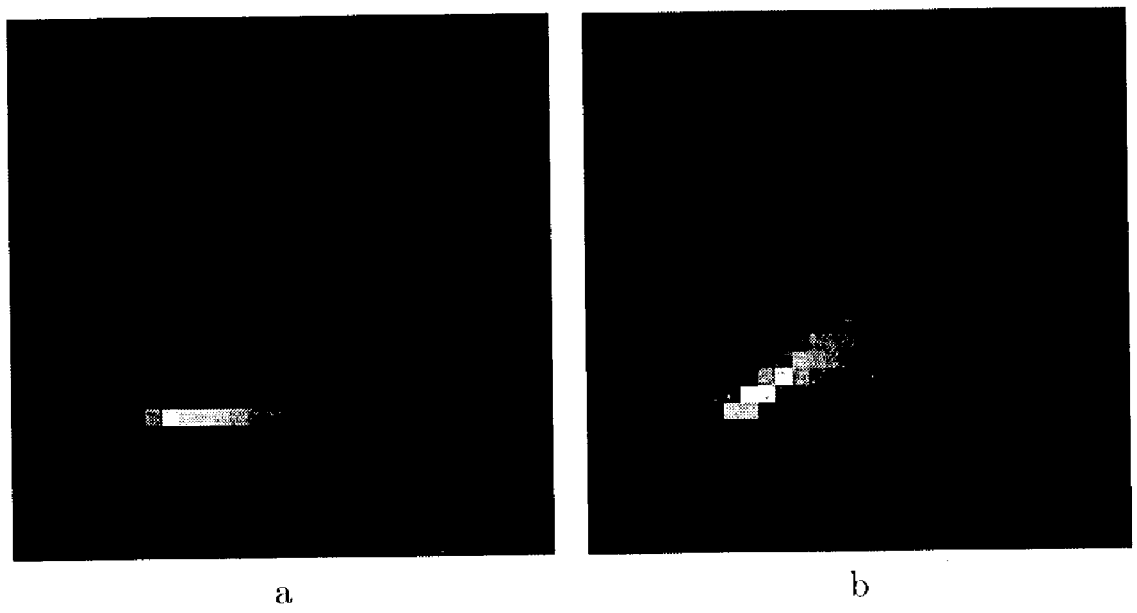
FIG. 4 is a pair of photographs of a display showing oscillations.

When the input—before discretization—is not bandlimited, aliasing and oscillation can occur both in the (discrete) input and solution. For example, if the discretization of h is a discrete impulse (a "1" at one position, with "0"s elsewhere), the corresponding continuous-space h is not a Dirac $\delta$-distribution, since the $\delta$-distribution is not band-limited. Instead, the continuous-space h corresponding to a discrete impulse is a sinc function centered on the impulse and with zero crossings at all other sample locations. The (standard) sinc function has a period of infinity. For finite periods, qualitatively similar functions arise. Between the sample locations the sinc oscillates above and below zero. If the discrete impulse is shifted by a non-integral number of samples, which can only fairly mean that the underlying continuous signal—the sinc function—is so shifted and then resampled, the discretization will no longer be a discrete impulse, but will have (discrete) oscillations. This phenomenon also appears in the solution of the direction process forward PDE (FIG. 4).

The corresponding backward equation $(\alpha I - L^*)f = h$ requires taking the adjoint of the direction process generator, which in this case amounts to flipping the signs on the first derivatives. Obeying these sign changes, the backward equations can be solved similarly.

Instead of numerically solving the direction process forward PDE, one can also compute the action $f = Gh$ by particle simulation. This technique amounts to the estimation of the integral kernel $g(x_0, y_0, \theta_0; x_1, y_1, \theta_1)$ for the continuous-space operator G (used to idealize $G = (g_{ij})$) directly by simulating a large number of particles behaving as the direction process, and then taking advantage of the interpretation that $g_{ij}$ is the average amount of time the particles spent in location j, given that they started at i, where i and j are discrete-space approximations of $(x_0, y_0, \theta_0)$ and $(x_1, y_1, \theta_1)$, respectively. Error will be introduced both in the time discretization required to track the individual particles on a digital computer and in the spatial discretization of the Markov process. The action f=Gh can be computed by explicit integration, leading to an $O(n^2)$-time computation. Not only are such integrations expensive, the particle simulations can be as well (to ensure that the averages have low variance[1]). To avoid the error due to the finite number of particles, Thornber and Williams (supra) also set up related diffusion processes in direction and scale for which convenient approximate formulas for their Green's function kernels were obtained analytically using the method of steepest descent.

[1] Since the particle simulations would be done only once, excessive computation times may be tolerable.

Results

To demonstrate the performance of the direct method we compared it with the first-order finite differencing method. To solve the direction process forward PDE with a first-order method, one can solve the corresponding (time-dependent) Fokker-Planck equation and then numerically integrate over time. Instead, we avoid the explicit time parameter by first analytically integrating over time and then applying the (unpreconditioned) conjugate method on the normal equations (see section 5.3), using the same upwind differencing for the spatial variables as in Thornber and Williams (supra).

In the first experiment, we illustrate the isotropy that results from the accuracy of the direct method, using a slightly blurred (twice convolved with a [1 1] box filter in the x- and y-directions) impulse as h. This experiment shows that at both 0° and 45° the direct method produces similar, but rotated results, whereas the first-order method result is much more diffuse for the 45° direction than for 0°. The difference is especially apparent close to the impulse: at 45° the first-order method result is not nearly as focused as the direct method result. See FIG. 3. In contour filtering applications, accurate results are especially important nearby the impulse, where most of the filtering action occurs. In computer vision, the damaging effect of the discrete grid has often been observed, where vertical and horizontal edges are much more easily enhanced than oblique ones. The direct method overcomes this anisotropy in the context of the direction process.

For the second experiment, we show the oscillations that occur in the direct solution when the (sampling of) h is a discrete impulse (FIG. 4). Here, the discrete impulse is the sampling of a (periodic) sinc function, giving rise to the oscillations observed in these solutions to the direction process forward PDE with the direct method. The initial distribution h is an (unblurred) impulse at (8, 8, 0) in (a) and (8, 8, 4) in (b). Parameters are $\sigma_{78}$ =0.1, $\alpha$=1/100 on a 32×32×44 grid. This phenomenon motivates the slight Gaussian pre-blurring that we used in FIG. 3 and elsewhere herein.

Figure 5:
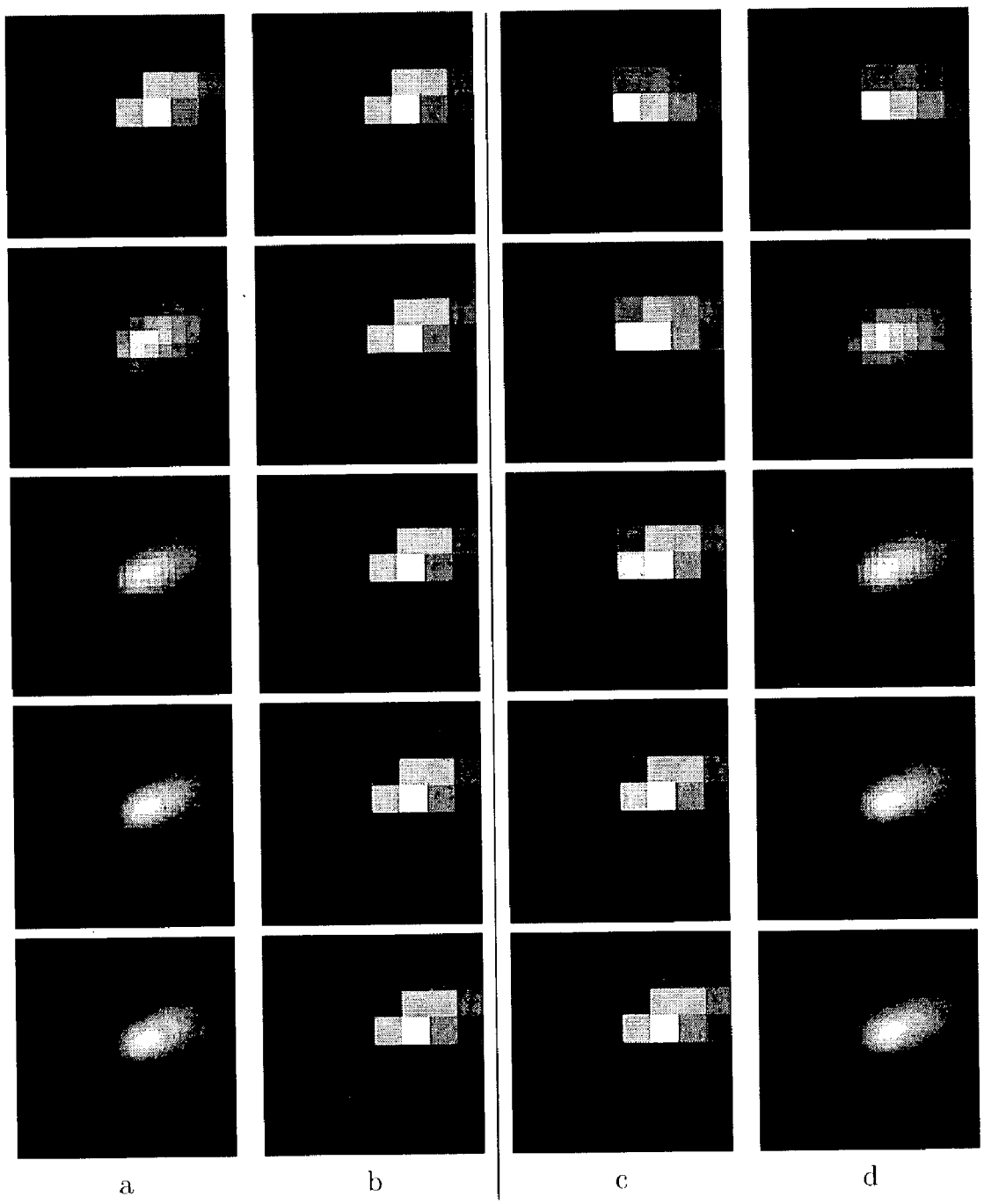
FIG. 5 is a set of photographs of a display showing a comparison of solution improvement with increased spatial resolution.
Figure 6:
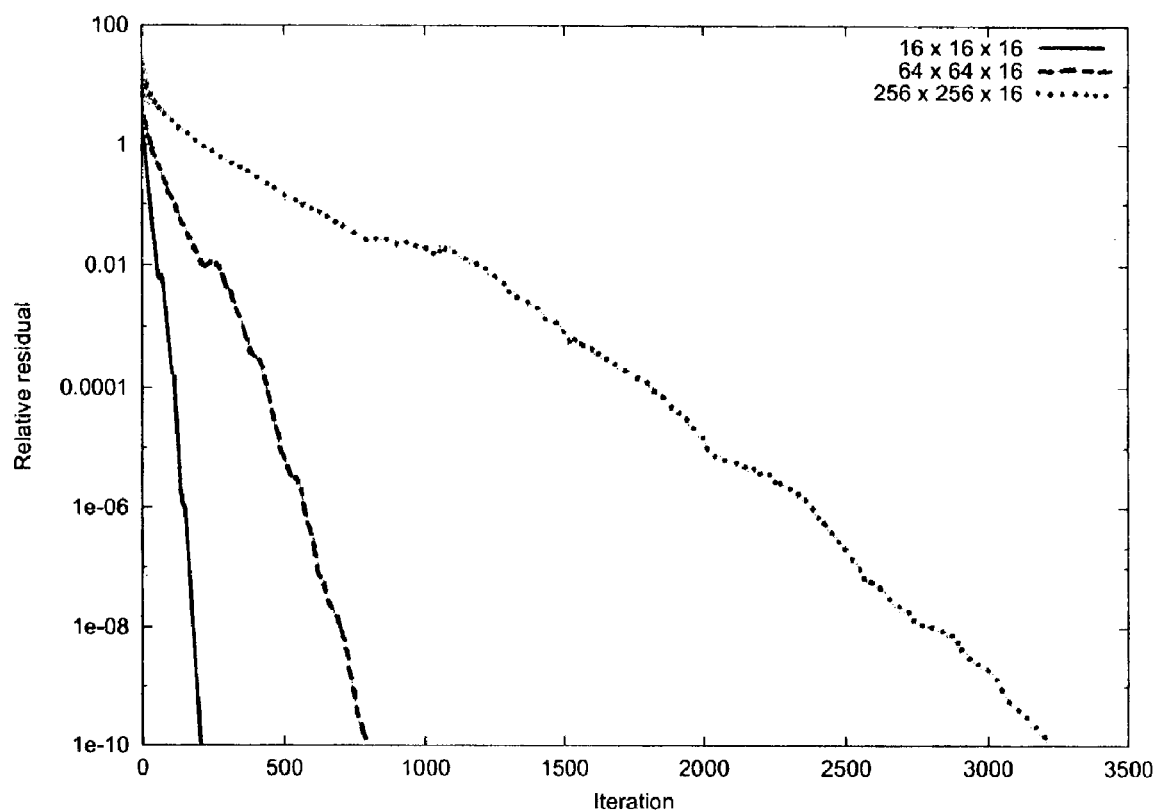
FIG. 6 is a plot of the relative residual against the number of iterations, at three resolution levels.

The next experiment was designed to illustrate the accuracy of the direct solution compared to finite differencing. A fixed stimulus h was chosen, e.g. a Gaussian, and the discretization was varied on a regular schedule to see the improvement in solution accuracy with successive doublings of spatial resolution. FIG. 5 shows a comparison of solution improvement with increased spatial resolution. The direction process forward PDE was solved on $[0, 1]^2 \times [0, 2\pi]$ with periodic boundary conditions for input b a Gaussian centered at (½,½,⅜) with standard deviation 1/16 in all three dimensions. Parameter values are $\sigma_\kappa=\alpha=1$. In column (a) are shown the integrals over $\theta$ for the direct method solution, for discretization n×n×16, where n=8, 16, 32, 64, 128 (top to bottom) and $\Delta x=\Delta y=1/n$. To facilitate comparison, column (b) shows the solution in column (a) subsampled to an 8×8 grid. Observe the slight change from the 8×8 to the 16×16 resolution, with no visible improvement thereafter (also see FIG. 7). In columns (d) and (c) are the corresponding results for the first-order method. The relative residual in the conjugate gradient iterations (see section 5.3, except set c=0) for the first-order method were held to less than $10^{-10}$, and up to 10,000 iterations were allowed (but fewer iterations were generally needed to achieve the desired relative residual). FIG. 6 shows the convergence of the first-order method (via the decrease in relative residual with iterations of conjugate gradient method), and reveals that larger resolutions converge much more slowly. Each plot is for the same Gaussian input sampled at the resolutions shown. The computational burden of the iterave first-order method was many-fold longer in the larger resolutions, taking on the order of a day on a 600 MHz Pentium II. The direct method only took half a minute.

To put the direct and first-order methods into clearer contrast, we re-plotted columns (b) and (c) of FIG. 5 to show, for each method, the rate at which the solution is changing (which we assume to mean improving) with increasing resolution. To save storage space, computation, and, most importantly, achieve a solution accuracy as close to machine precision as desired, it is important that the solution improves quickly as a function of increasing resolution. For each method, we measured the relative change in the solution over the common 8×8 subgrid from scale k to scale k+1 as a function of scale. Let $h_{8\times8}(2^k)$ be the solution obtained on the 8×8 subgrid at resolution $2^k \times 2_k$. The relative change in solution is $$\frac{\| h_{8\times8}(2^{k+1}) - h_{8\times8}(2^k) \|}{\| h_{8\times8}(2^{k+1}) \|}.$$

Figure 7:
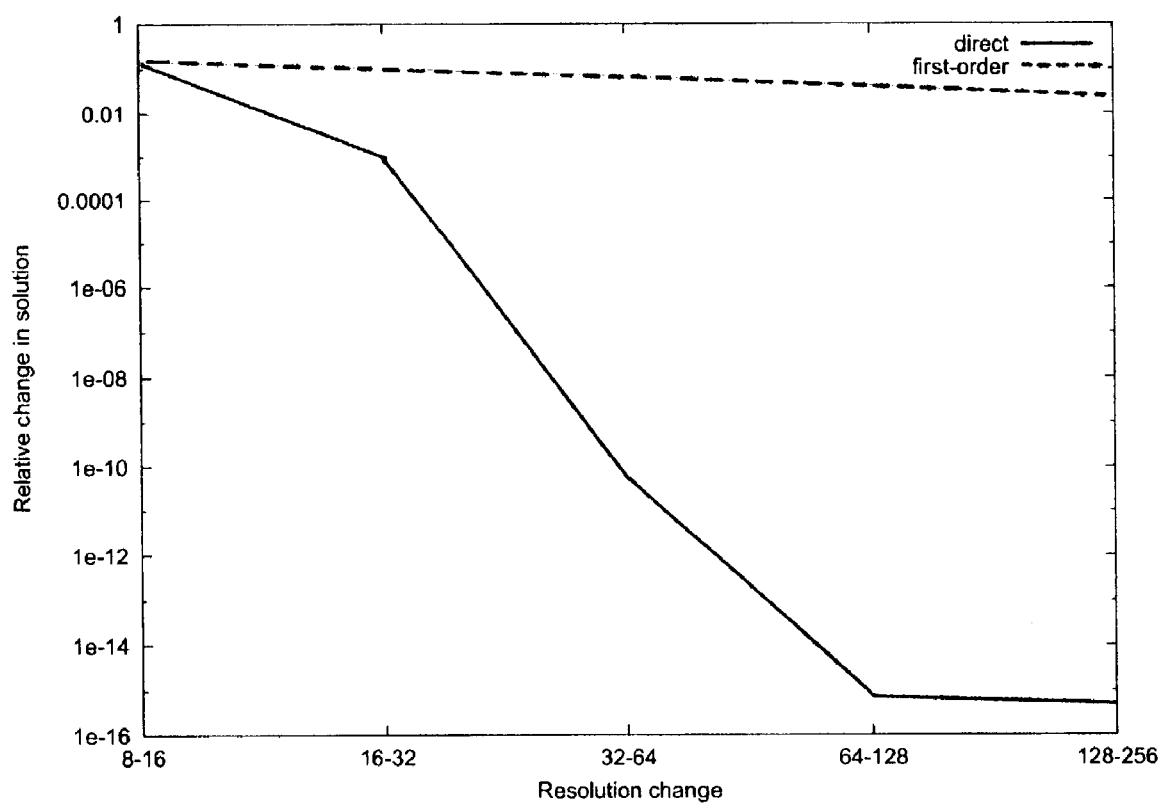
FIG. 7 is a plot of relative change in the solution against increase in resolution.

See FIG. 7, which shows the rate of improvement in solution with increase in resolution. For the first-order method, we observe that the relative change in solution is greater than 10% for the 8×8 to 16×16 resolution change. This relative change in solution decreases very slightly, so that after four doublings of resolution, the relative change is still several percent. For the direct method, the results are dramatic: at first the relative change in solution is about the same as for the first-order method. But by the 64×64 to 128×128 resolution change, the relative change is on the order of machine precision (about $10^{-15}$). The small improvement for the next increase in resolution furthur illustrates that the machine precision limit has been achieved. The direct and first-order methods were implemented in Python with the numerical Python library and C extensions under GNU/Linux.

5.2.2 Curvature Process

To compute the action f of the Green's operator G for the curvature process on a vector h, we recall the curvature process generator (2.7) to set up the curvature process forward PDE $$\alpha f - \frac{\sigma^2}{2}\frac{\partial^2 f}{\partial \kappa^2} + \cos\theta\frac{\partial f}{\partial x} + \sin\theta\frac{\partial f}{\partial y} + \kappa\frac{\partial f}{\partial \theta} = h, \qquad (5.5)$$

where $\sigma=\sigma_\kappa>0$. The action of the Green's operator G is then defined as our numerical solution to (5.5). To balance performance and simplicity, we use a combination of finite differencing and basis projection. To keep the desired rotational isotropy and solution focus, we project f with respect to only the x-, y-, and θ-dimensions on the same complex exponential basis that we used for the direction process to obtain $\hat{f}_{jkl}(\kappa):=<f(.,.,.,\kappa); \phi_{jkl}>_{\mathbb{R}^2_x\mathbb{R}}$ for frequencies j, k, and l. The κ-dimension is discretized into M uniform samples using finite differencing, as follows. We first write $\hat{f}_{jkl;m'}=\hat{f}jkl(m'\Delta\kappa)$, where $\kappa=m'\Delta\kappa$ for integer m' and stepsize $\Delta\kappa>0$. The input h is discretized similarly. Then we approximate $$\frac{\partial^2 f}{\partial \kappa^2}$$

with $(g_{m'-1}-2g_{m'}+g_{m'+1})/(\Delta\kappa)^2$, for $g_{m'}:=f(x, y, \theta, m'\Delta\kappa)$.

Taking the (x, y, θ)-projection of (5.5) onto the complex exponential basis, we can reuse the direction process results, noting that $<\partial f/\partial\theta, \phi_{jkl}>_{\mathbb{R}^2_x\mathbb{R}}=il\hat{f}_{jkl;m'}$. We assume the same bandlimitedness (with respect to (x, y, θ)) of h as in the direction process, and so are led to solve for the lowest J, K, L frequencies in (x, y, θ) of f in terms of those of h. Combined with the finite difference approximation in κ, we now need to solve $$\left(\alpha + \frac{\sigma^2}{(\Delta\kappa)_1^2} + ilm'\Delta\kappa\right)\hat{f}_{j,k,l;m'} - \frac{\sigma^2}{2(\Delta\kappa)^2}(\hat{f}_{j,k,l;m'-1}+\hat{f}_{j,k,l;m'+1})+ \qquad (5.6)$$
$$\pi\left(\frac{ij}{x_{max}}+\frac{k}{y_{max}}\right)\hat{f}_{j,k,l-1;m'}+\pi\left(\frac{ij}{x_{max}}-\frac{k}{y_{max}}\right)\hat{f}_{j,k,l+1;m'}=\hat{h}_{j,k,l;m'}.$$

The same periodic boundary condition in l is used as in the direction process case. We use zero boundary conditions in m' to put an upper bound on curvature.

Observe that for each j and k, equation (5.6) is an (L·M)×(L·M) sparse linear system in l and m'. Although the computationally advantageous tridiagonality of the directional process case has been lost, we note that we are often interested in small L and M (the numbers of discrete directions and curvatures, respectively). The overall complexity of this system is O((JKLM)log(JKLM))+O(JK(LM)³), using LU decomposition to solve the linear system.

5.3 Applying the Biased Green's Operator

In this section we present a method for computing the action f of the biased Green's operator $G_c$ on a vector h. Equivalently, we must solve the linear system $$-(Q+C)f=h \qquad (5.7)$$

where $Q=\alpha I-L$ and C is a (possibly non-constant) diagonal operator with $c=(c_i)$ along the diagonal. See section 3.4 for how this equation arises in the Feynman-Kac formula. Because of Khas'minskii's condition (Proposition 3), we know that there is a unique solution to this equation as long as c is sufficiently small.

We first assume that we are given a method for solving $-Qf=h$, i.e.:

$$f=Gh.$$

Such methods were just provided in section 5.2.1 and section 5.2.2 for the direction and curvature processes, respectively. Observe that G is a discretization of an integral operator, as it is the inverse of a discretization αI−L of differential operator $\alpha-\mathcal{L}$. Loosely, recall that, for the direction process, G represents a kind of blurring of a directed edge map (function of (x, y, θ)) in the tangent direction θ.

Now, instead of solving the (5.7) as (a discretization of) a PDE, we will convert it into (a discretization of) a integral equation by multiplying (5.7) by G on the left:

$$A_1f:=G(-Q-C)f=(I-GC)f=Gh=:b_1.$$

This procedure is known as preconditioning a linear system. Since we multiplied −Q−C by G on the left, we shall say that $A_1u=b_1$ is preconditioned on the left. One can instead make the substitution f=Gv and solve the linear system:

$$A_2v:=(I-CG)v=(-Q-C)Gv=(-Q-C)f=h=:b_2.$$

Since G appears to the right of −Q−C, we shall say that $A_1u=b_1$ is preconditioned on the right. The idea behind preconditioning is that we turn a system that may be badly behaved (such as a differential equation) into one which is better behaved, such as an integral equation.

To solve Au=b, where $A=A_i$, $b=b_i$, i=1, 2, we will invoke the conjugate gradient method. Unfortunately, this method requires a symmetric and positive definite linear system, but Q and therefore A is not symmetric. One technique for circumventing the asymmetry of A is to multiply (5.7) on the left by its transpose A*, forming the normal equations $$A^*Au=A^*b, \qquad (5.8)$$

where A*A is symmetric because (A*A)*=A*(A*)*=A*A and positive definite because x*A*Ax=(Ax)*(Ax)=‖Ax‖² >0 for nonsingular A unless x=0. Now, we can apply the (iterative) conjugate gradient method directly to (5.8) in order to solve for u in the sense that the relative residual ‖A*Au−A*b‖/‖A*b‖ is reduced to less than some tolerance level. We can then apply the above definitions to get f itself.

5.4 Solving for the Biased CIRF Approximation of the Posterior

In section 4.8 we derived coupled nonlinear systems for filtering. Because of the presence of blur in a number of applications, we elected to solve the nonlinear system in equations (4.31) and (4.32). Left multiplying these by $Q^{-1}$ and $Q^{*-1}$ respectively, we get the following system:

$$f-\epsilon GCf+v'=0 \qquad (5.9)$$
$$b-\epsilon G^*Cb+\mu'=0 \qquad (5.10)$$

where C:=diag(a+2NA(f·b)), v'=Gv, and µ'=G*µ. To solve this nonlinear system, we adopted a continuation strategy in ε (K. Georg. Matrix-free numerical continuation and bifurcation. *Numerical Functional Analysis and Optimization*, 22:303–320, 2001). Specifically, we began with ε small, solved the system, and then used that solution to get an initial condition for the system with ε slightly larger. We proceeded in this fashion until we reached the value of ε required. To solve this system for any such fixed ε, we used Newton's method, where often only a few iterations are required because of the Newton method's powerful local convergence properties. To bootstrap this continuation process with a starting initial condition (corresponding to the smallest value of $\epsilon$), we set C=diag(a) (i.e., neglecting the nonlinearity) and then solved the resulting decoupled equations, which evidently are the biased CIRF Green's operator equations that we saw in the previous section. We now apply our filters to images.

Section 6, 6.1 Results

In this section we illustrate the performance of CIRF filters. We begin by applying direction process-based Volterra filters to some synthetic images and later to a few natural images. The Volterra filter is also briefly compared to the biased CIRF approximation filter, where the latter shows more powerful noise cleaning action. We conclude with some examples of the curvature process-based CIRF filter.

6.2 Contour Filtering in $\mathbb{R}^2 \times \mathbb{R}$ with Direction

The first test of the CIRF framework was with the MMSE Volterra filters using the direction process in $\mathbb{R}^2 \times \mathbb{R}$. With the direct method for computing the action of G and G* from the last section, applying these filters requires substitution into the Volterra formulas in Result 1. We selected parameters as follows. Because the density parameter $\eta$ is an overall multiplicative constant, it amounts to a threshold setting. We developed a user interface to select the parameters $\epsilon$, $\zeta$, the threshold, and the order of the filter. By inspection of the Volterra filtering formulas, one can do most of the computation before parameter selection. Then, for each parameter setting, only a few fields need to be weighted and added; this means that parameters can be chosen rapidly; typically, selecting parameters took less than a minute. In most examples we let $\zeta$ be small (usually 0) and let $\epsilon$ be about 10, although the exact setting of $\epsilon$ did not appear to have a great effect. In the end the user interface was most useful for setting the threshold and comparing the different orders of filter.

Because of the computational efficiency of the Volterra filters, we were able to test them on a number of examples. To assess the robustness of the Volterra filter in the presence of noise, we evaluated responses to images of a horizontal straight line corrupted by additive Gaussian noise of variance $\sigma_N^2$. We characterized the degree of noisiness using the peak signal-to-noise ratio, which, for an image I taking values in the range $I_{min}$ to $I_{max}$, is $$\text{Peak } SNR = 20 \log_{10} \frac{I_{max} - I_{min}}{\sigma_N},$$

expressed in decibels. To map from the planar image to a field on discrete $\mathbb{R}^2 \times \mathbb{R}$, we simply copied the image to each direction, so that our measurements m=m(x, y, $\theta$) were constant in $\theta$. We were able to select this mapping because the images were purely contours embedded in noise. More generally an oriented local edge or line operator would be applied, as we shall see when we consider natural images.

Figure 8:
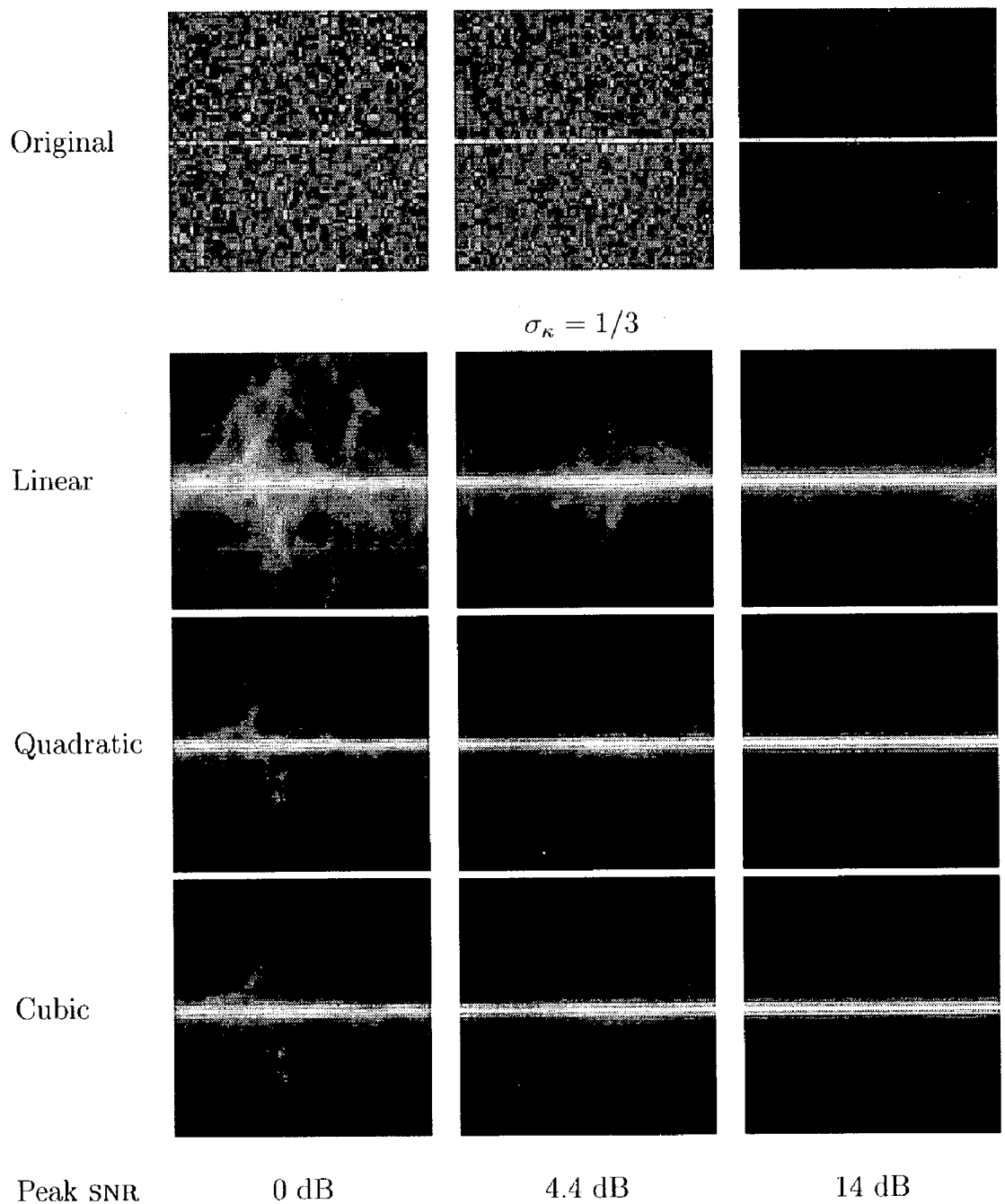
FIG. 8 is a set of photographs of a line in the presence of noise, and the enhancing effect of Volterra filtering at one set of parameters.
Figure 9:
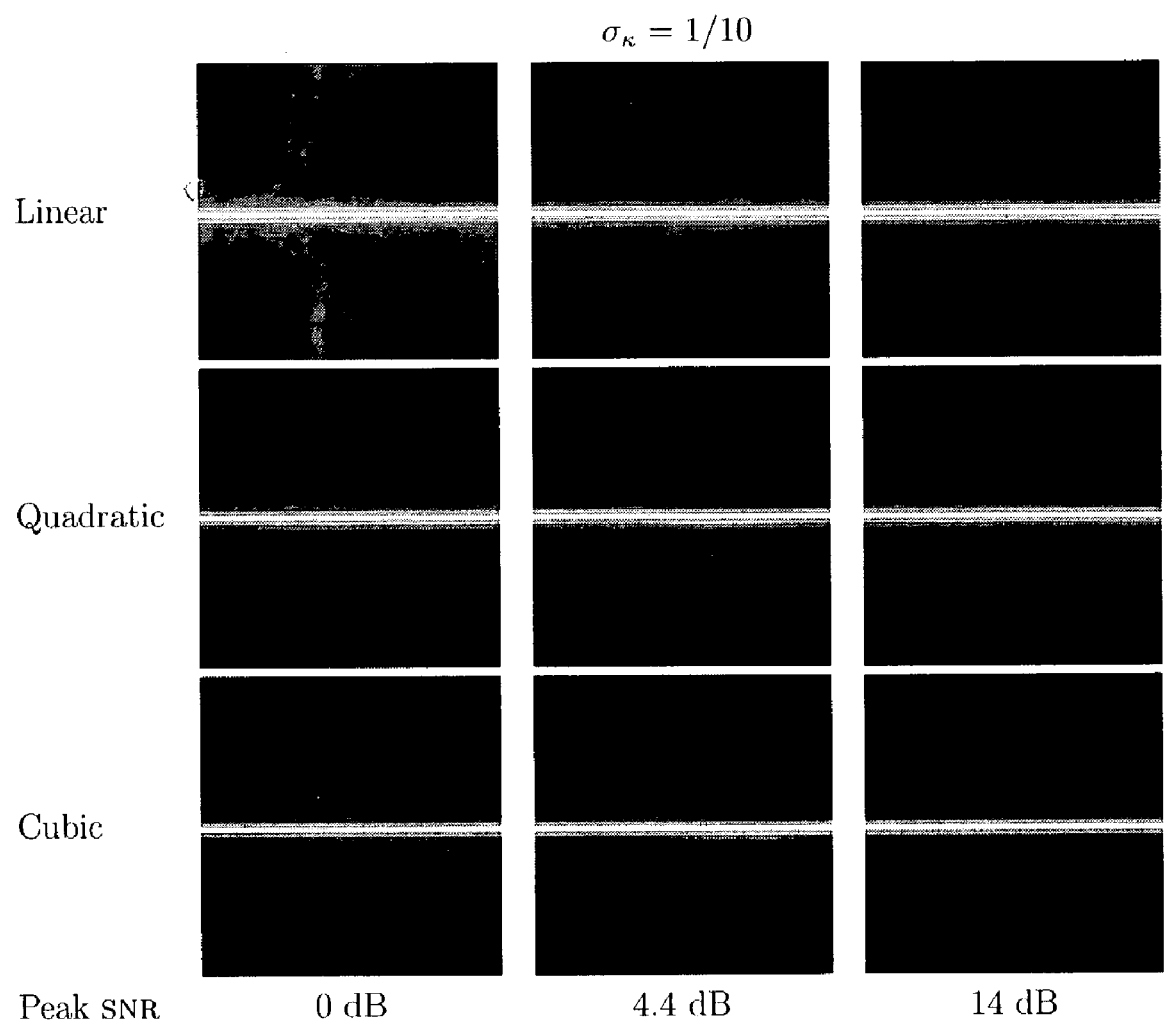
FIG. 9 is a set of photographs of a line in the presence of noise, and the enhancing effect of Volterra filtering at aother set of parameters.
Figure 10:
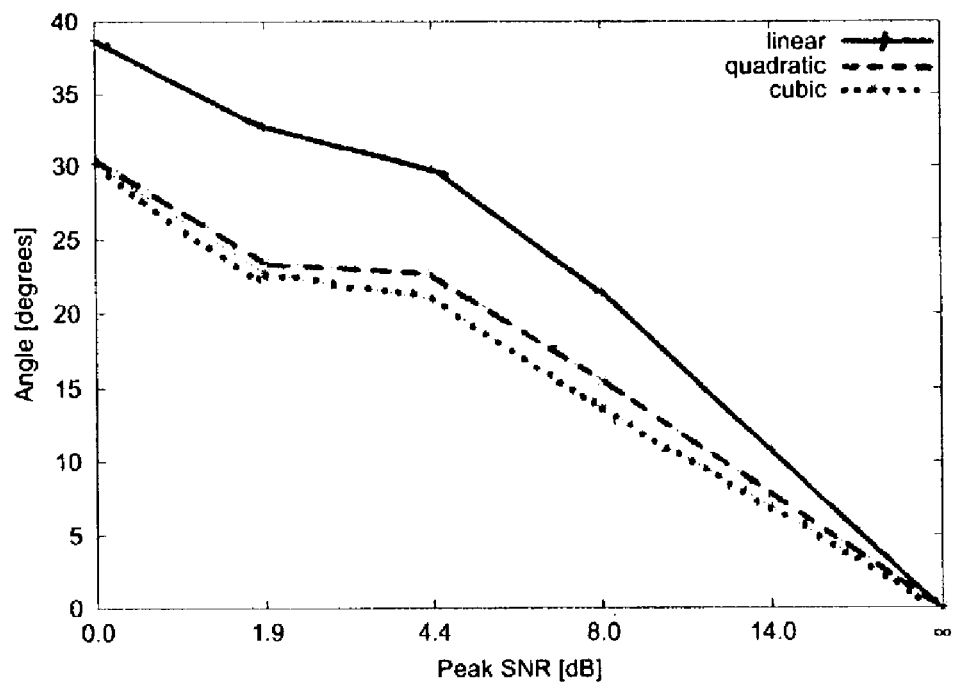
FIG. 10 is a pair of plots for comparing the performance of the Volterra filters used in FIG. 8 and FIG. 9.
Figure 10:
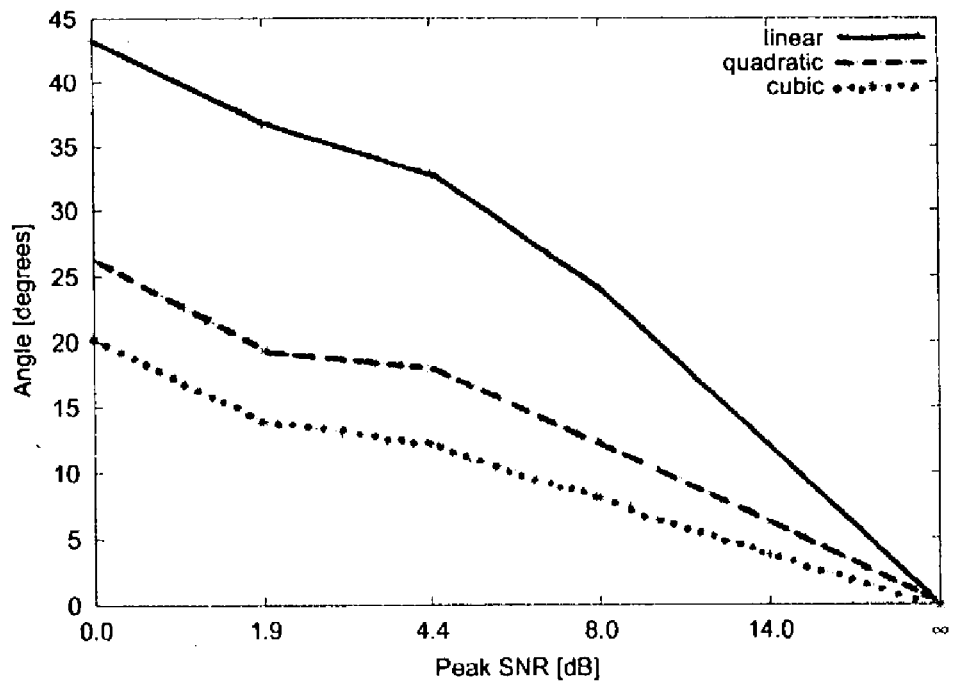

To avoid the aliasing effect illustrated in FIG. 4, for all experiments in this section we convolved the input with a Gaussian having a standard deviation of 1 pixel in all dimensions before applying a CIRF filter. The results of applying the linear, quadratic, and cubic Volterra filters to the noisy line image are shown in FIG. 8 and FIG. 9, where the display is produced by taking the maximum response over all directions $\theta$ for each position (x, y). FIG. 8 shows enhancing of a line in the presence of noise. The original images are in the top row, and the corresponding direction process-based MMSE CIRF Volterra filter responses are as indicated in the rows below. Parameters are $\epsilon$=10, $\zeta$=0, $\sigma_\kappa$=⅓, $\lambda$=100, and 64 directions. FIG. 9 also shows enhancement of a line in the presence of noise (continued from FIG. 8). Parameters are $\epsilon$=10, $\zeta$=0, $\sigma_\kappa$=¹⁄₁₀, $\lambda$=100, and 64 directions. Observe the much-reduced response away from the curve compared to the case $\sigma_\kappa$=⅓ in FIG. 8, especially in the quadratic and cubic Volterra responses. For a quantitative comparison, see FIG. 10. Observe that while the filter responses are strongest along the line, there is some response elsewhere, especially for the linear filters. This extra response can be thought of as weaker contour hypotheses, and conveys how a field model can parsimoniously express the infinite space of contour explanations. We also observe that as the order of the filter is increased to quadratic and then cubic, the response becomes increasingly focused on the desired line. To quantify these results, we placed the responses as vectors in very high-dimensional spaces. For these 64×64×64 fields, the dimension of this space is 262, 144. Then, each response was then centered by subtracting its average value from itself. For each kind of filter order (linear, quadratic, and cubic), we measured the angle between the (high-dimensional) vector $\tilde{u}_1$ representing the noiseless (centered) response and the vector $\tilde{u}_2$ representing the (centered) response under a particular level of noise. The angle (in degrees) between centered responses $\tilde{u}_1$ and $\tilde{u}_2$ is defined as:

$$\frac{180°}{\pi} \cos^{-1} \frac{\langle \tilde{u}_1, \tilde{u}_2 \rangle}{\|\tilde{u}_1\| \; \|\tilde{u}_2\|},$$

where $<\tilde{u}_1, \tilde{u}_2>$ is the Euclidean inner product between $\tilde{u}_1$ and $\tilde{u}_2$, and $\|u\|=\sqrt{<u,u>}$. FIG. 10 shows noise performance of direction process-based MMSE CIRF Volterra filters. Plotted is the angle between the centered filter responses to the noisy and noise-free images shown in FIG. 8 (top plot in FIG. 10) and FIG. 9 (bottom plot in FIG. 10). Observe the quantitative improvement of the quadratic and cubic nonlinear filters compared to the linear result (FIG. 10); this nonlinear advantage appears even greater as $\sigma_\kappa$ is made smaller, i.e., when the contours are assumed to be straighter.

Figure 11:
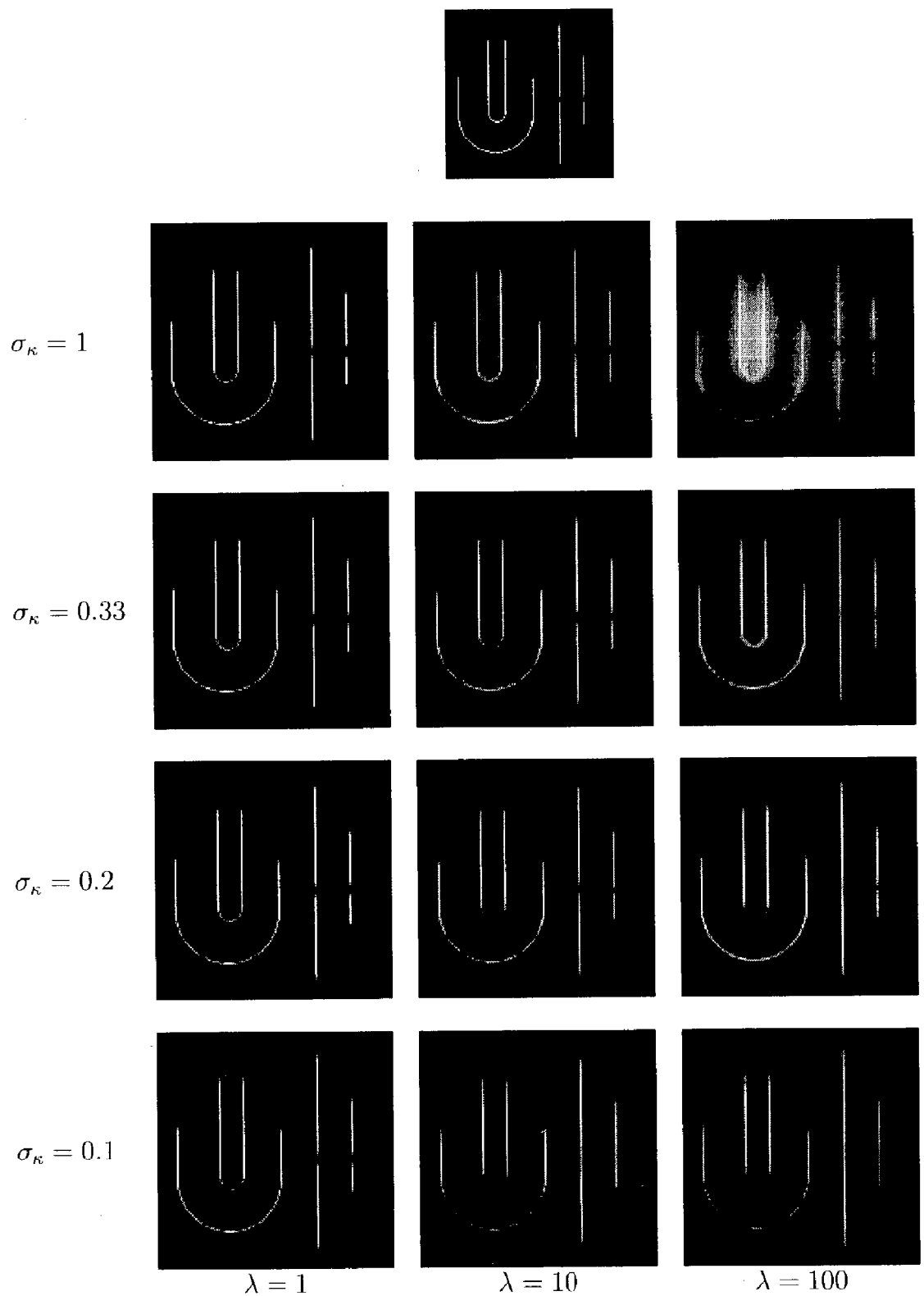
FIG. 11 is a set of photographs of curved contours. The photographs show the effect of varying parameters on image enhancement by a cubic Volterra filter.

To study the effect that the parameters of the direction process have on our filtering results, we created an image containing curves of different curvatures and lines with gaps, and then applied the direction process-based MMSE CIRF cubic Volterra filter at a number of parameter settings. FIG. 11 shows the effect of varying the direction process parameters $\sigma_\kappa$ (bottom four rows, top to bottom) and $\lambda$ (left to right) on the cubic MMSE CIRF Volterra filter output for the input at the top. The number of directions used in each test was 16, 16, 32, and 64, for $\sigma_\kappa$ settings of 1, 0.33, 0.2, and 0.1, respectively; using more directions has a negligible visible effect. The image at the top was input to the filter by copying the image over all directions $\theta$ (black is 0, and white is 1); no noise was added, although discretization artifacts are evident in the semi-circular contour regions. The brightness of the filter outputs (bottom four rows) was obtained from the maximum response over all directions $\theta$ at each position (x, y). Values of $\sigma_\kappa$ that we have often used in experimenting with the Volterra filters correspond to the bottom three rows. For $\lambda$=100 (a typical value in our work), we observe that the gaps are partially filled at $\sigma_\kappa$=0.33, and are more strongly completed as $\sigma_\kappa$ is decreased to 0.1. However, the small half-circle in the center is attenuated at small $\sigma_\kappa$, as large curvatures in the direction process become more improbable. Because the filter output is not sensitive to variations in $\lambda$ when $\lambda$ is large (around 100, say), we used a logarithmic scale in $\lambda$. For $\lambda$=10, slightly greater attenuation in the gaps and at the small semi-circle can be seen. When $\lambda$=1, the filter is effectively "turned off". For comparison, we also include the results for $\sigma_\kappa$=1, which corresponds to curves with little smoothness (they approach planar Brownian motion-like behavior). This experiment emphasizes the tradeoff between resiliency to noise (as represented by the gaps) and performance at high curvatures.

Figure 12:
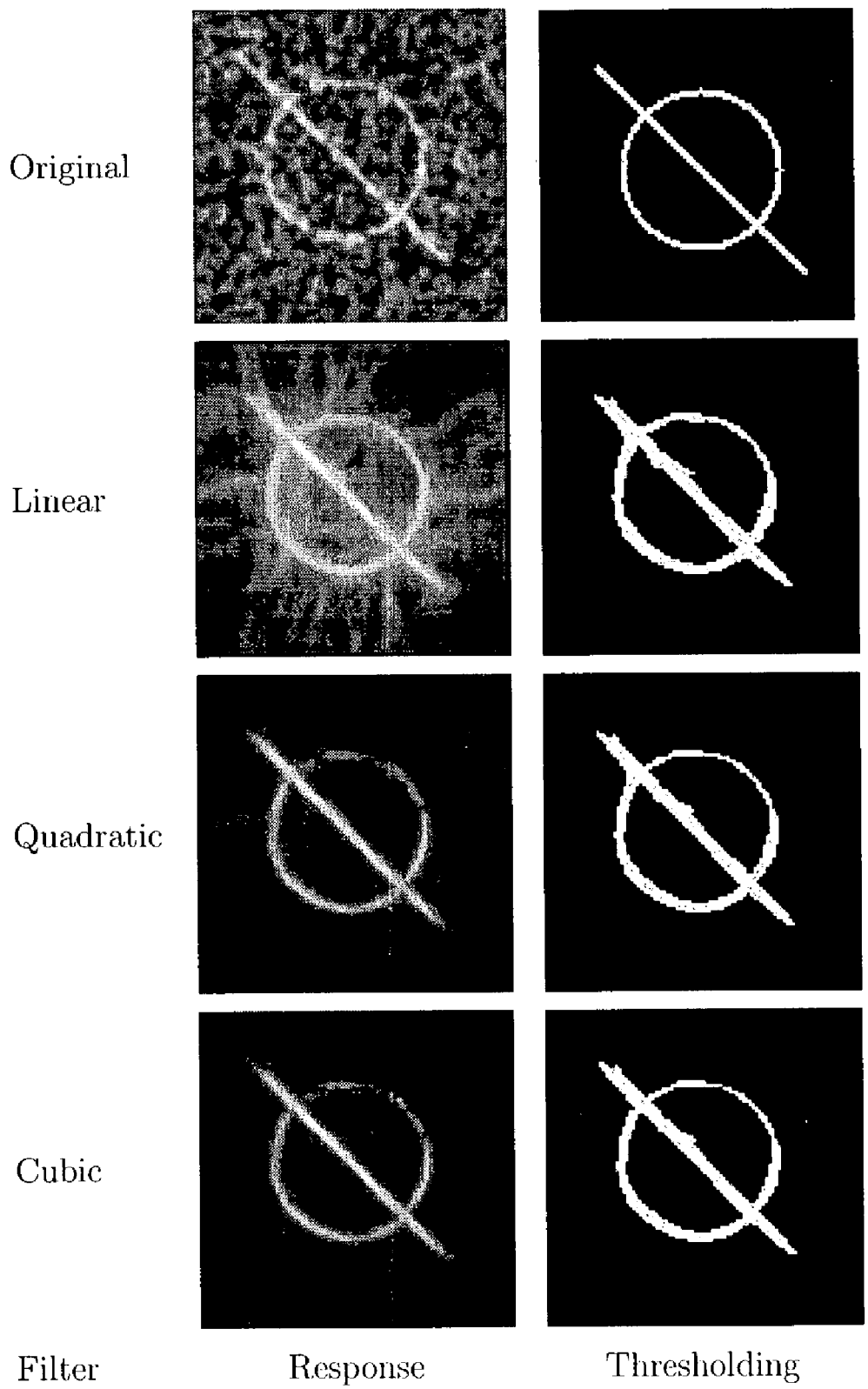
FIG. 12 is a set of photographs showing the effect of Volterra filtering on an image containing contours which cross or intersect.

We then tested the filter's response on both open and closed curves. FIG. 12 shows the filtering of crossing contours with direction process-based Volterra filters ($\epsilon$=10.5, $\zeta$=0, $\sigma_\kappa$=⅕, $\lambda$=100, and 32 directions). Image before adding white noise is at the top right; the noisy image (peak SNR=4.2 dB) at the top left was the input (copied over all directions $\theta$). Observe that both curves are preserved in the filter responses (bottom three rows, left) and their thresholding (bottom three rows, right). Despite the crossings of the curves, the noise cleaning action is sufficiently good that simple thresholding is sufficient. Observe carefully the response is well resolved at the contour crossings; this happens even though we have not included the blur inherent in the loss of local direction in the original 2-dimensional image: by copying the input image over $\theta$ to produce the input, we have effectively produced the maximum possible blur in $\theta$.

Figure 13:
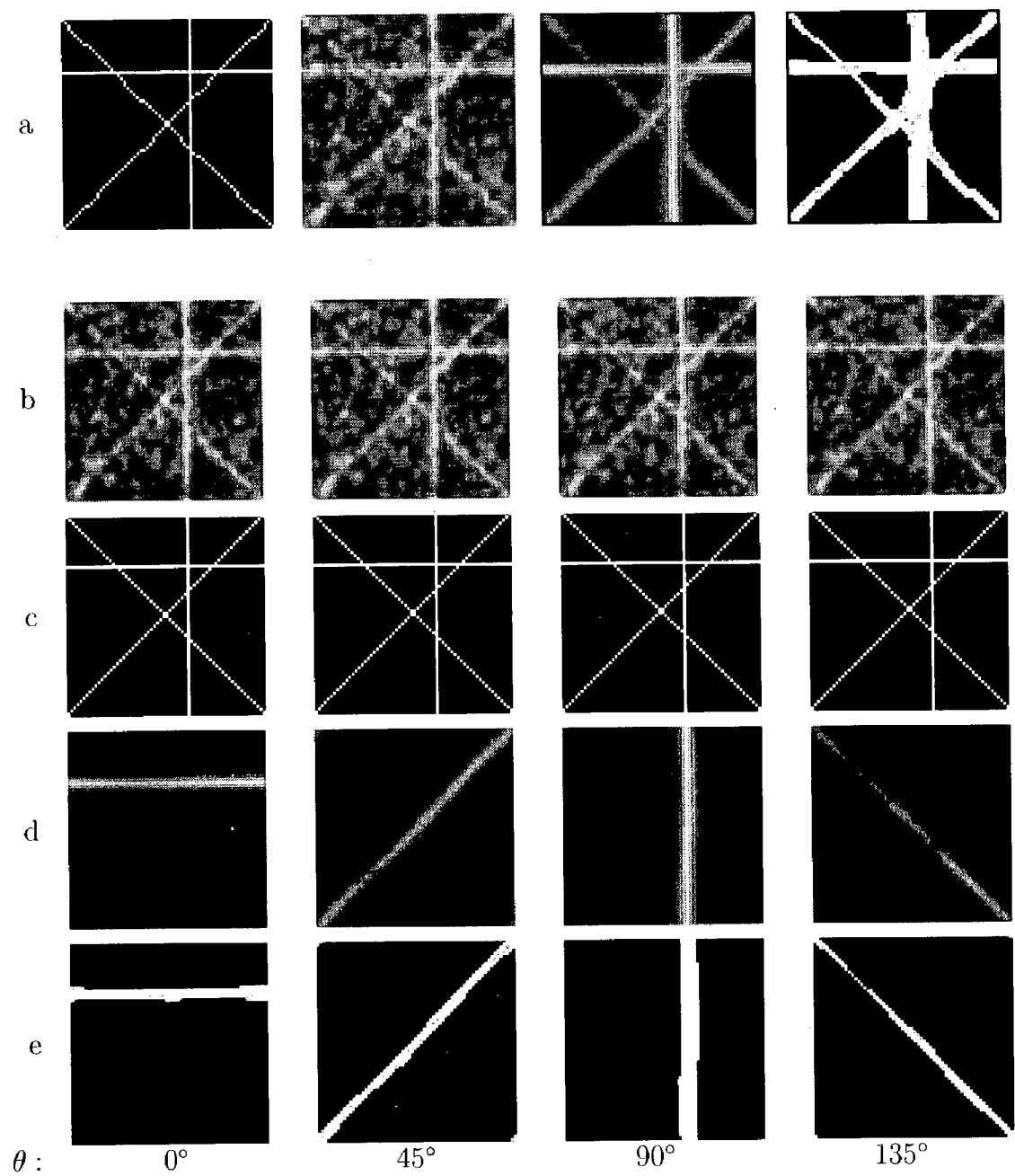
FIG. 13 is a set of photographs showing how the crossing contours in an image can be teased apart by a Volterra filter.

To test the behaviour of the filter at crossings more strenuously, we created an image with several nearby crossings. FIG. 13 shows how crossing lines are teased apart with the cubic Volterra filter. From left to right in row (a): original image, image corrupted with additive white Gaussian noise (peak SNR=8 dB), cubic Volterra filter response ($\epsilon$=10.5, $\zeta$=0, $\sigma_\kappa$=⅒, $\lambda$=100, and 64 directions), and thresholded response. Noisy image was copied over all directions to form filter input (row (b); for comparison we include the corresponding noise-free "stack" of direction-specific images in row (c)), then filtered with the high-noise MMSE CIRF cubic Volterra filter (row (d)), and thresholded (row (e)). Observe how the initially strong responses at the inappropriate directions are chiseled away by the action of the filter, despite the presence of noise. Such crossings pose a problem for the isotropic smoothing often applied to cope with noise: the nearby junctions will merge with a sufficiently large blur kernel. The Volterra filter does perform smoothing of a sort, but primarily along contours, and therefore the preservation of junctions is possible. This crossing-preservation behaviour is exactly what is observed in the cubic Volterra result (FIG. 13, top, second from right); in addition, quite powerful orientation-selectivity is apparent (fixed $\theta$ slices of the response are shown in row (d) of FIG. 13).

Figure 14:
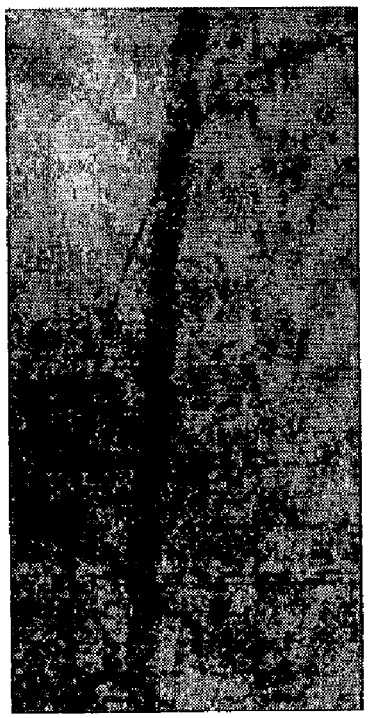
FIG. 14 is a set of photographs showing images of a surgical guide wire.
Figure 14:
Figure 14:
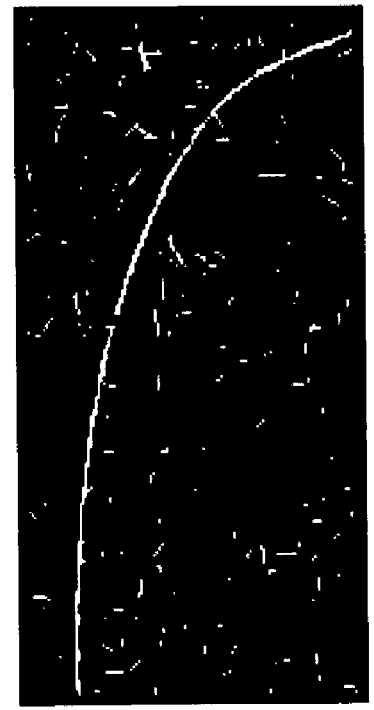
Figure 15:
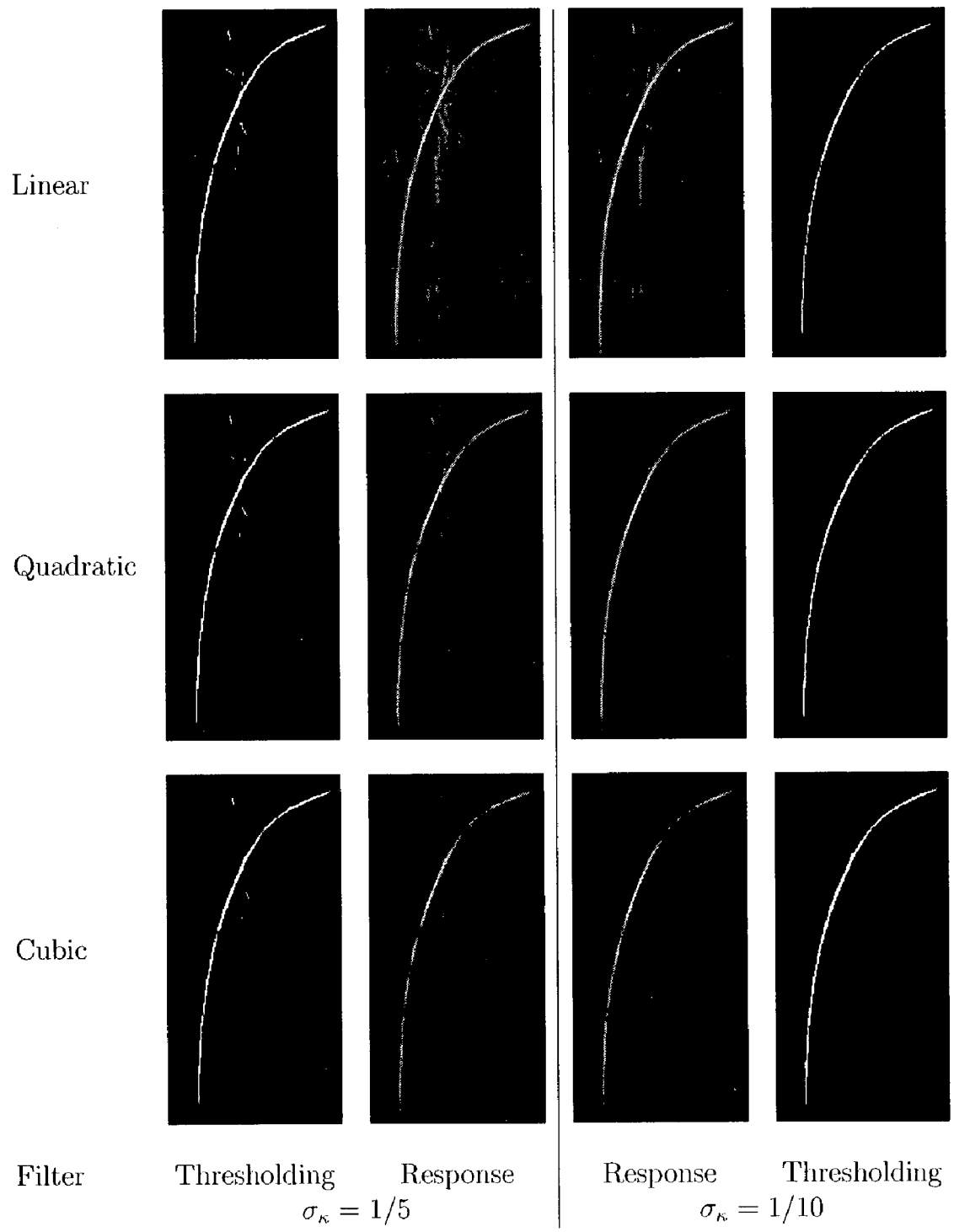
FIG. 15 is a set of photographs showing enhancement of image of the surgical guide wire shown in FIG. 14 by Volterra filtering.

We next applied the Volterra filters to two natural images. Instead of simply copying the image over directions to form the input, we obtained the filter input m from the output of the logical/linear operator for negative-contrast lines (with parameter degree d=0.1 in Iverson's implementation (code and settings available at http://www.ai.sri.com/leei/loglin.html.), and other values at their default). The first example is of a guide wire imaged fluoroscopically during surgery. FIG. 14 shows a fluoroscopic image of guide wire (left), logical/linear negative-contrast line responses (center) and their thresholding (right). Finding the wire in noise is particularly important, because surgery can take hours, all the while exposing the patient to radiation. Reducing such radiation exposures unfortunately also increases the noise level and makes local filtering (e.g., edge and line operators) perform more poorly. With the MMSE CIRF Volterra filters, we can readily enhance the guide wire contour. Given an input image of FIG. 14 (center), in FIG. 15 we see the guide wire in the responses to high-noise Volterra filters (Result 1) for a direction process-based CIRF ($\epsilon$=10.5, $\zeta$=0, $\lambda$=100, in all cases) with $\sigma_\kappa$=⅒× and 64 directions (left), and with $\sigma_\kappa$=⅕ and 32 directions (right). Observe how the cubic filter at $\sigma_\kappa$=⅒ enhances the guide wire. To produce these two dimensional images from the actual discrete (x, y, $\theta$)-space responses, the maximum over $\theta$ was taken.

Figure 16:
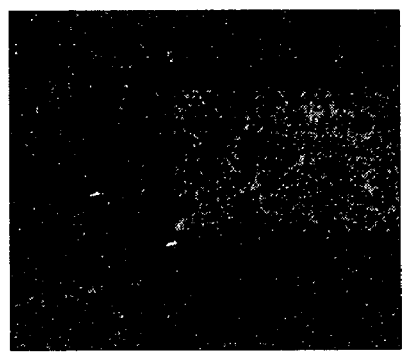
FIG. 16 is a set of photographs of images of a ship's wake and the image enhancement effects of Volterra filtering.
Figure 16:
Figure 16:
Figure 16:
Figure 16:
Figure 16:
Figure 16:
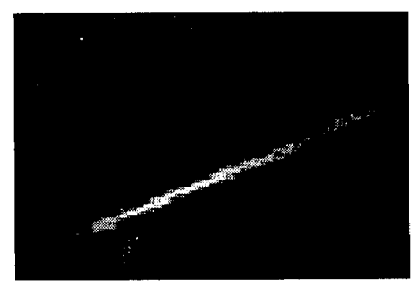
Figure 16:
Figure 16:
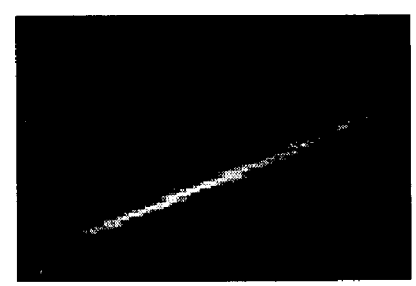
Figure 16:
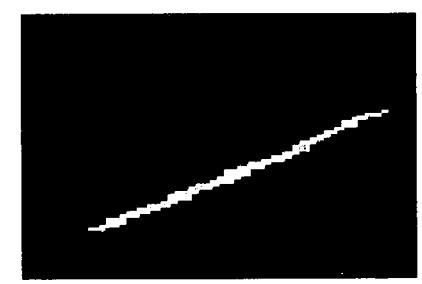

Another example is the ship's wake shown in FIG. 16 (top left). For this demonstration, we work with the magnified section shown in FIG. 16 (top right), and then obtain logical/linear negative-contrast line responses (with degree 0.1) and their thresholding (second row). Responses to high-noise Volterra filters (Result 1) for the direction process-based CIRF ($\epsilon$=10.5, $\zeta$=0, $\sigma_\kappa$=1/15, $\lambda$=100, and 96 directions) is shown in the bottom three rows of FIG. 16. To produce these two dimensional images from the actual discrete (x, y, $\theta$)-space responses, the maximum over $\theta$ was taken. Observe how the many bogus responses in the thresholded local responses are not present in the Volterra results.

Figure 17:
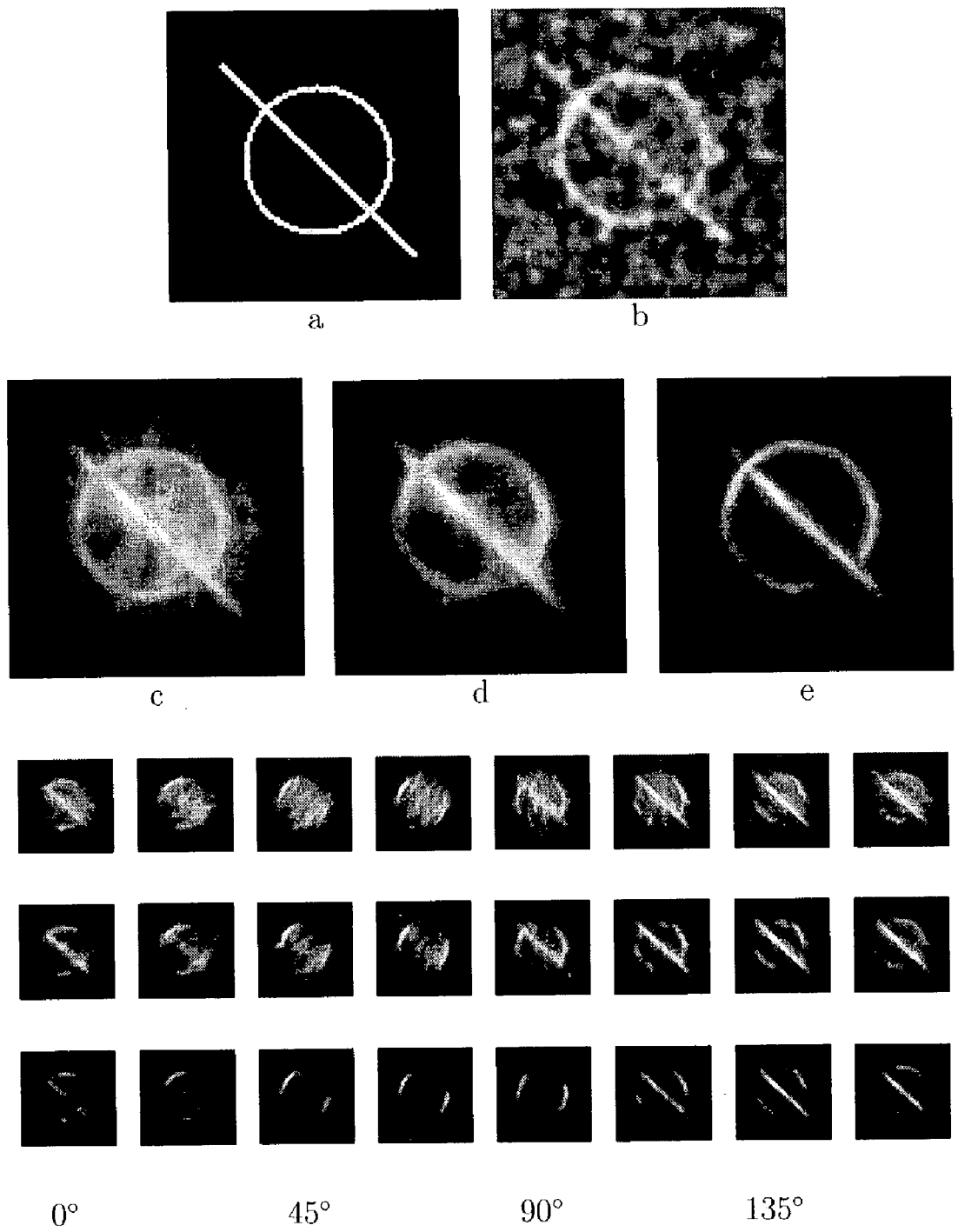
FIG. 17 is a set of photographs of images of crossed contours and the image enhancement effects of filtering by using both Volterra filtering and the biased CIRF posterior mean approximation.

To test the biased CIRF posterior mean approximation filter, we applied it to an example we saw earlier in FIG. 12. We solved the coupled nonlinear system (4.31) and (4.32) for Gaussian noise and with the blur operator B simply taking an integral over $\theta$. In the continuation method for solving the system, we started with $\epsilon$=0.58 and let it grow until $\epsilon$=1.6. We chose homogeneous initial and final weightings $\mu$ and $\nu$, respectively, and set N=1. The results (FIG. 17) show how effective the nonlinearity in the coupled system is at suppressing the weak responses away from the true contours. FIG. 17 shows filtering with the biased CIRF posterior mean approximation: (a) Original image, (b) noisy version copied over $\theta$ to form input m to filter, (c) cubic Volterra result ($\epsilon$=10.5, $\zeta$=0, $\sigma_\kappa$=⅓, with 16 directions), (d) biased CIRF result at start of continuation method ($\epsilon$=0.58), (e) final biased CIRF result at end of continuation method ($\epsilon$=1.6). The bottom three rows are (from top to bottom): response over $\theta$ for cubic Volterra filter; for biased CIRF approximation at start of continuation; and for biased CIRF approximation at the end of the continuation method. Observe the striking degree of orientation selectivity in the biased CIRF approximation end result.

Figure 18:
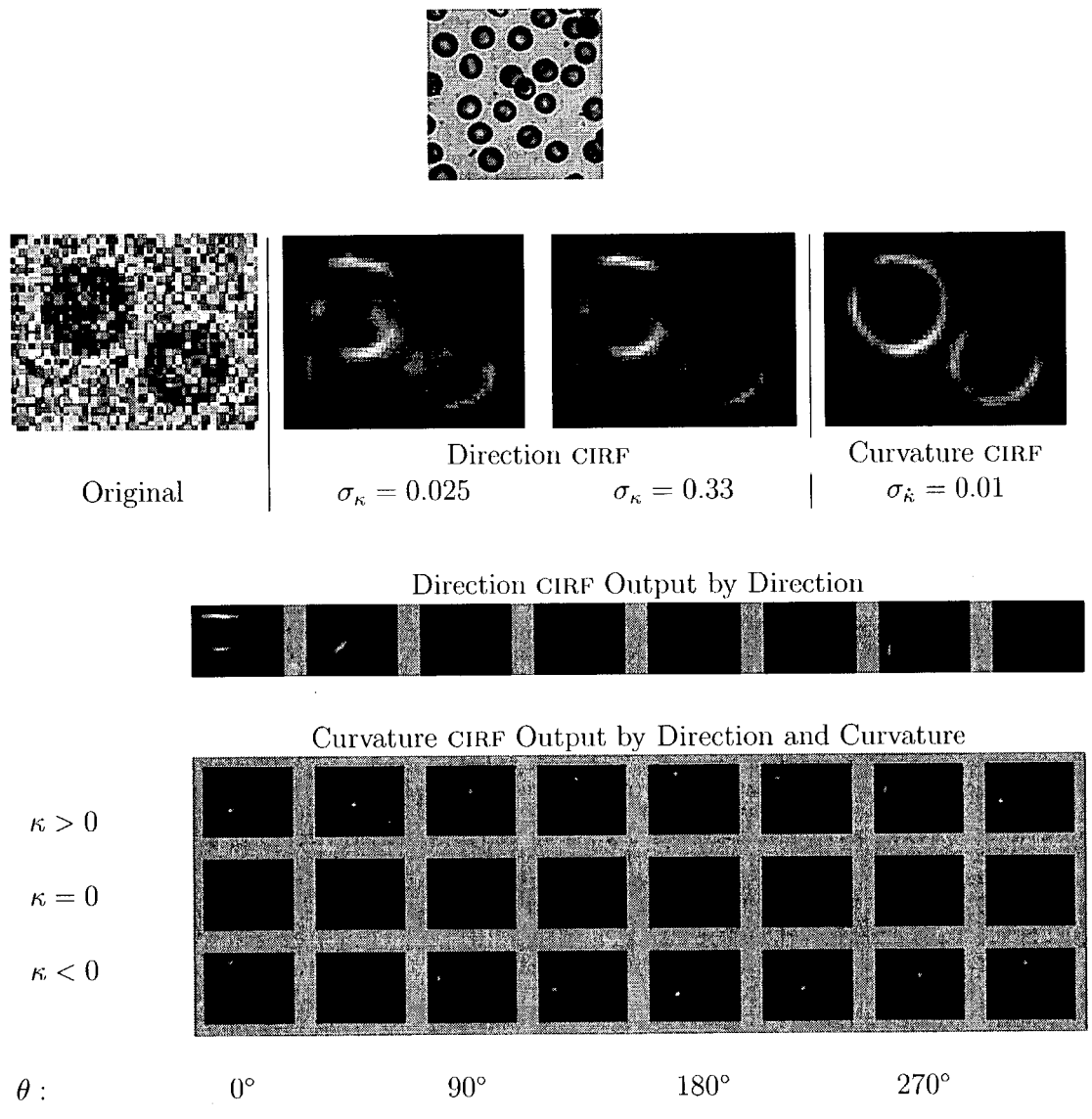
FIG. 18 is a set of photographs of images of blood cells and the image enhancement effects on curvature of filtering by using the biased CIRF posterior mean approximation.

6.3 Contour Filtering in $\mathbb{R}^2 \times \mathbb{R} \times \mathbb{R}$ with Curvature In addition to MMSE CIRF Volterra filters for the direction process, we performed the analogous filtering for the curvature process in (discrete) $\mathbb{R}^2 \times \mathbb{R} \times \mathbb{R}$. For our first example, we considered a blood cell image (FIG. 18, top). To illustrate robustness, noise was added to a small portion of the image that contained two cells (FIG. 18, top left), and was processed with the logical/linear edge operator at the default settings. Inputs for the curvature process were produced by copying over the $\kappa$-dimension, as curvature is not directly measured in the image. The result was first filtered using the CIRF posterior mean based on the direction process (FIG. 18, top center). Despite using two very different bounds on curvature, the direction-based filtering cannot close the blood cell boundaries appropriately. In contrast, the CIRF posterior mean with the curvature process (FIG. 18, top right) was more effective at forming a complete boundary. To illustrate in more detail, we plotted the filter responses for the direction-based filter at $\sigma_\kappa$=0.025 for 8 of the 32 discrete directions in the middle of FIG. 18. The brightness in each of the 8 sub-images is proportional to the response for that particular direction as a function of position (x, y). Observe the over-straightening effect shown by the elongated responses. The curvature filter responses were plotted as a function of direction and curvature (bottom). Despite the input having been constant as a function of curvature, the result shows curvature selectivity. Indeed, one can clearly see in the κ>0 row (FIG. 18, bottom) that the boundary of the top left blood cell is traced out in a counter-clockwise manner. In the κ<0 row, the same cell is traced out in the opposite manner. (Since the parameterization of the curve is lost when forming its image, we cannot know which way the contour was traversed; our result is consistent with both ways.) The response for the lower right blood cell was somewhat weaker but qualitatively similar. Unlike the direction-only process, the curvature process can effectively deal with highly curved contours.

Figure 19:
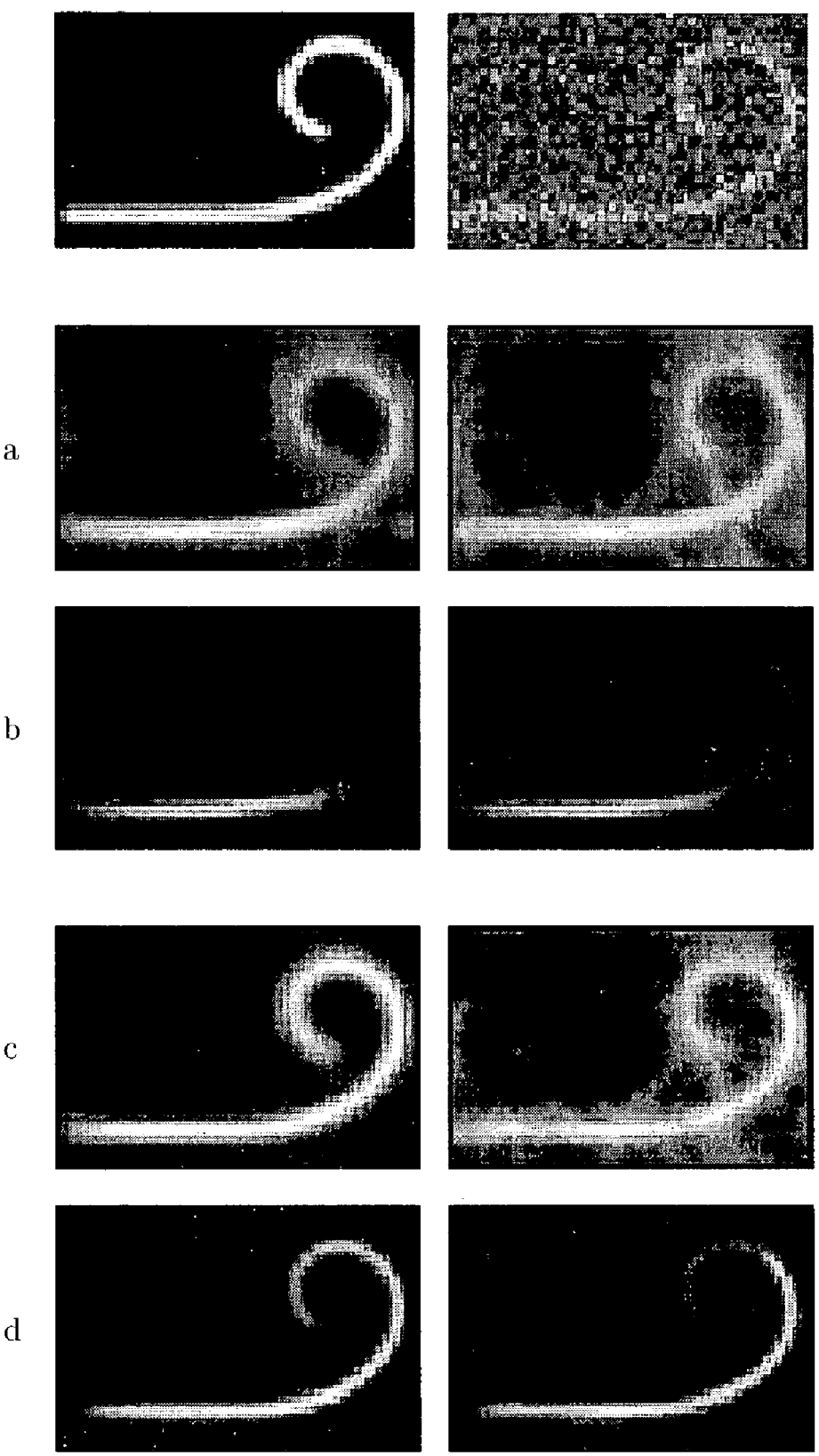
FIG. 19 is a set of photographs of images of an Euler spiral and the image enhancement effects on varying degrees of curvature of filtering by using the biased CIRF posterior mean approximation.

As argued in section 2.5, the bug with a direction-only search cone would mis-track on a contour as curvature builds up. To make this point computationally, we considered an image of an Euler spiral extending from a straight line segment. (We used formula (16.7) of Kimia et al (Kimia et al, supra), and created the plot in Mathematica with all parameters 0, except γ=0.1 (Kimia et al's notation). The resulting plot was grabbed, combined with a line segment, blurred with a Gaussian, and then subsampled.) FIG. 19 shows Euler spiral images without noise (top left) and with noise (top right) are processed with high-noise MMSE Volterra CIRF filters based on the direction process (linear and cubic filter responses in rows (a) and (b), respectively) and the curvature process (linear and cubic filter responses in row (c) and (d), respectively). Observe that the contour curvature begins at zero (straight segment) and then builds up gradually. To produce a 3-dimensional input to our direction-based filter, this original (2-dimensional) image I was copied to all directions (i.e., $m(x, y, \theta)=I(x, y)$, for all θ). Similarly, the image was copied to all directions and curvatures to produce a 4-dimensional input to the curvature-based filter. The 2-dimensional outputs were produced by taking, at each position (x, y), the maximum response over all directions θ (for the direction-based filtering) or over all directions θ and curvatures κ (for the curvature-based filtering). The direction-based CIRF posterior mean (with parameters $\sigma_\kappa$=0.025, λ=10, and 64 directions) was computed (left, rows (a) and (b)), showing an undesirable reduction in response as curvature built up. The curvature-based CIRF posterior mean (left, rows (c) and (d), with parameters $\sigma_\kappa$=0.05, λ=10, 64 directions, and 7 curvatures (0, ±0.05, ±0.1, ±0.15)) shows strong response even at the higher curvature portions of the contour. To test robustness, 0-mean Gaussian noise of standard deviation 0.5 was added (top right) to the image (0 to 1 was the signal range before adding noise). The results (right, rows (a)–(d)) show that the curvature-based filter performs better in high curvature regions despite noise. In contrast, the direction process CIRF result tends to repress the contour signal at high curvatures, and thus the curvature process has more consistent performance, even at higher curvatures.

Section 7

7.1 Conclusion

In this disclosure we have introduced a field structure intermediate between contours and the images that suggest them. This curve indicator random field was studied for Markov process contour models, leading to a practical description of its joint statistical structure via a moment generating functional. By relating contours to images, the model provides a way to verify whether it is in agreement with natural image structure; in this way a role for curvature was found, motivating our introduction of a Markov process in contour curvature. We believe that the CIRF is so basic that future work on visual contours will have difficulty avoiding it.

Enhancing contour structure in noisy images was characterized as MMSE estimation of an underlying CIRF, and a variety of nonlinear filters were provided for computing this posterior mean estimate. The Volterra filters emphasized high-noise situations, and results on synthetic and real images verified this. The more powerful reaction-diffusion-convection equation was provided for dealing with blur more accurately. We note that this PDE was not derived as an (explicit) Euler-Lagrange equation; instead, it arose indirectly via the moment generating functional of the biased CIRF.

Besides enabling explicit calculations, the CIRF provides a handle on a rather unpleasant aspect of contours: their global structure. In particular, the square of the CIRF measures contour intersections. We note that this was not suggested by studying the CIRF prior itself; instead it arose as a quadratic term in the likelihood. In hindsight, however, it can just as easily be incorporated into the CIRF prior to discourage intersections (see section 4.3.3). No current scheme for contour inference has a place for these interactions, although it is not surprising that dealing with multiple contours must eventually confront the intersection problem.

Surfaces would be the most important immediate extension of this work; one could define an analogous surface indicator random field (SIRF) to support medical imaging applications, for example. One goal would be to estimate the SIRF that corresponds to the intestinal wall or the surface of a brain from CAT or MRI images.

| List of Notation |
|---|
| A × B, cartesian product of sets A and B, 9 |
| A, likelihood matrix, 43 |
| B, blur operator, 41 |
| C, diag c, 26 |
| $D_i$, matrix with 1 at (i, i), 67 |
| E(γ), Euler spiral functional, 18 |
| $G(c) = G_c$, Green's operator with bias c, 26 |
| G, Green's operator, 21 |
| G*, transpose of G, 30 |
| H, hitting random field, 39 |
| L, Markov process generator (discrete space), 21 |
| M, measurement random field, 34 |
| N, noise, 41 |
| P(t), transition matrix, 21 |
| $P_c$(du), biased CIRF distribution, 66 |
| $P_{(e)}$(du), posterior CIRF distribution, 44 |
| Q, killed Markov process generator, 21 |
| $R_t^{(n)}$, n-th Markov process, 23 |
| $R_t$ = R(t), Markov process, 8 |
| T−, left limit, 26 |
| T, length, 11 |
| $T^{(n)}$, length of n-th curve, 23 |
| U, CIRF, 23 |
| V, CIRF (single curve), 23 |
| $V^{(n)}$, n-th single-curve CIRF, 23 |
| W, standard Brownian motion, 12 |
| $Z_c$, biased CIRF normalizing constant, 66 |
| CGF, cumulant generating functional, 50 |
| 𝔼, expectation, 26 |

-continued

List of Notation $\mathbb{E}_c$, biased CIRF expectation, 66

$\mathcal{F}$, $\sigma$-algebra, 29

$\Gamma$, planar curve (random), 8

$\mathcal{I}$, state space (discrete), 20

$\mathcal{L}$, Markov process generator (continuous space), 13

$\mathcal{N}$, number of curves, 29

$\bar{\mathcal{N}}$, average number of curves, 29

$\mathcal{P}$, polynomial operator, 54

$\mathcal{R}$, continuous state-space, 79

$\mathbb{R}_+$, nonnegative real numbers, 29

$\mathbb{S}$, circle, 9

$Z_{(c)}$, posterior CIRF normalizing constatnt, 45

$\sum_U$, CIRF covariance, 45 cum, cumulant, 30, 51
$\text{cum}_c$, cumulant of biased CIRF, 68
$\kappa^{i,j,k,\ldots}$, genralized cumulant, 51
$\kappa_c$, cumulant of biased CIRF, 68

⋔, death state, 21

$\delta(\cdot)$, Dirac $\delta$-distribution, 12
$\delta_i$, discrete impulse, 67
$\eta$, density, 31, 57
diag c, diagonal matrix, 26
$\zeta$, Volterra filter parameter, 64

$\dot{x}$, derivative $\frac{\partial x}{\partial t}$, 7

$\epsilon$, inverse noise variance, 64
$\hat{x}$, estimate of X, 34
$\nu$, final weighting, 26
$\gamma$, planar curve, 7
$\hat{f}$, Fourier transform of f, 80

$i$, $\sqrt{-1}$, 7, 80

I, image, 91

$\mathbb{1}\{\cdot\}$, Indicator function, 23

$\mu$, initial distribution, 26

$\langle \cdot, \cdot \rangle$, inner product, 25

$\kappa$, curvature, 7
$\lambda$, average length, 92

$\mathcal{B} \oplus \mathcal{B}'$, edge sum, 52

-continued

List of Notation $\mathcal{B}$, partition, 52 a · b, componentwise product, 60
$\nabla$, gradient, 16
$\nabla_c$, gradient w.r.t. c, 66
perm, permutations, 28
$\sigma_\kappa$, direction process standard deviation, 13, 92
$\sigma_{BM}$, planar Brownian motion standard deviation, 12
$\tau_i$, average time per hit of i, 39
$\theta$, direction, 7
a, likelihood vector, 43
c, bias vector, 25
d(c), closure measure, diagonal of Green's operator with bias c, 70
d, Green's operator diagonal entry, 56
$e^A$, matrix exponential, 21
$g_{ij}$, Green's operator entry, 21
i, j, states (discrete), 20
$l_{ij}$, Markov process generator entry, 21
m, measurement random field realization, 33
$p_{ij}(t)$, transition matrix entry, 21
r(t), Markov process realization, 8
$U^{>0}$, binary CIRF, 33

$\mathbb{R}$, real numbers, 7

$\sum_N$, noise covariance, 41

$\lambda$, average length, 11
$\alpha$, inverse length, 11
$p_{off}$, "off"-curve distribution, 43
$p_{on}$, "on"-curve distribution, 43

A FINAL EXAMPLE

As discussed herein, the purpose of the invention is to enhance the appearance of contours in images. By enhancement, we loosely refer to the reduction of noise or corruption along with an increase in brightness and smoothening of the apparent contours in the image. The basic strategy is to formulate this as a problem of restoration: we seek to estimate the clean sketch which is most closely related to the given noisy image. Our formal model of the clean sketch is what we call the curve indicator random field (CIRF). The noisy image can then viewed as a (pointwise) sum of the curve indicator random field and a pure noise field (e.g., white Gaussian noise). The formal task is to statistically estimate (e.g., via a minimum mean-squared error criterion) the curve indicator random field given the noisy image.

While this formulation of the enhancement of contours as the restoration of a noisy sketch can be applied to many different forms of images, we apply it here to a typical case where the (input) image comes from a camera (e.g. comprising a CCD sensor). The form of this input is a two-dimensional array of numbers $\{h(x,y), x=1, \ldots, n_x, y=1, \ldots, n_y\}$, where each number $h(x,y)$ is an intensity value (e.g. pixel). If there were little noise in the image, then brighter pixels, or larger values of $h(x,y)$, would indicate contour points, and smaller values would correspond to the background, as indicated by the image at 1 in FIG. 20. In many realistic situations, unfortunately, noise is significant, so that large values of $h(x,y)$ may occur at non-contour locations and small values may occur at the true contour locations, meaning that $h(x,y)$ is not a reliable indicator of the contour. Therefore an example of the typical input image $h(x,y)$ that our invention is intended to enhance is shown at 2 in FIG. 20. To overcome this noise, our method exploits the basic property of sketches that points along a curve are drawn smoothly: the pen does not leave the paper as a curve is drawn, and the pen generally follows a smooth path. Thus the local direction of the contour at each point is important, as nearby points along the contour will roughly align in this direction. For this reason we shall calculate a three-dimensional array $\{U(x,y,\theta), x=1, \ldots, n_x, y=1, \ldots, n_y, \theta=1, \ldots, n_\theta\}$ where the third dimension $\theta$ is used to distinguish various local directions. This array $U(x,y,\theta)$ is the estimate of the curve indicator random field (CIRF). Once $U(x,y,\theta)$ is computed, one can immediately calculate an enhanced two-dimensional image (although some applications in computer vision may not require this conversion). We will elaborate on this procedure (2-d to 3-d conversion, the calculation of the 3-d array $U(x,y,\theta)$, and the final 3-d to 2-d conversion) in a deliberately simplified fashion. In general, however, our invention gives the user a great deal of flexibility in specifying various assumptions that influence this procedure, such as whether blur is present in the imaging process, the precise notion of contour smoothness, the presence of corners in the curves, the modeling of contours as contrast edges versus bright contours on a dark background, the faithfulness of the assumptions to the particulars of the application, and the like.

From the CCD image h(x,y) we can define the three-dimensional array $\{m(x,y,\theta), x=1, \ldots, n_x, y=1, \ldots, n_y, \theta=1, \ldots, n_\theta\}$, by copying the two-dimensional array over the third ($\theta$) axis: $m(x,y\theta)=h(x,y)$, for all x, y, and $\theta$ to form the images shown at 3 of FIG. 20. The unknown U is then computed, by transformation with a computer, from m using either the biased CIRF filtering method or the Volterra filtering method. For this example, one can set the operator Q to a discretization of the partial differential operator $$\frac{\sigma_\theta^2}{2} \frac{\partial^2}{\partial \theta^2} - \cos\theta \frac{\partial}{\partial x} - \sin\theta \frac{\partial}{\partial y} - \alpha$$

by means of the finite-differencing technique described in Williams and Jacobs (supra), where standard techniques for the numerical solution of partial differential equations are applied. The parameter $\sigma_\theta$ defines a bound on the curvature of contours in the noisy image (curvature is the rate of change of contour direction $\theta$ per unit length of contour). The parameter $\alpha$ is the reciprocal of the expected length of contour associated with the noisy image.

Biased CIRF Method

Figure 20:
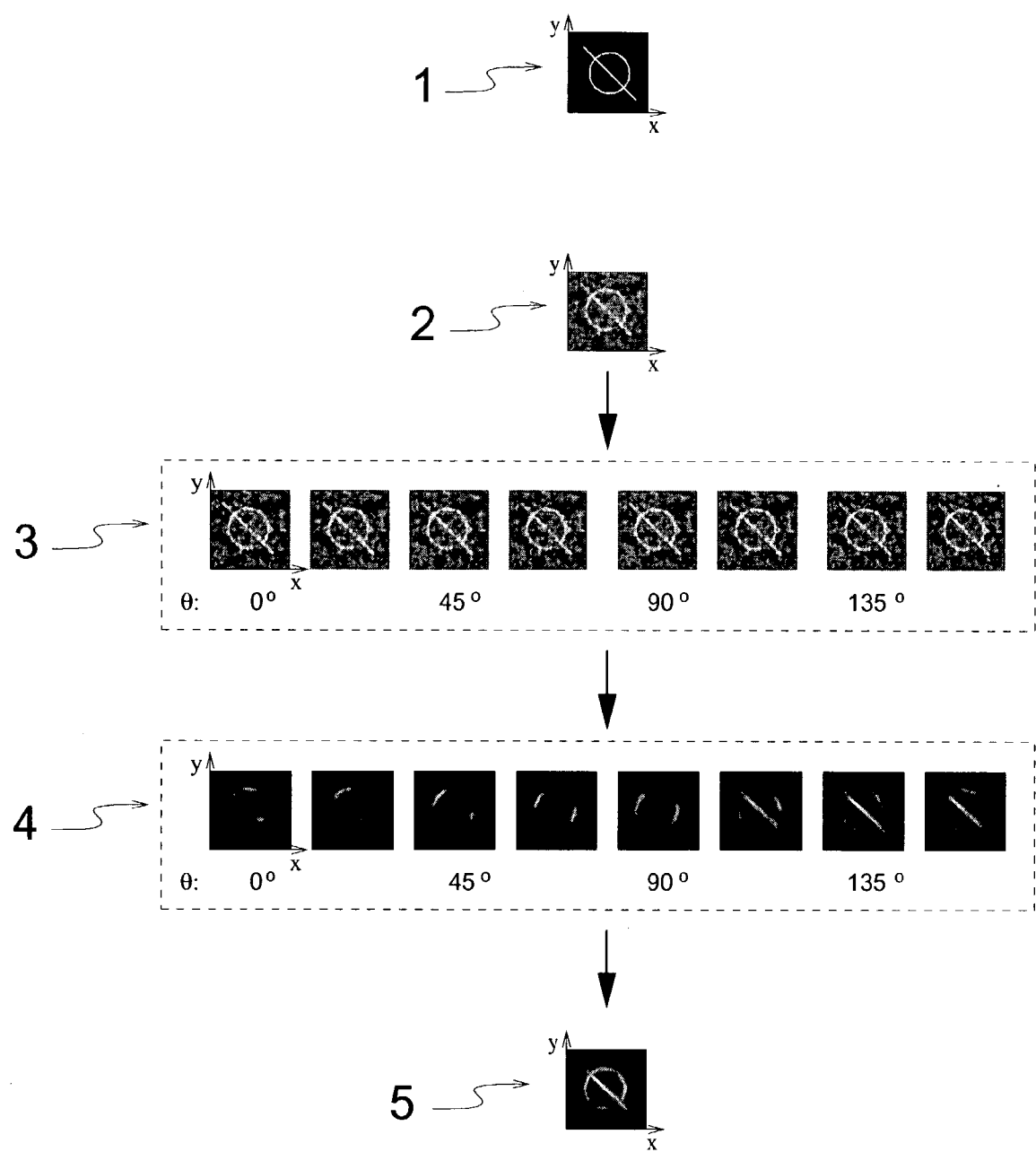
FIG. 20 is a set of photographs of images of crossed contours and the image enhancement effects of filtering by using the biased CIRF posterior mean approximation to show phases in the transformation of a noisy image into an enhanced image.

On a suitably programmed computer, we compute U by solving the coupled pair of nonlinear equations $Qf+\epsilon(c \cdot f)+1=0$, $Q^*b+\epsilon(c \cdot b)+1=0$, for the unknown f and b (each is a real-valued three-dimensional array of the same size as m), where $c=m-f \cdot b$ and $\epsilon$ is a parameter which comprises a measure of the reciprocal noise variance. Once these equations are solved for f and b, we let $U(x,y,\theta)=(f \cdot b)(x,y,\theta)=f(x,y,\theta)b(x,y,\theta)$, the product of the numbers $f(x,y,\theta)$ and $b(x,y,\theta)$. In comparing this use of the biased CIRF filter to the equations at the end of section 4.8 in the observation entitled "reaction-diffusion-convection equation for the direction process", note that here we have set $a=m$, $A=-\frac{1}{2}I$ and $\tilde{N}=\mu=v=1$. In FIG. 20, a set of images, indicated at 4, depicts the solution $U(x,y,\theta)$ to this pair of coupled equations where each image represents that function of planar position (x,y) corresponding to a particular choice of direction $\theta$. A final enhanced 2-dimensional image, indicated at 5 in FIG. 20, is immediately formed by taking the maximum value along $\theta$ for each position $(x,y):g(x,y)=\max_\theta U(x,y,\theta)$ and can be displayed for viewing on a suitable monitor or other display device. If the noise variance is unknown, $\epsilon$ can be used as a user-adjustable control parameter. For this purpose, one computes g resulting from various values of $\epsilon$ and selects the value of $\epsilon$ that appears to produce (via display of the image g) the best enhancement of the contours and reduction of noise. Smaller values of $\epsilon$ will produce less contrast and the greatest noise reduction, while large values of $\epsilon$ will produce clearer contours but with less noise reduction.

If $\epsilon$ is sufficiently small and one has a good inital guess of f and b, then one can solve the coupled pair of equations using an inexact Newton method, a standard technique for solving large, sparse nonlinear systems. The technique has two nested loops. In the outer loop one performs Newton's method by linearizing the coupled system around the current guess of f and b, resulting in a linear system of the form $Hz=s$, where H is an appropriate square $2n_x n_y n_\theta$-by-$2n_x n_y n_\theta$ matrix, s and z are vectors of length $2n_x n_y n_\theta$, and z is unknown (z is a concatenation of the unknown f and b). The inner loop is an iterative method for solving the said linear system. Since H is not generally symmetric positive definite, one can instead solve the normal equations $H^*Hz=H^*s$ for z, where $H^*$ is the transpose of H. One then can use the conjugate gradient method to iteratively solve this latter linear system inexactly (but to any desired precision) for z and thus f and b. Then one can perform another iteration of the outer loop with a new current guess of f and b (from the linear system approximate solution). This outer iteration can be performed until the change in f and b is sufficiently small. One skilled in the art of numerical methods can readily estimate whether f and b are converging quadratically (i.e., whether the change in solution in the current Newton iteration is proportional to the square of the change in solution in the previous Newton iteration).

Since $\epsilon$ is not generally known to be small nor are good initial guesses for f and b necessarily available, one can solve the coupled pair of nonlinear equations using a continuation method, where the parameter $\epsilon$ is increased from a small value incrementally until the correct value is reached. For very small $\epsilon$ the nonlinearity is negligible and one can simply solve the nonlinear system as a linear system by ignoring the nonlinearity, i.e., by setting $c=\epsilon m$. In this latter case, the initial guess for f and b is not important for the conjugate gradient method. Then is increased and f and b are used to provide a new initial guess for the nonlinear system: the above inexact Newton's method can be applied to improve this guess until convergence of the Newton iterations. Then $\epsilon$ can be iteratively increased and the nonlinear coupled system solved using the previous estimate of f and b to define an initial estimate for the current iteration's application of the inexact Newton's method. These are standard techniques for someone skilled in the art of numerical methods.

Volterra Method

Similarly, to apply the Volterra method, the array m is substituted into the Volterra formula:

$$U=a_0+a_1[Gm+G^*m]+a_2[G(\text{diag } m)Gm+Gm\cdot G^*m+G^*(\text{diag } m)G^*m]+a_3[G(\text{diag } m)G(\text{diag } m)Gm+G(\text{diag } m)Gm\cdot G^*m+Gm\cdot G^*(\text{diag } m)G^*m+G^*(\text{diag } m)G^*(\text{diag } m)G^*m],$$

to compute U by transformation with a computer. This formula is a generalization of that disclosed in equation (4.18) in that the coefficients in front of each bracketed expression above are allowed to take arbitrary values. As in the biased CIRF method, the final enhanced image g(x,y) is immediately formed for viewing on a suitable display by taking the maximum value along θ for each position (x,y): $g(x,y)=\max_\theta U(x,y,\theta)$. One method for applying the formula is to first compute and store each of the bracketed expressions in the formula, and then adjust the parameters $a_0$ to $a_3$ via a graphical user interface in which there are controls for these parameters and a window depicting the corresponding enhanced image g. The only difficulty in computing the bracketed expressions in the formula is the computation of the action a=G v of the matrix G on some vector v for a number of different choices of v. Since $G=-Q^{-1}$, we can instead solve the linear system Qa+v=0 for the vector a. The said solution a can be obtained via an application of the conjugate gradient method on the normal equations Q*Qa+Q*v=0. Another, more rapid, technique is suggested in section 5.1.1 hereinabove.

It can be seen that there are many variations on specific implementations of the biased CIRF and Volterra approaches of the present invention, as defined by the appended claims, which are intended to encompass all variations that are inventive contributions suggested to persons skilled in the art of machine vision and numerical analysis. By way of example, such persons will readily understand that the various functions and equations may be implemented in terms of continuous and discrete variables.

What is claimed is:

1. A method of enhancing contours in a noisy image, said method comprising the steps of:
   a) capturing said noisy image as a first distribution m of spatially distributed intensity values
   b) transforming said intensity values of said first distribution m into a second distribution U of spatially distributed intensity values representing an enhanced image having enhanced contours therein, by using a transformation model, which defines a cubic filter, as follows:

$$U=a_0+a_1[Gm+G^*m]+a_2[G(\text{diag } m)Gm+Gm\cdot G^*m+G^*(\text{diag } m)G^*m]+a_3[G(\text{diag } m)G(\text{diag } m)Gm+G(\text{diag } m)Gm\cdot G^*m+Gm\cdot G^*(\text{diag } m)G^*m++G^*(\text{diag } m)G^*(\text{diag } m)G^*m],$$

where:
   diag m is a diagonal operator comprising a matrix with said first distribution m along the diagonal of said matrix and zeroes elsewhere;
   the operation "·" indicates the taking of a componentwise product of two vectors, wherein in s·v evaluated at location r is the product of the two numbers s(r) and v(r), where s and v are each functions of r;
   $a_0, a_1, a_2$, and $a_3$ are real-valued parameters controlling the relative importance of constant, linear, quadratic, and cubic terms, respectively, in said transformation model;
   $G=G(r_1, r_2)$ comprises a matrix of probabilities, each entry of which represents the probability that a contour passing through location $r_1$ passes through location $r_2$ in a forward direction along said contour; and
   $G^*=G^*(r_1, r_2)$ comprises a matrix of probabilities, each entry of which represents the probability that a contour passing through location $r_1$ passes through location $r_2$ in a backward direction along said contour.

2. A method as set forth in claim 1, wherein $a_2=a_3=0$, to thereby define a linear filter.

3. A method as set forth in claim 1, wherein $a_3=0$, to thereby define a quadratic filter.

4. A method as set forth in claim 1, and further comprising the step of:
   c) transforming U(r) into an image I(s), wherein r represents more dimensions than s.

5. A method as set forth in claim 1, and further comprising the step of:
   c) transforming U(r) into an image I(x,y,z) by integrating U or selecting maxima of U over at least one spatial dimension other than (x,y,z).

6. A method as set forth in claim 1, wherein U, μ, v, C, f, and b are functions of $(r_1,r_2)$, and wherein $r_1$ comprises the two-dimensional space (x,y) or the three-dimensional space (x,y,z), and wherein $r_2$ comprises at least one of local direction, curvature, torsion, blur scale, color, texture, contrast and other properties used to form a local description of a contour passing a point of said two-dimensional space (x,y) or said three-dimensional space (x,y,z), respectively.

7. A method as set forth in claim 4, and further comprising the step of:
   d) displaying said image I(s).

8. A computer readable medium including computer instructions for carrying out a method of enhancing contours in a noisy image, said method comprising the steps of:
   a) capturing said noisy image as a first distribution m of spatially distributed intensity values
   b) transforming said intensity values of said first distribution m into a second distribution U of spatially distributed intensity values representing an enhanced image having enhanced contours therein, by using a transformation model, which defines a cubic filter, as follows:

$$U=a_0+a_1[Gm+G^*m]+a_2[G(\text{diag } m)Gm+Gm\cdot G^*m+G^*(\text{diag } m)G^*m]+a_3[G(\text{diag } m)G(\text{diag } m)Gm+G(\text{diag } m)Gm\cdot G^*m+Gm\cdot G^*(\text{diag } m)G^*m+G^*(\text{diag } m)G^*(\text{diag } m)G^*m],$$

where:
   diag m is a diagonal operator comprising a matrix with said first distribution m along the diagonal of said matrix and zeroes elsewhere;
   the operation "·" indicates the taking of a componentwise product of two vectors, wherein in s·v evaluated at location r is the product of the two numbers s(r) and v(r), where s and v are each functions of r;
   $a_0, a_1, a_2$, and $a_3$ are real-valued parameters controlling the relative importance of constant, linear, quadratic, and cubic terms, respectively, in said transformation model;
   $G=G(r_1, r_2)$ comprises a matrix of probabilities, each entry of which represents the probability that a contour passing through location $r_1$ passes through location $r_2$ in a forward direction along said contour; and
   $G^*=G^*(r_1, r_2)$ comprises a matrix of probabilities, each entry of which represents the probability that a contour passing through location $r_1$ passes through location $r_2$ in a backward direction along said contour.

9. A computer readable medium as set forth in claim 8, wherein $a_2=a_3=0$, to thereby define a linear filter.

10. A computer readable medium as set forth in claim 8, wherein $a_3=0$, to thereby define a quadratic filter.

11. A computer readable medium as set forth in claim 8, and further comprising the step of:

c) transforming U(r) into an image I(s), wherein r represents more dimensions than s.

12. A computer readable medium as set forth in claim 11, and further comprising the step of:

d) displaying said image I(s).

13. A system for enhancing contours in a noisy image, said system comprising:

a) a camera for capturing said noisy image as a first distribution m of spatially distributed intensity values b) a computer for transforming said intensity values of said first distribution m into a second distribution U of spatially distributed intensity values representing an enhanced image having enhanced contours therein, by using a transformation model, which defines a cubic filter, as follows:

$$U=a_0+a_1[Gm+G^*m]+a_2[G(\text{diag } m)Gm+Gm \cdot G^*m+G^*(\text{diag } m)G^*m]+a_3[G(\text{diag } m)G(\text{diag } m)Gm+G(\text{diag } m)Gm \cdot G^*m+Gm \cdot G^*(\text{diag } m)G^*m+G^*(\text{diag } m)G^*(\text{diag } m)G^*m],$$

where:

diag m is a diagonal operator comprising a matrix with said first distribution m along the diagonal of said matrix and zeroes elsewhere;

the operation "·" indicates the taking of a componentwise product of two vectors, wherein in s·v evaluated at location r is the product of the two numbers s(r) and v(r), where s and v are each functions of r;

$a_0, a_1, a_2,$ and $a_3$ are real-valued parameters controlling the relative importance of constant, linear, quadratic, and cubic terms, respectively, in said transformation model;

$G=G(r_1, r_2)$ comprises a matrix of probabilities, each entry of which represents the probability that a contour passing through location $r_1$ passes through location $r_2$ in a forward direction along said contour; and $G^*=G^*(r_1, r_2)$ comprises a matrix of probabilities, each entry of which represents the probability that a contour passing through location $r_1$ passes through location $r_2$ in a backward direction along said contour.

14. A system as set forth in claim 13, wherein $a_2=a_3=0$, to thereby define a linear filter.

15. A system as set forth in claim 13, wherein $a_3=0$, to thereby define a quadratic filter.

16. A system as set forth in claim 13, said system comprising:

c) a computer for transforming U(r) into an image I(s), wherein r represents more dimensions than s.

17. A system as set forth in claim 16, wherein $U(r)=U(x,y,z,\theta,\phi)$, where $\theta$ and $\phi$ define a direction in three dimensions, and I(x,y,z) comprises either an integral of U over $\theta$ and $\phi$ or a selection of maxima of U over $\theta$ and $\phi$.

18. A system as set forth in claim 13, and comprising:

c) a computer for transforming U(r) into a planar image I(x,y) by integrating U or selecting maxima of U over at least one spatial dimension other than (x,y).

19. A system as set forth in claim 13, wherein $U(r)=U(x,y,\theta)$, and I(x,y) comprises either an integral of U over $\theta$ or a selection of maxima of U over $\theta$.

20. A system as set forth in claim 16, said system further comprising:

d) a display for displaying said image I(s).

* * * * *